US012799817B2

(12) United States Patent
Spray et al.

(10) Patent No.: US 12,799,817 B2
(45) Date of Patent: Nov. 17, 2026

(54) TENSIONER FOR AN ARCHITECTURAL-STRUCTURE COVERING

(71) Applicant: HUNTER DOUGLAS INC., New York, NY (US)

(72) Inventors: Jeffrey L. Spray, Erie, CO (US); Timothy William Fries, Louisville, CO (US)

(73) Assignee: Hunter Douglas Inc., New York, NY (US)

( * ) Notice: Subject to any disclaimer, the term of this patent is extended or adjusted under 35 U.S.C. 154(b) by 51 days.

(21) Appl. No.: 18/884,514

(22) Filed: Sep. 13, 2024

(65) Prior Publication Data

US 2025/0116157 A1 Apr. 10, 2025

Related U.S. Application Data

(60) Provisional application No. 63/588,059, filed on Oct. 5, 2023, provisional application No. 63/617,878, filed on Jan. 5, 2024, provisional application No. 63/568,112, filed on Mar. 21, 2024.

(51) Int. Cl.
*E06B 9/80* (2006.01)
*E06B 9/42* (2006.01)
*E06B 9/78* (2006.01)

(52) U.S. Cl.
CPC .................. *E06B 9/80* (2013.01); *E06B 9/42* (2013.01); *E06B 9/78* (2013.01); *E06B 2009/785* (2013.01); *E06B 2009/801* (2013.01)

(58) Field of Classification Search
CPC ..... E06B 9/80; E06B 9/42; E06B 9/78; E06B 2009/785; E06B 2009/801; E06B 9/32; E06B 9/322; E06B 9/324; E06B 9/326; E06B 209/3265; A47H 3/08
See application file for complete search history.

(56) References Cited

U.S. PATENT DOCUMENTS 5,553,650 A * 9/1996 Jelic ........................ E06B 9/326 16/442
5,752,558 A * 5/1998 Lin ......................... E06B 9/326 160/320

(Continued)

FOREIGN PATENT DOCUMENTS

EP 1980706 A2 * 10/2008 ............. E06B 9/326

*Primary Examiner* — Beth A Aubrey
(74) *Attorney, Agent, or Firm* — Dority & Manning, P.A.

(57) ABSTRACT

A tensioner for use with an architectural-structure covering including an operating element (e.g., an operating cord, a bead chain, or the like) is disclosed. The tensioner selectively securing a position of the operating element. In some embodiments, the tensioner includes a body, a slider, a bearing, and an optional biasing member. The slider is movably positioned within the body between first and second positions to selectively enable movement of the operating element relative to the tensioner. In some embodiments, the tensioner further includes an active locking mechanism such as, for example, a button mechanism moveable between a first or engaged position and a second or disengaged position. In the first or engaged position, the button mechanism prevents movement of the slider. In the second or disengaged position, the button mechanism releases the slider enabling the slider to move.

20 Claims, 50 Drawing Sheets

(56) References Cited

U.S. PATENT DOCUMENTS

| | | | | | |
|---|---|---|---|---|---|
| 5,845,696 | A * | 12/1998 | Chou | E06B 9/36<br>160/321 |
| 5,894,639 | A * | 4/1999 | Boden | F16G 11/106<br>24/115 M |
| 6,085,824 | A * | 7/2000 | Cadorette | E06B 9/326<br>160/177 V |
| 8,376,022 | B2 * | 2/2013 | Lin | E06B 9/326<br>474/136 |
| 8,539,645 | B2 * | 9/2013 | Marocco | A47H 3/08<br>24/136 L |
| 8,850,668 | B2 * | 10/2014 | Chen | E06B 9/324<br>160/321 |
| 10,006,245 | B1 * | 6/2018 | Marocco | E06B 9/78 |
| 10,508,491 | B2 * | 12/2019 | Huang | E06B 9/324 |
| 11,098,528 | B2 | 8/2021 | Smith et al. | |
| 11,913,280 | B2 * | 2/2024 | Lynch | E06B 9/326 |
| 2008/0251622 | A1 * | 10/2008 | Randall | E06B 9/326<br>242/385.1 |
| 2011/0168338 | A1 * | 7/2011 | Cannaverde | E06B 9/322<br>160/168.1 R |
| 2016/0168907 | A1 * | 6/2016 | Byun | E06B 9/326<br>160/178.2 |
| 2017/0145742 | A1 * | 5/2017 | Hendriks | E06B 9/326 |
| 2018/0171707 | A1 * | 6/2018 | Marocco | E06B 9/78 |
| 2019/0040678 | A1 * | 2/2019 | Garcia Garcia | E06B 9/42 |
| 2019/0264501 | A1 * | 8/2019 | Marocco | E06B 9/42 |

* cited by examiner

TENSIONER FOR AN ARCHITECTURAL-STRUCTURE COVERING

CROSS-REFERENCE TO RELATED APPLICATIONS

This is a non-provisional of, and claims the benefit of the filing date of, U.S. provisional patent application No. 63/588,059, filed Oct. 5, 2023, entitled "Tensioner for an Architectural-Structure Covering," and is a non-provisional of, and claims the benefit of the filing date of, U.S. provisional patent application No. 63/617,878, filed Jan. 5, 2024, entitled "Tensioner for an Architectural-Structure Covering," and is a non-provisional of, and claims the benefit of the filing date of, U.S. provisional patent application No. 63/568,112, filed Mar. 21, 2024, entitled "Tensioner for an Architectural-Structure Covering," the entirety of each application is incorporated by reference herein.

FIELD OF THE DISCLOSURE

The present disclosure relates generally to architectural-structure coverings, and more particularly to a tensioner for mounting a lower extent of an endless or looped operating element (e.g., an operating cord, a bead chain, or the like) used to operate the covering of the architectural-structure covering.

BACKGROUND OF THE DISCLOSURE

Architectural-structure coverings for architectural openings and/or structures (used interchangeably herein without the intent to limit), such as windows, doors, archways, portions of a wall, and the like, have taken numerous forms for many years. Architectural-structure coverings may take many different forms. For example, roller blinds, vertical blinds, wooded blinds, Roman shades, etc. One known architectural-structure covering includes a covering such as a fabric that is movable between an extended position and a retracted position. For example, vertically extendable or retractable (e.g., able to be lowered or raised, respectively, in a vertical direction) between an extended position and a retracted position for obscuring and exposing the underlying architectural structure. To move the covering between the extended and retracted positions, some architectural-structure coverings include a rotatable member (e.g., a roller) about which the covering may be wrapped to retract the covering (e.g., the retracted position), and unwrapped to extend the covering (e.g., the extended position). In use, rotation of the rotatable member in a first direction may retract the covering while rotation of the rotatable member in a second, opposite direction may extend the covering.

The architectural-structural covering may also include an operating system operably coupled to the rotatable member and one or more operating elements, such as, for example, an operating cord or a bead chain, associated with the operating system to move the covering between the retracted position and the extended position. The operating element may hang from, for example, the operating system in an endless loop so that one run of the depending endless loop can be pulled downwardly while the other run moves upwardly to operate the covering.

It has been found desirable with operating elements that mounting, securing, or anchoring the lower extent of the operating element adjacent the bottom of the architectural structure makes the covering easier to operate and is aesthetically more attractive as there are no dangling elements but rather suitably tensioned elements confined between the operating system and an anchor at the bottom of the architectural structure. Anchors at the bottom of the architectural structure are sometimes referred to as tensioners as they typically hold the operating element in a desirably taut condition. That is, in use, the lower extent of the operating element is mounted to an adjacent structure (e.g., a window frame or the like) via a tensioner. In use, the tensioner may be mounted to the adjacent structure in an unlocked configuration. The tensioner is also mounted so that the operating element is held in a taut condition. In this configuration, the operating element may be moved relative to the tensioner to move the covering between the extended and retracted positions. However, in use, if the tensioner is decoupled from the adjacent structure (e.g., the tensioner is no longer mounted) or if the tensioner is mounted incorrectly such that, for example, the operating element is not held in a taut condition, the tensioner is biased to a locked configuration to prevent the operating element from moving relative to the tensioner. In this manner, for the operating element to function properly (e.g., to enable the covering to be moved between the extended and retracted positions), the tensioner is mounted to the adjacent structure with the operating element in a taut condition. One known example of a tensioner is disclosed in U.S. Pat. No. 11,098,528, issued on Aug. 24, 2021, entitled "Tensioner for an Architectural-Structure Covering".

In use, in the locked configuration, the tensioner should be arranged and configured to engage the operating element sufficiently to prevent the operating element from being pulled through the tensioner (e.g., to prevent the operating element from moving relative to the tensioner in the locked configuration).

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is an architectural-structure covering. The architectural-structure covering may include a covering movable between an extended position and a retracted position, an operating system (e.g., a clutch, a gear, a drive train, a gear train, combinations thereof, etc.) for moving the covering between the extended and retracted positions, and an operating element (e.g., an operating cord, a bead chain, or the like) operatively associated with the operating system to move the covering between the extended and retracted positions.

Also disclosed herein is a tensioner for use with the operating element. The tensioner interacts with the operating element so that when the tensioner is in a first or locked position, configuration, or state, the operating element is prevented from moving substantially relative to the tensioner. Meanwhile, when the tensioner is in a second or unlocked position, configuration, or state, the operating element is freely movable relative to the tensioner. In use, the tensioner is mounted to an adjacent structure such as, for example, a window frame, in the second or unlocked configuration with the operating element in a taut condition. In this manner, the operating element is movable relative to the tensioner so that the covering can be moved between the extended and retracted positions. However, if the tensioner is decoupled from the adjacent structure (e.g., the tensioner is no longer mounted) or if the tensioner is mounted improperly such as, for example, with the operating element in a non-taut condition, the tensioner is biased to the first or locked configuration to prevent the operating element from moving relative to the tensioner.

In some embodiments, a tensioner for use with an architectural-structure covering is disclosed. The architectural-structure covering including a covering and an operating element. The operating element is arranged and configured to move the covering between an extended position and a retracted position. The tensioner is arranged and configured to selectively secure a position of the operating element relative to the tensioner. The tensioner including a body having a first body member coupled to a second body member; a slider movably positioned within the body, the slider movable between first and second positions, the slider including a first end arranged and configured to interact with the operating element and a second end; and a bearing positioned within the body, the bearing guiding movement of the operating element; wherein in the first position, the slider prevents movement of the operating element relative to the body, and in the second position, the slider is retracted from the bearing to permit movement of the operating element relative to the body; and wherein, in use, with the slider in the first position, movement of the operating element causes the first end of the slider to pivot relative to the second end of the slider so that a stop formed on the slider aligns with a stop formed on the body to prevent the slider from moving from the first position to the second position.

In some embodiments, the operating element is in the form of a bead chain including a plurality of beads; the first end of the slider includes tines for interacting with one of the plurality of beads; the bearing is in the form of a roller, the roller including a bearing surface and a plurality of legs defining a series of pockets; and with the slider in the first position, the tines are received within one of the series of pockets and the tines interact with the bead chain and at least one of the plurality of legs to prevent movement of the bead chain relative to the body.

In some embodiments, the first end of the slider includes a reinforced yoke arranged and configured to interact with one of the beads of the bead chain, the reinforced yoke being arranged and configured to prevent the tines from flexing.

In some embodiments, the tines include a length arranged and configured to enable the stop formed on the slider to contact the stop formed on the body prior to the tines releasing the bead chain.

In some embodiments, the body includes a post and the roller includes a bore for receiving the post so that the roller is rotatably coupled to the body.

In some embodiments, the operating element is in the form of an operating cord; the first end of the slider includes spikes for interacting with the operating cord; the bearing includes first and second downwardly extending legs defining a space therebetween; and with the slider in the first position, the spikes are received within the space and engage the operating cord to prevent movement of the operating cord relative to the body.

In some embodiments, the bearing has a U-shaped configuration.

In some embodiments, the downwardly extending legs are arranged and configured to guide passage of the operating cord so that with the slider in the second position, the operating cord passes laterally through the body of the tensioner such that the operating cord is perpendicular to a longitudinal axis of the tensioner.

In some embodiments, with the slider in the first position, the spikes push the operating cord upwards into the space between the downwardly extending legs.

In some embodiments, the spikes include a length arranged and configured to enable the stop formed on the slider to contact the stop formed on the body prior to the spikes releasing the operating cord.

In some embodiments, the body includes a longitudinally extending rail arranged and configured to interact with the slider for guiding movement of the slider relative to the body.

In some embodiments, the slider interacts with the rail only once the stop formed on the slider moves past the stop formed on the body.

In some embodiments, the first and second body members include a plurality of interconnecting projections and recesses for coupling the first body member and the second body member, the first and second body members further including at least one snap-fit connector arranged and configured to couple the first body member to the second body member, wherein the snap-fit connector is arranged and configured to break upon separation thereby indicating that the tensioner was tampered with.

In some embodiments, the tensioner further includes a biasing member to bias the slider to the first position.

In some embodiments, the slider is manufactured from Zinc.

In some embodiments, the body includes indicia for indicating a position of the second end of the slider relative to the body to ensure that the slider is in the second position.

Alternate tensioners for use with the operating element are also disclosed. In use, similar to the previous tensioners, the tensioner interacts with the operating element so that when the tensioner is in a first or locked position, configuration, or state, the operating element is prevented from moving substantially relative to the tensioner. Meanwhile, when the tensioner is in a second or unlocked position, configuration, or state, the operating element is movable relative to the tensioner.

In some embodiments, the tensioner incorporates an active locking mechanism such as, for example, a button mechanism, which requires an end user, an installer, or the like to actively disengage the slider of the tensioner during, for example, installation, mounting, or the like. That is, in some embodiments, the tensioner includes a button mechanism moveable from a first or engaged position to a second or disengaged position. In use, in the first or engaged position, the button mechanism prevents the slider from moving from its first position to its second position. In the second or disengaged position, the button mechanism releases or disengages the slider enabling the slider to move to its second position. For example, in some embodiments, manipulation, activation, compression, etc. of the button mechanism by the end user, the installer, etc. releases the slider enabling the slider to move to its second or unlocked position so that the operating element (e.g., operating cord, bead chain, etc.) can move relative to the tensioner.

In use, the alternate embodiments of the tensioner including the button mechanism can be used separately from, or in combination with, the tensioners including the tilt and stop mechanisms previously described. As such, the button mechanism can operate as the primary or sole means for preventing the slider from moving. Alternatively, the button mechanism may operate as a secondary locking mechanism when used in combination with tilting of the slider and corresponding stops.

In some embodiments, the tensioner includes a body, a slider, and a bearing. The body including a first body member coupled to a second body member. The slider being movably positioned within the body, the slider movable between first and second positions, the slider including a first end arranged and configured to interact with the operating element and a second end. The bearing being positioned within the body, the bearing guiding movement of the operating element. In the first position, the slider prevents movement of the operating element relative to the body. In the second position, the slider is retracted from the bearing to permit movement of the operating element relative to the body. The tensioner further includes a spring-loaded button mechanism moveable from a first position to a second position, wherein in the first position, the spring-loaded button mechanism is arranged and configured to contact the slider to prevent the slider from moving from its first position to its second position.

In some embodiments, with the spring-loaded button mechanism in the second position, the spring-loaded button mechanism releases the slider to enable the slider to move to its second position.

In some embodiments, the spring-loaded button mechanism is biased to the first position.

In some embodiments, the spring-loaded button mechanism includes first and second arms, first and second stops, and first and second buttons, wherein the first and second buttons are arranged and configured to be manipulated by an end user, installer, etc. to move the spring-loaded button mechanism from the first position to the second position thereby releasing the slider.

In some embodiments, the first and second stops are arranged and configured to contact first and second stops on the slider to prevent the slider from moving to its second position when the spring-loaded button mechanism is in the first position.

In some embodiments, the first and second stops formed on the spring-loaded button mechanism include inwardly projecting legs and the first and second stops formed on the slider include first and second pockets for receiving the first and second inwardly projecting legs.

In some embodiments, each of the first and second arms is pivotably coupled to the body of the tensioner.

In some embodiments, each of the first and second arms is pivotably coupled to the body of the tensioner at a location positioned in-between the stop and the button.

In some embodiments, the spring-loaded button mechanism is arranged and configured so that the first and second buttons require simultaneous manipulation in order to release the slider.

In some embodiments, the spring-loaded button mechanism including the first and second arms, the first and second stops, and the first and second buttons are integrally or monolithically formed.

In some embodiments, the operating element comprises a bead chain including a plurality of beads, the first end of the slider includes tines for interacting with one of the plurality of beads, the bearing is in the form of a roller, the roller including a bearing surface and a plurality of legs defining a series of pockets, and with the slider in the first position, the tines are received within one of the series of pockets and the tines interact with the bead chain and at least one of the plurality of legs to prevent movement of the bead chain relative to the body.

In some embodiments, the body includes a post and the roller includes a bore for receiving the post so that the roller is rotatably coupled to the body.

In some embodiments, the operating element comprises an operating cord, the first end of the slider includes spikes for interacting with the operating cord, the bearing includes first and second downwardly extending legs defining a space therebetween, and with the slider in the first position, the spikes are received within the space and engage the operating cord to prevent movement of the operating cord relative to the body.

In some embodiments, the bearing has a U-shaped configuration.

In some embodiments, the downwardly extending legs are arranged and configured to guide passage of the operating cord so that with the slider in the second position, the operating cord passes laterally through the body of the tensioner such that the operating cord is perpendicular to a longitudinal axis of the tensioner.

In some embodiments, with the slider in the first position, the spikes push the operating cord upwards into the space between the downwardly extending legs.

In some embodiments, the body includes a longitudinally extending rail arranged and configured to interact with the slider for guiding movement of the slider relative to the body.

In some embodiments, the first and second body members include a plurality of interconnecting projections and recesses for coupling the first body member and the second body member, the first and second body members further including at least one snap-fit connector arranged and configured to couple the first body member to the second body member, wherein the snap-fit connector is arranged and configured to break upon separation thereby indicating that the tensioner was tampered with.

In some embodiments, the tensioner further includes a biasing member to bias the slider to the first position.

In some embodiments, the second end of the slider includes an opening to receive a fastener and the body includes an elongated slot to access a portion of the second end of the slider; and when the slider is moved from the first position to the second position, a wall or surface of the slider closes the elongated slot formed in the body.

In some embodiments, the second end of the slider includes an opening to receive a fastener and the body includes an elongated slot to access a portion of the second end of the slider; and the slider includes a cavity having an opening for receiving a biasing element such that the opening formed in the slider for receiving the biasing member is orientated perpendicular relative to the opening formed in the second end for receiving the fastener.

Figure 1:
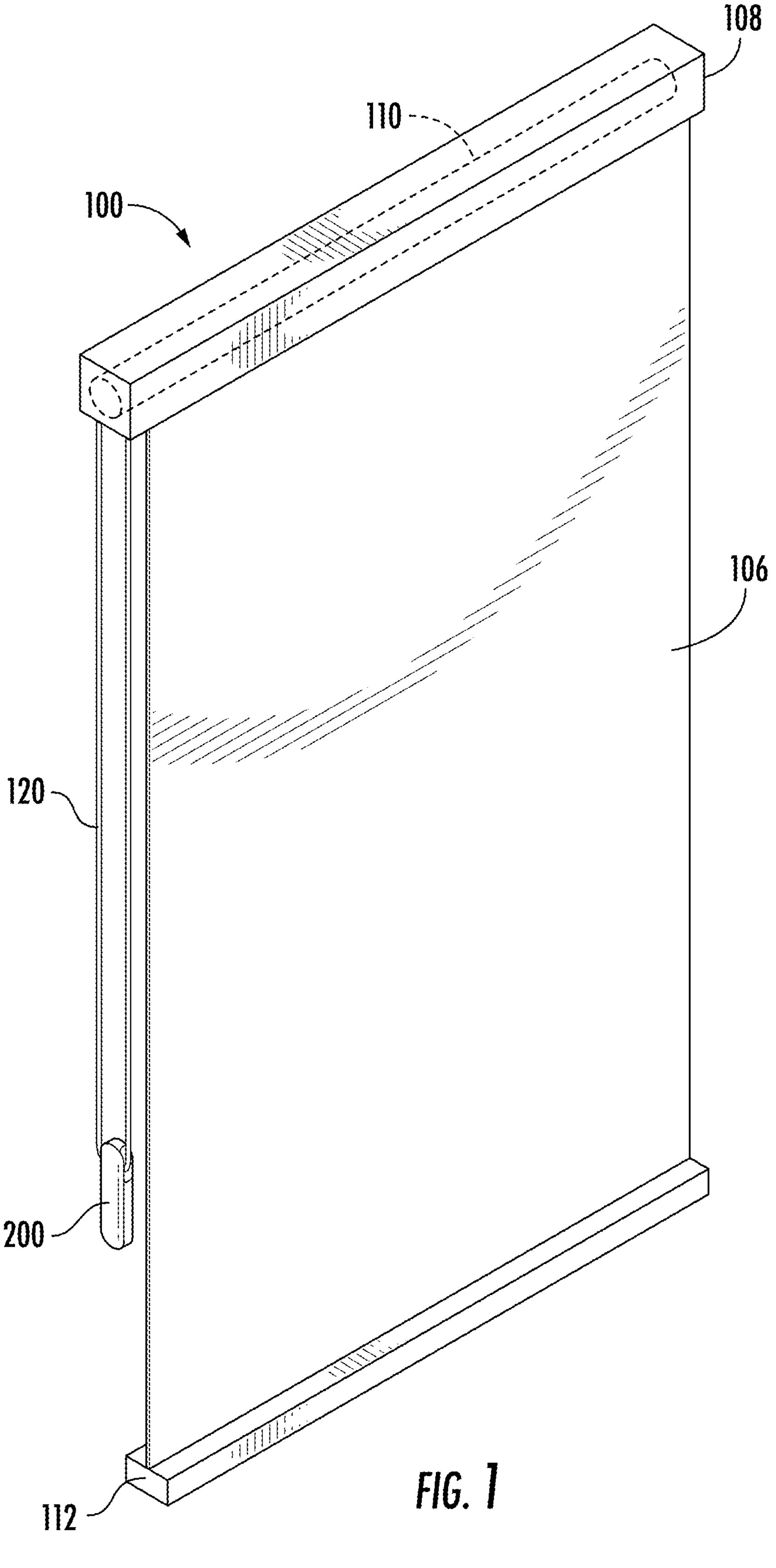
FIG. 1 is a perspective view illustrating an example of an embodiment of an architectural-structure covering including an operating element and a tensioner.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

DETAILED DESCRIPTION

Embodiments of a tensioner for selectively securing a position of an operating element relative to the tensioner in accordance with the present disclosure will now be described more fully hereinafter with reference to the accompanying drawings, in which embodiments of the present disclosure are presented. As will be described in greater detail below, in some embodiments, the tensioner of the present disclosure is used in connection with an operating element, which can take the form of an operating cord, a bead chain, or the like. The tensioner of the present disclosure may, however, be embodied in many different forms and should not be construed as being limited to the embodiments set forth herein. Rather, these embodiments are provided so that this disclosure will convey certain features of the tensioner to those skilled in the art.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

As will be described in greater detail herein, in use, the tensioner interacts with an operating element so that when the tensioner is in a first or locked position, configuration, or state (used interchangeably herein without the intent to limit), the operating element is prevented from moving substantially relative to the tensioner, thus preventing the covering from being moved between the extended and retracted positions by operation of the operating element. In a second or unlocked configuration, the operating element is freely movable relative to the tensioner so that the covering can be moved between the extended and retracted positions by operation of the operating element.

In one example of an embodiment, a tensioner for use with an architectural-structure covering, which includes an operating element, is disclosed. The tensioner selectively secures a position of the operating element relative to the tensioner. The tensioner may include a body having a first body member coupled to a second body member, a slider or plunger (terms used interchangeably herein without the intent to limit or distinguish) movably positioned within the body, the slider movable between first and second positions, and a roller or bearing (terms used interchangeably herein without the intent to limit or distinguish) positioned within the body. In the first position, the slider prevents movement or passage of the operating element through the tensioner (e.g., the first or locked configuration). In the second position, the slider is retracted from (e.g., slider is spaced from the roller) so that movement of the operating element relative to the tensioner is permitted (e.g., the second or unlocked configuration).

Referring to FIG. 1, an example of an embodiment of an architectural-structure covering 100 that may be used in accordance with the present disclosure is illustrated. The architectural-structure covering 100 may include a covering 106 movable between an extended position (as illustrated in FIG. 1) and a retracted position (not shown), an operating system (not shown) to move the covering 106 between the extended and retracted positions, and an operating element 120 operatively associated with the operating system to move the covering 106 between the extended and retracted positions. As illustrated, in one embodiment, the operating element 120 may be in the form of a cord. However, as will be described and illustrated in greater detail below, in alternate embodiments, the operating element 120 may be in the form of a bead chain including a plurality of beads interconnected via a link, as will be readily understood by one of ordinary skill in the art.

As illustrated in FIG. 1, in one embodiment, the covering 106 may be a flexible material having an upper edge coupled to a rotatable member 110 and a lower edge. A bottom rail 112 may be coupled to the lower edge of the covering 106. However, it should be understood that the covering 106 may be any suitable covering now known or hereafter developed including, for example, a stacked or tiered covering such as, for example, a Roman shade, a horizontal cellular shade, a horizontal Venetian shade, or the like.

As illustrated, the architectural-structure covering 100 may also include a headrail 108, which may include a housing having opposed end caps (not shown) to form an open-bottom enclosure. The headrail 108 may also include attachments or brackets (not shown) for coupling the headrail 108 to a structure above, or at the top of, an architectural opening, such as a wall, via mechanical fasteners such as screws, bolts, or the like. In use, the headrail 108 may house the rotatable member 110.

Although a particular example of an architectural-structure covering 100 is shown in FIG. 1, many different types and styles of architectural-structure coverings exist and could be employed in place of the examples illustrated in FIG. 1. As such, the present disclosure should not be limited to any particular type of architectural-structure covering.

Referring to FIG. 1, for the sake of convenience and clarity, terms such as "front," "rear," "top," "bottom," "up," "down," "vertical," "horizontal", "inner," and "outer" may be used herein to describe the relative placement and orientation of various components and portions of the architectural-structure covering 100, each with respect to the geometry and orientation of the architectural-structure covering 100 as they appear in FIG. 1. Said terminology is intended to be non-limiting and is used herein merely to describe relationship between various components as illustrated in FIG. 1.

As will be readily appreciated by one of ordinary skill in the art, the architectural-structure covering 100 may include an operating element 120, which, in use, is operatively associated with an operating system (not shown) to move the covering 106 between the extended and retracted positions. The operating system can be any suitable operating system now known or hereafter developed such as, for example, a clutch, a gear, a drive train, a gear train, combinations thereof, etc. As illustrated, the operating element 120 can be in the form of a continuous loop (e.g., an operating cord, a bead chain, or the like). The architectural-structure covering 100 may also include a tensioner 200. The tensioner 200 is adapted and configured to receive a portion of the operating element 120. In use, the tensioner 200 is movable between a first configuration and a second configuration. In the first configuration, the operating element 120 is secured relative to the tensioner 200 (e.g., prevented from moving) while in the second configuration, the operating element 120 is freely movable relative to the tensioner 200.

That is, as will be described in greater detail, the tensioner 200 may be adapted and configured to enable the operating element 120 to be locked or unlocked against relative movement with respect to the tensioner 200. In the second or unlocked configuration (FIG. 6), the slider 300 is retracted, spaced from, etc. the operating element 120 so that the operating element 120 is permitted to freely move relative to the tensioner 200 to allow the covering 106 to be moved between the extended and retracted positions. Meanwhile, in the first or locked configuration (FIGS. 7-11), the slider 300 interacts with the operating element 120 so that the operating element 120 is prohibited or prevented from moving sufficiently relative to the tensioner 200. In this manner, with the tensioner 200 mounted in the second or unlocked configuration, the operating element 120 can be freely moved relative to the tensioner 200 so that the covering 106 can be moved between the extended and retracted positions. In use, the tensioner 200 is in the second or unlocked configuration when properly mounted to an adjacent structure. However, in use, if the tensioner 200 is decoupled from the adjacent structure (e.g., the tensioner 200 is not mounted to the adjacent structure) or if the tensioner 200 is mounted incorrectly such that, for example, the operating element 120 is held in a non-taut condition, the tensioner 200 is biased to the first or locked configuration to prevent the operating element 120 from moving relative to the tensioner 200. In this manner, for the operating element 120 to function properly (e.g., to move the covering 106 between the extended and retracted positions), the tensioner 200 is mounted to the adjacent structure with the tensioner 200 in the second or unlocked configuration and with the operating element 120 in a taut condition.

Figure 2:
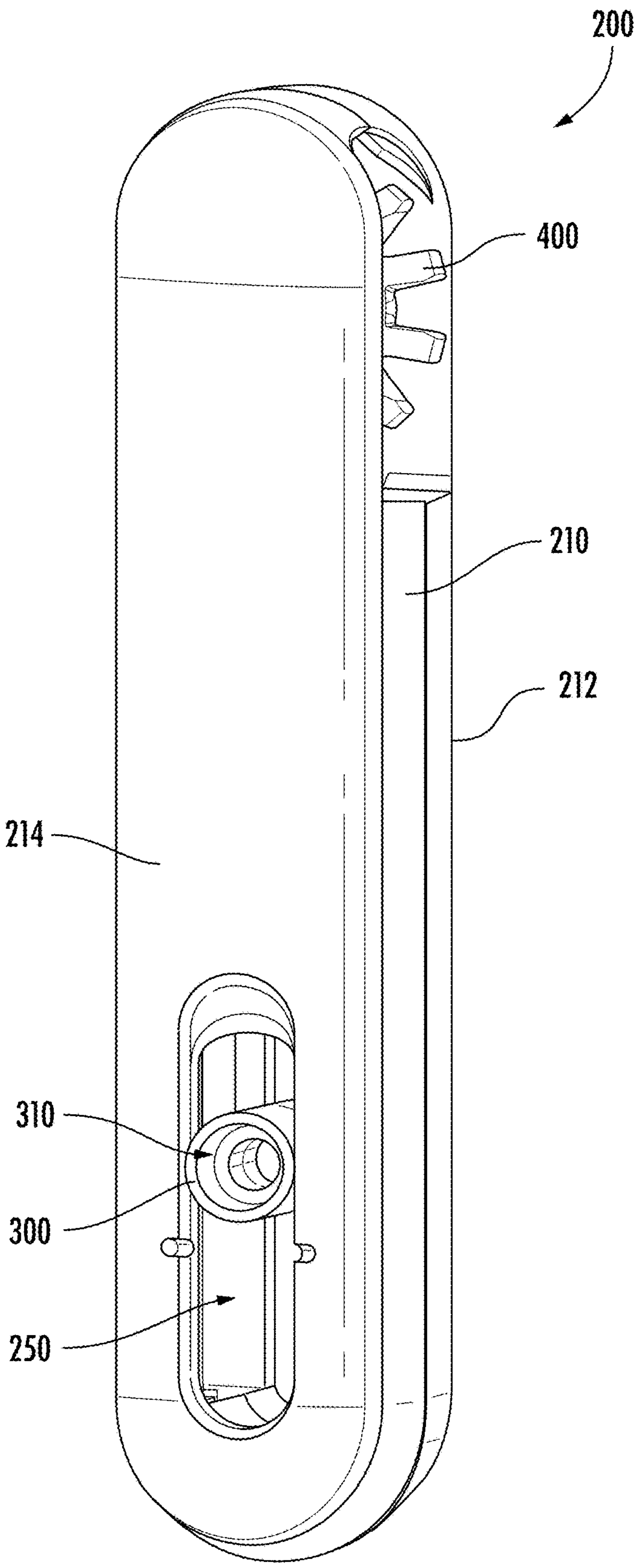
FIG. 2 is a perspective view illustrating an example of an embodiment of a tensioner in accordance with one or more features of the present disclosure, the tensioner may be used in connection with the architectural-structure covering shown in FIG. 1, the tensioner arranged and configured to operate with an operating element in the form of a bead chain.

Referring to FIG. 2, in one embodiment, as will be described in greater detail, the tensioner 200 may include a housing or body 210 (terms used interchangeably herein without the intent to limit or distinguish. The body 210 may include an elongated slot 250 formed therein for accessing a slider, a plunger, or the like 300 (terms used interchangeably herein without the intent to limit or distinguish) movably positioned within the body 210 of the tensioner 200. In use, the slider 300 is moveable between a first position and a second position. In the first position (e.g., the first or locked configuration), the slider 300 interacts with the operating element 120. Meanwhile, in the second position (e.g., the second or unlocked configuration), the slider 300 does not contact the operating element 120 thereby permitting the operating element 120 to move relative to the tensioner 200.

In use, the tensioner 200 is mounted to an adjacent structure (e.g., a window frame or the like). In use, one or more fasteners, such as a screw, a nail, a bolt, or the like, may be used to mount the tensioner 200 to a wall of a window frame or other structure. That is, for example, in the illustrated embodiment of FIG. 2, a fastener (not shown) may be inserted through an opening 310 formed in the slider 300 for mounting the tensioner 200 to the adjacent structure. In use, the tensioner 200 may be mounted to the adjacent structure with the slider 300 in the second position (e.g., the slider 300 is positioned such that it does not contact the operating element 120).

In this configuration (e.g., the second or unlocked configuration), the tensioner 200 is mounted to the adjacent structure with the operating element 120 in a taut condition. As such, with the operating element 120 in a taut condition and with the slider 300 in the second position, the operating element 120 is free to move relative to the tensioner 200 so that the covering 106 can be moved between the extended and retracted positions. However, in use, if the tensioner 200 is decoupled from the adjacent structure (e.g., the tensioner 200 is not mounted to the adjacent structure) or if the tensioner 200 is mounted incorrectly such that, for example, the operating element 120 is held in a non-taut condition, the slider 300 is biased to the first position (e.g., the slider 300 moves into contact with the operating element 120) to prevent the operating element 120 from moving relative to the slider 300 and hence the tensioner 200.

Figure 3:
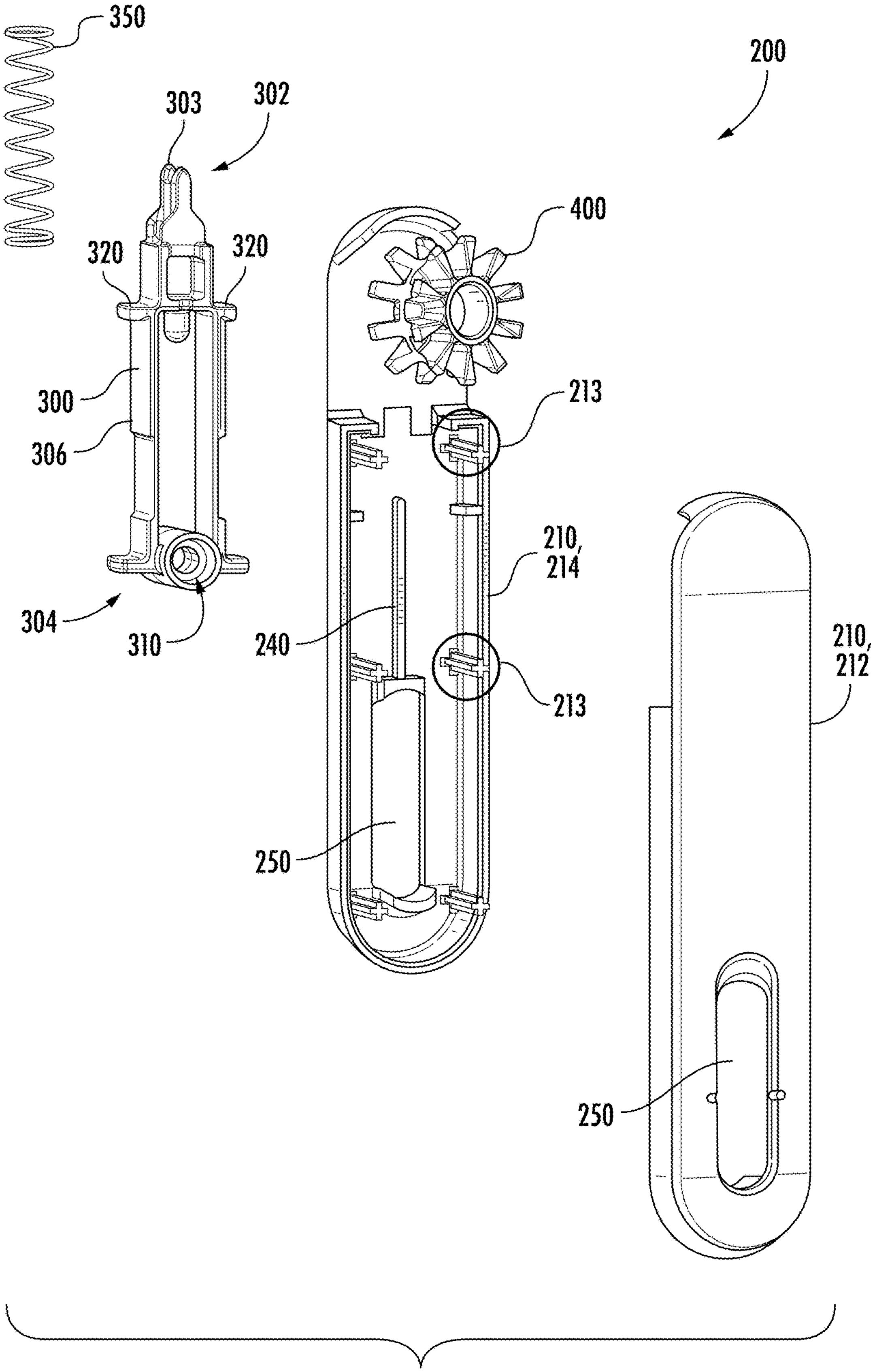
FIG. 3 is an exploded perspective view of the tensioner shown in FIG. 2.
Figure 4:
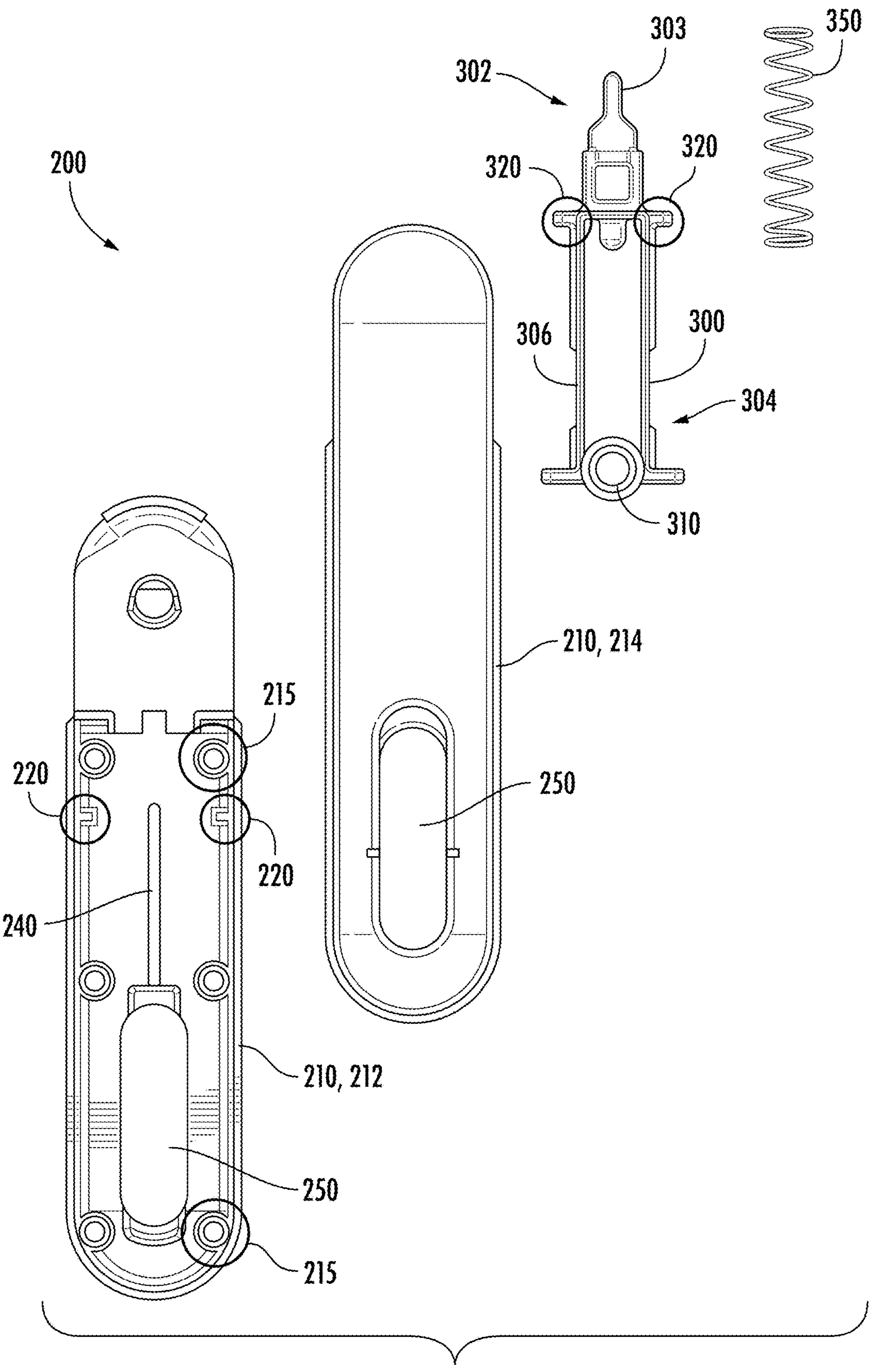
FIG. 4 is an alternate exploded perspective view of the tensioner shown in FIG. 2.

In some embodiments, with reference to FIGS. 2-4, the tensioner 200 includes a body 210, which may include first and second body members 212, 214. The tensioner 200 may also include a slider 300 movably positioned within the body 210, a biasing member 350 for biasing the slider 300 in the first position, and a roller 400. As will be described in greater detail, in the first position, the slider 300 is adapted and configured to operate in conjunction with the roller 400 to secure a position of the operating element 120 relative to the slider 300 to lock the position of the operating element 120.

Referring to the illustrated embodiment in FIGS. 2-4, the first and second body members 212, 214 may be coupled to each other by any suitable mechanism now known or hereafter developed such as, for example, fasteners, etc. In the illustrated embodiment, the first and second body members 212, 214 may include a plurality of interconnecting projections and recesses 213, 215 so that the first and second body members 212, 214 can be coupled together. In addition, the interaction between the plurality of interconnecting projections and recesses 213, 215 may keep the first and second body members 212, 214 from being pulled apart. Thus arranged, in use, the first and second body members 212, 214 are arranged and configured to prevent separation between the first and second body members 212, 214.

Figure 5:
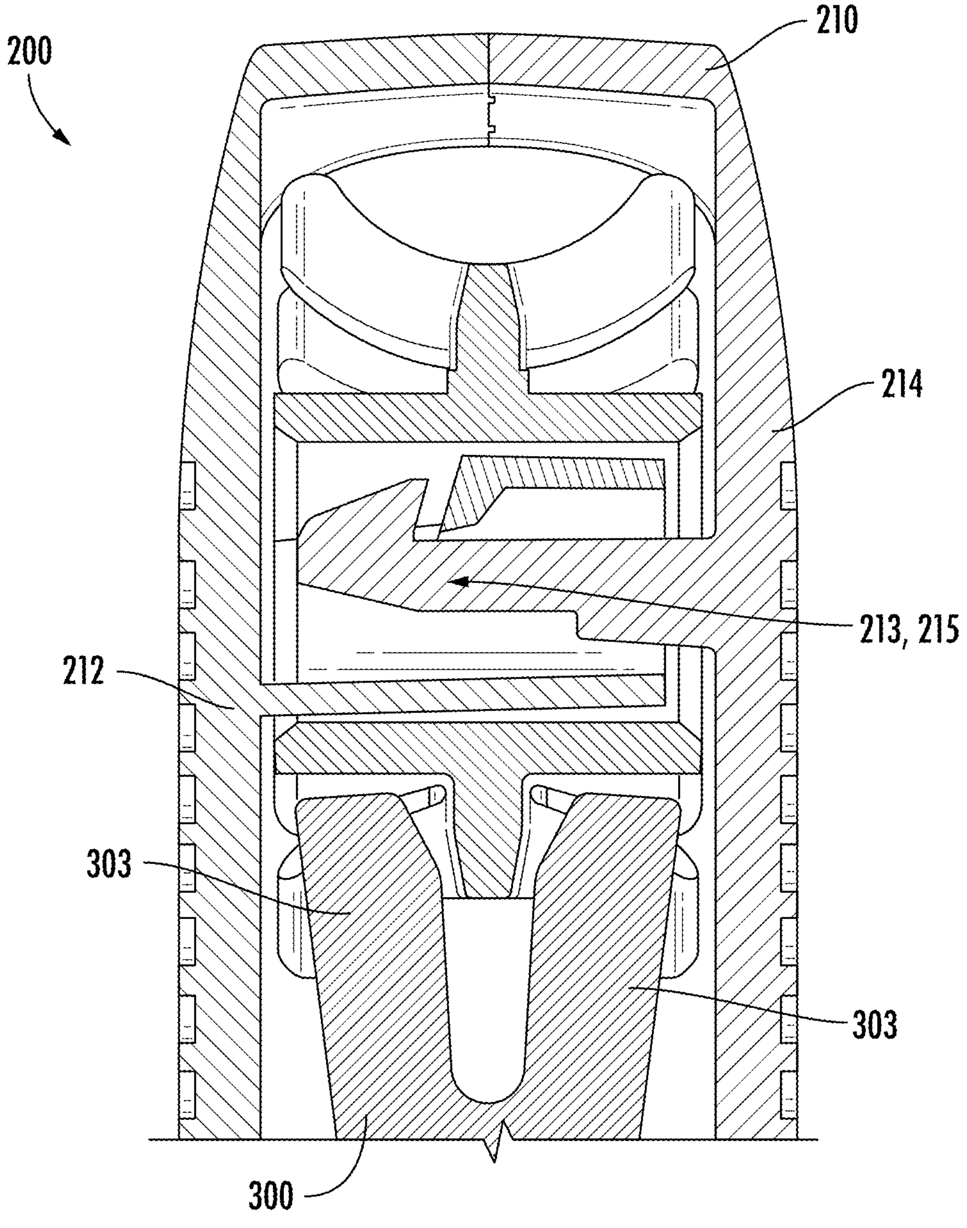
FIG. 5 is a detailed, cross-sectional side view of the tensioner shown in FIG. 2, FIG. 5 illustrating one example of interconnecting snap-fit connectors.

In addition, in some embodiments, the first and second body members 212, 214 may be arranged and configured with one or more interconnecting snap-fit connectors such that attempts to decouple the first and second body members 212, 214 results in permanent breakage of at least one of the snap-fit connectors. That is, for example, and with reference to FIG. 5, one or more of the interconnecting projections and recesses 213, 215 may be configured as a one-way snap-fit connector so that attempts to decouple or separate the first and second body members 212, 214 from each other results in breaking of the snap-fit connector. For example, the hook portion of the one-way snap may be arranged and configured to break thereby preventing re-engagement of the first and second body members 212, 214. Thus arranged, the tensioner 200 may be considered to incorporate a tamper resistant or tamper indicating mechanism. That is, in some examples, during assembling, the second body member 214 may be arranged and configured to receive the slider 300, the biasing member (e.g., spring) 350, and the roller 400. Thereafter, using the interconnecting projections and recesses 213, 215, the first body member 212 may be coupled to the second body member 214, although the opposite is envisioned as well. As such, the first body member 212 may be snap-fitted to the second body member 214. However, with reference to FIG. 5, in use, if a user attempts to decouple the first and second body members 212, 214 from each other, one or more one-way snap-fit connectors are arranged and configured to break indicating that the tensioner 200 has been tampered with.

Figure 6:
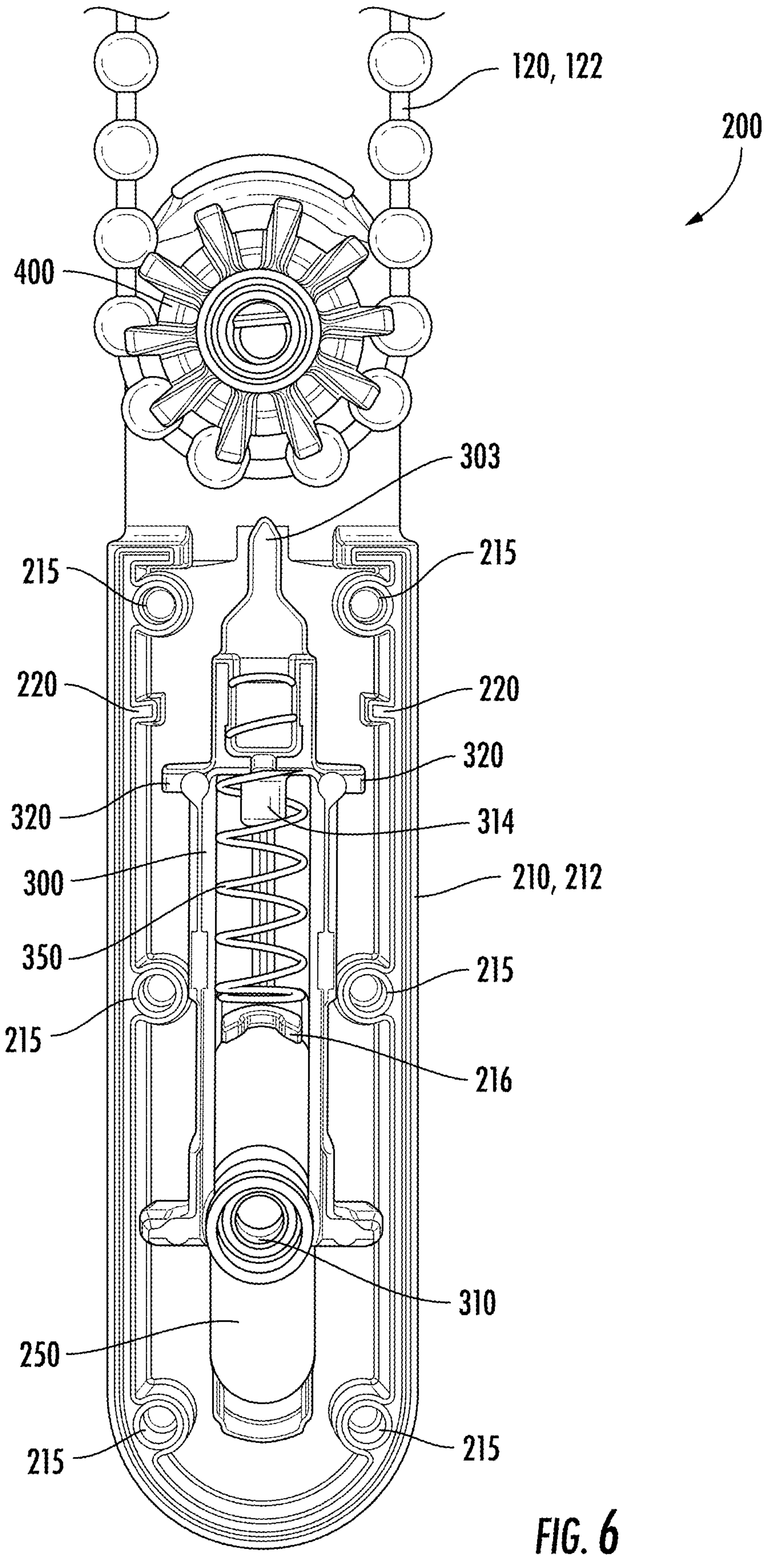
FIG. 6 is a frontal view of the tensioner shown in FIG. 2, the body of the tensioner being partially removed for illustrative purposes, the slider shown in a second or unlocked position.

Referring to FIGS. 6-11, in the illustrated embodiment, the slider 300 is movable between a first position (illustrated in FIGS. 7-11) and a second position (illustrated in FIG. 6). In the first position, the slider 300 is in contact with the operating element 120, which in connection with this embodiment is in the form of a bead chain 122 including a plurality of beads and interconnecting links as will be readily understood by one of ordinary skill in the art. In the first position, movement of the bead chain 122 relative to the tensioner 200 is prevented. However, in the second position (illustrated in FIG. 6), the slider 300 is moved (e.g., retracted) relative to the body 210 of the tensioner 200 so that the slider 300 no longer contacts the bead chain 122 (e.g., the slider 300 is moved or retracted a sufficient distance away from the roller 400 so that the bead chain 122 can pass through the tensioner 200 unaffected). As such, in the second position, the bead chain 122 can move relative to the tensioner 200. In one embodiment, the basing member 350 biases the slider 300 into the first position and thus into contact with the bead chain 122.

Figure 12A:
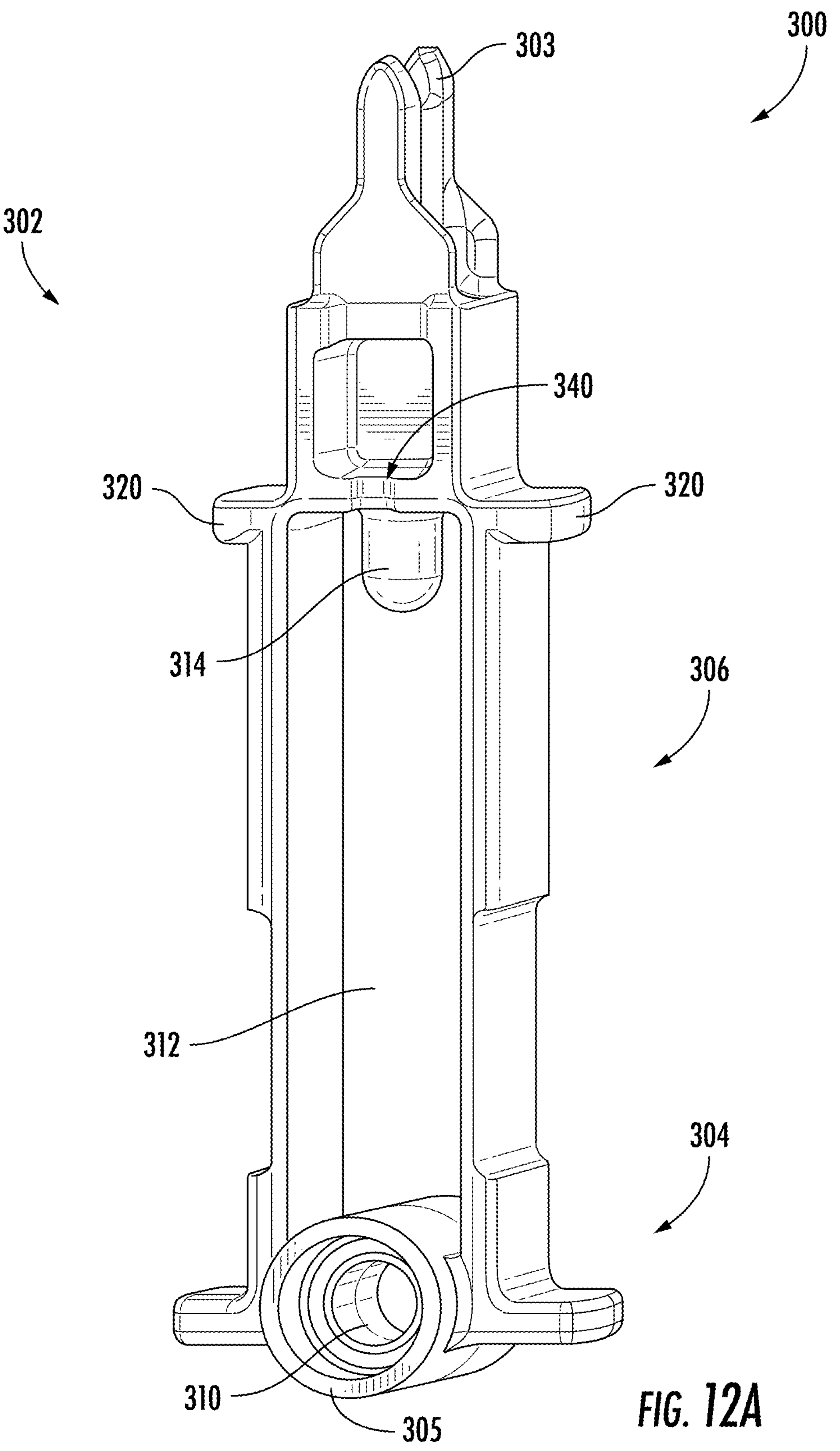
FIG. 12A is a perspective view illustrating an example of an embodiment of a slider in accordance with one or more features of the present disclosure, the slider may be used in connection with the tensioner shown in FIG. 2.
Figure 12B:
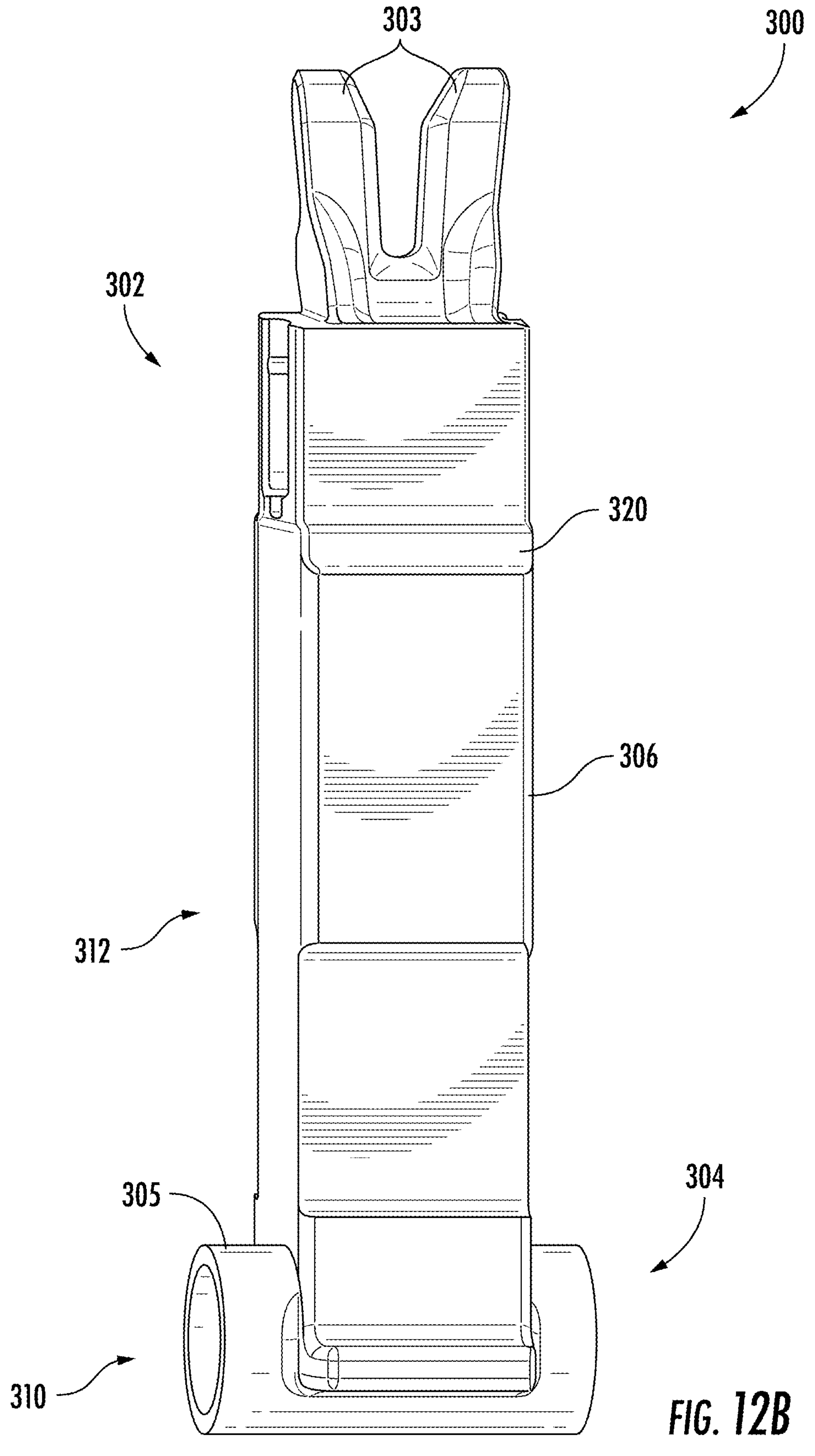
FIG. 12B is a side view of the slider shown in FIG. 12A.
Figure 12C:
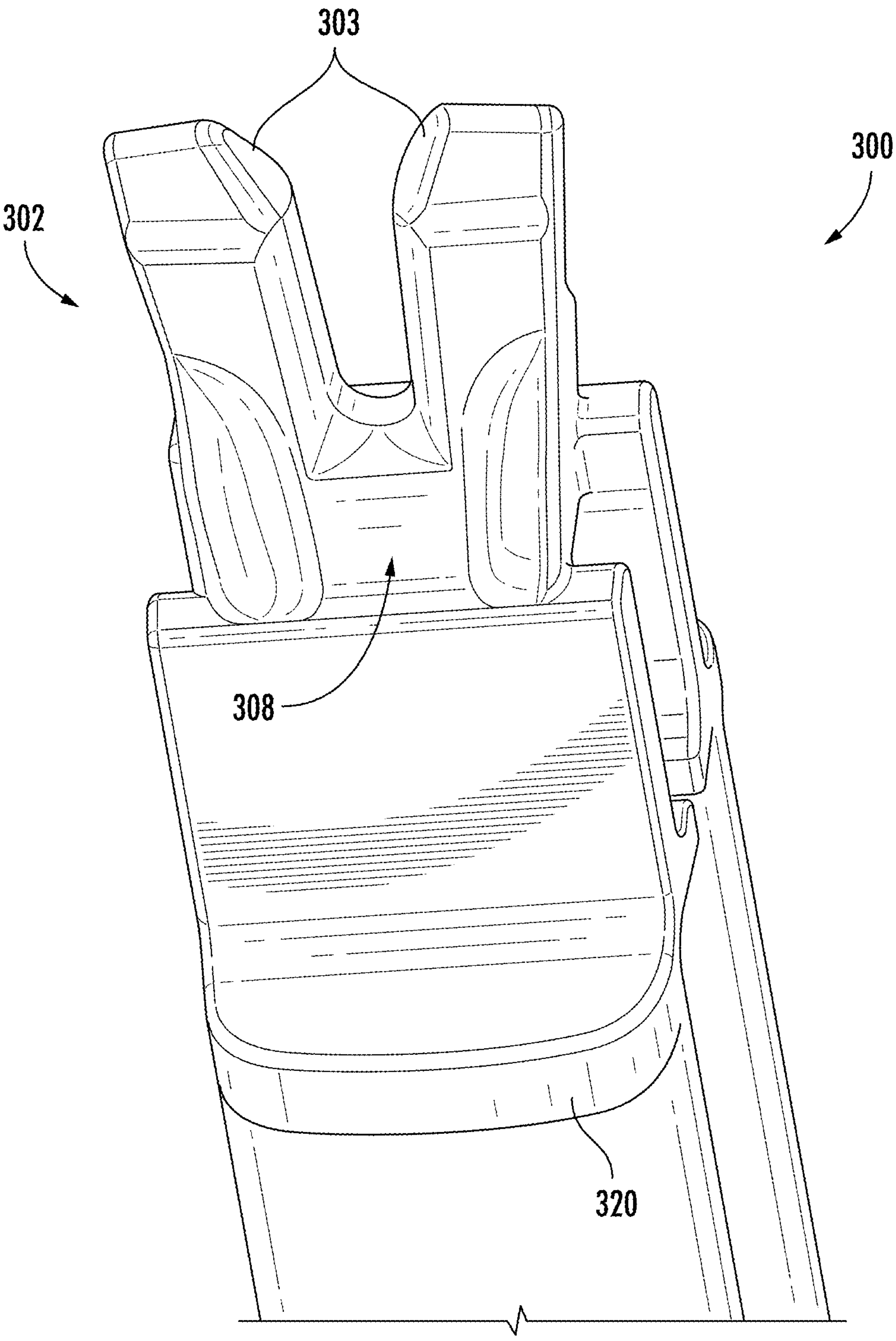
FIG. 12C is a detailed view of the slider shown in FIG. 12A.

With additional references to FIGS. 12A-12C, in the illustrated embodiment, the slider 300 includes a first end 302, a second end 304, and an intermediate portion 306 extending between the first and second ends 302, 304. The first end 302 of the slider 300 is arranged and configured to interact, engage, etc. the bead chain 122. For example, as illustrated, the first end 302 of the slider 300 may include first and second projections, tines, or the like 303. Thus arranged, the first end 302 of the slider 300 may be characterized as including a "pitch-fork" configuration. In use, the first end 302 of the slider 300 is adapted and configured for interacting with the bead chain 122. In addition, the first end 302 of the slider 300 is adapted and configured for interacting with the roller 400. That is, as will be described in greater detail below, the tines 303 are arranged and configured to be positioned in-between beads of the bead chain. In addition, the tines 303 are arranged and configured to be received in pockets 414 formed in the roller 400.

Figure 13:
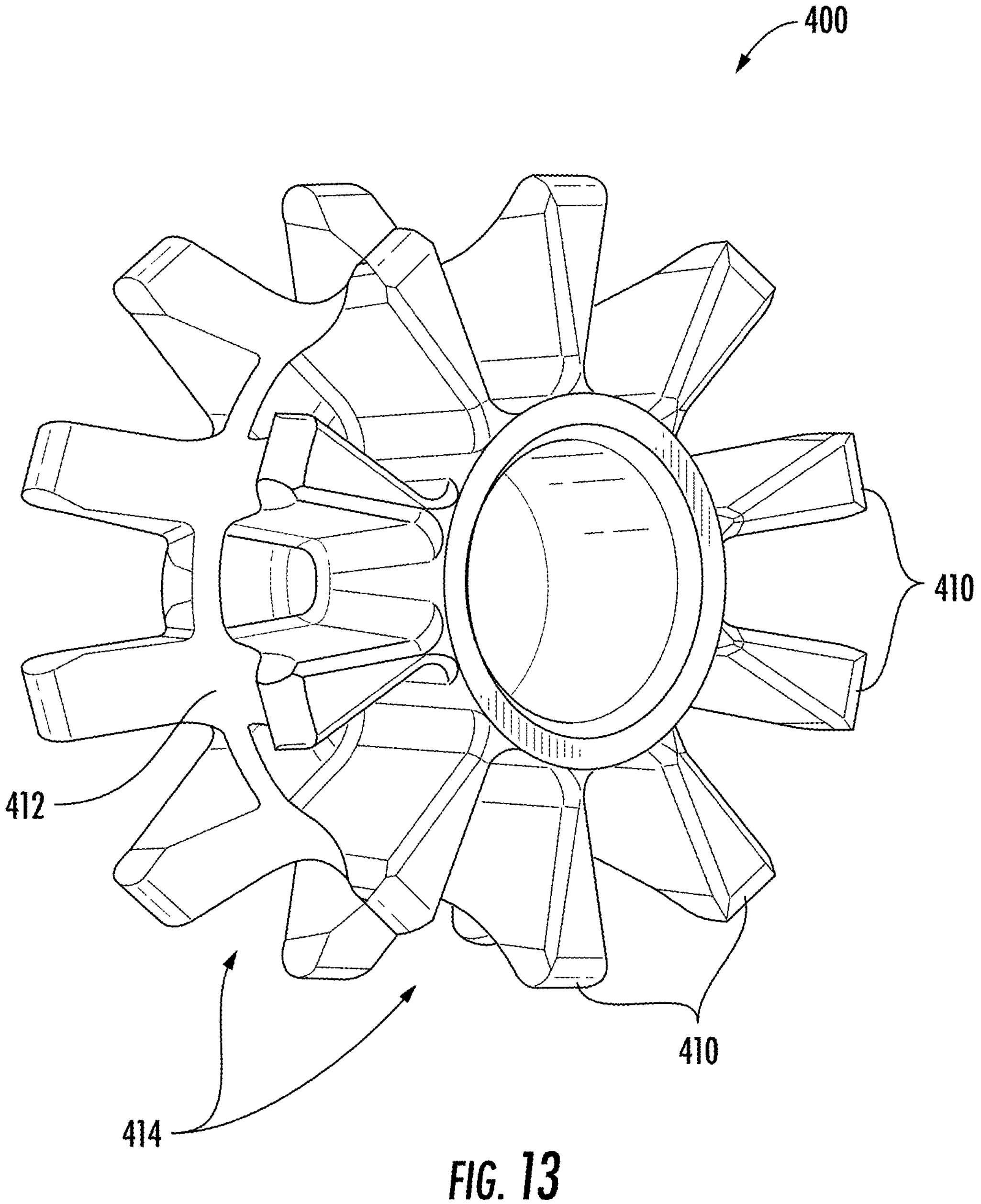
FIG. 13 is a perspective view illustrating an example of an embodiment of a roller in accordance with one or more features of the present disclosure, the roller may be used in connection with the tensioner shown in FIG. 2.

With additional reference to FIG. 13, in the illustrated embodiment, the roller 400 includes a plurality of legs, projections, or the like 410. In use, the roller 400 includes a bearing surface 412 for enabling the bead chain 122 to move there along. In addition, the plurality of legs 410 define a series of pockets 414 for receiving the tines 303 formed on the first end 302 of the slider 300. Thus arranged, in the first position, the tines 303 formed on the first end 302 of the slider 300 are adapted and configured to be received within one of the pockets 414 formed on the roller 400. In addition, the tines 303 formed on the first end 302 of the slider 300 are adapted and configured to interact with the bead chain 122. Thus arranged, in the first position, with the tines 303 contacting the plurality of legs 410 formed on the roller 400 and with the tines 303 contacting the bead chain 122, the bead chain 122 is prevented from moving relative to the tensioner 200.

As previously mentioned, the second end 304 of the slider 300 is adapted and configured to be accessed via, for example, the elongated slot 250 formed in the body 210 of the tensioner 200. As illustrated, the second end 304 of the slider 300 includes an opening 310 formed therein for receiving a fastener for mounting the tensioner 200 to, for example, an adjacent structure such as, for example, a window frame. In this manner, with the first end 302 of the slider 300 (e.g., tines 303) in contact with the bead chain 122, a user may (e.g., during mounting) move the slider 300 from the first position to the second position against the biasing force of the biasing member 350. For example, as illustrated, the second end 304 of the slider 300 includes an outwardly extending ledge 305 for positioning within the elongated slot 250 formed in the body 210. In use, the ledge 305 may project through the elongated slot 250 formed in the body 210 so that the user can grip the second end 304 of the slider 300 to move the slider 300 from the first position to the second position. Thereafter, the second end 304 of the slider 300 may be mounted to the adjacent structure with the slider 300 in the second position so that the first end 302 of the slider 300 (e.g., tines 303) does not contact the bead chain 122.

As previously mentioned, the slider 300 may be biased towards the first position so that the first end 302 of the slider 300 (e.g., tines 303) blocks or prevents movement of the bead chain 122 relative to the tensioner 200. As such, in use, when properly mounted, the tensioner 200 is positioned so that the slider 300 is in the second position so that the first end 302 of the slider 300 (e.g., tines 303) does not block or prevent movement of the bead chain 122 relative to the tensioner 200. Thus arranged, the tensioner 200 allows the bead chain 122 to move relative to the tensioner 200. However, when the tensioner 200 is decoupled from the adjacent structure or when the tensioner 200 is installed improperly, the biasing member 350 biases the slider 300 (e.g., tines 303) into contact with the bead chain 122 so that the bead chain 122 is prevented from moving relative to the tensioner 200.

The tensioner 200 may be biased towards the first position by any suitable mechanism now known or hereafter developed. As illustrated, in one embodiment, the biasing member 350 is a spring such as, for example, a coil spring, although use of other springs is envisioned. Additionally, the intermediate portion 306 of the slider 300 may include a cavity 312 for receiving the coil spring. In use, the coil spring may be located or positioned within the cavity 312 of the slider 300 between a tab 314 formed on the slider 300 (e.g., tab 314 adjacent to a first end of the cavity 312) and a tab 216 (FIGS. 6-9) formed on an inner surface of the first and/or second body members 212, 214 of the tensioner 200.

Figure 7:
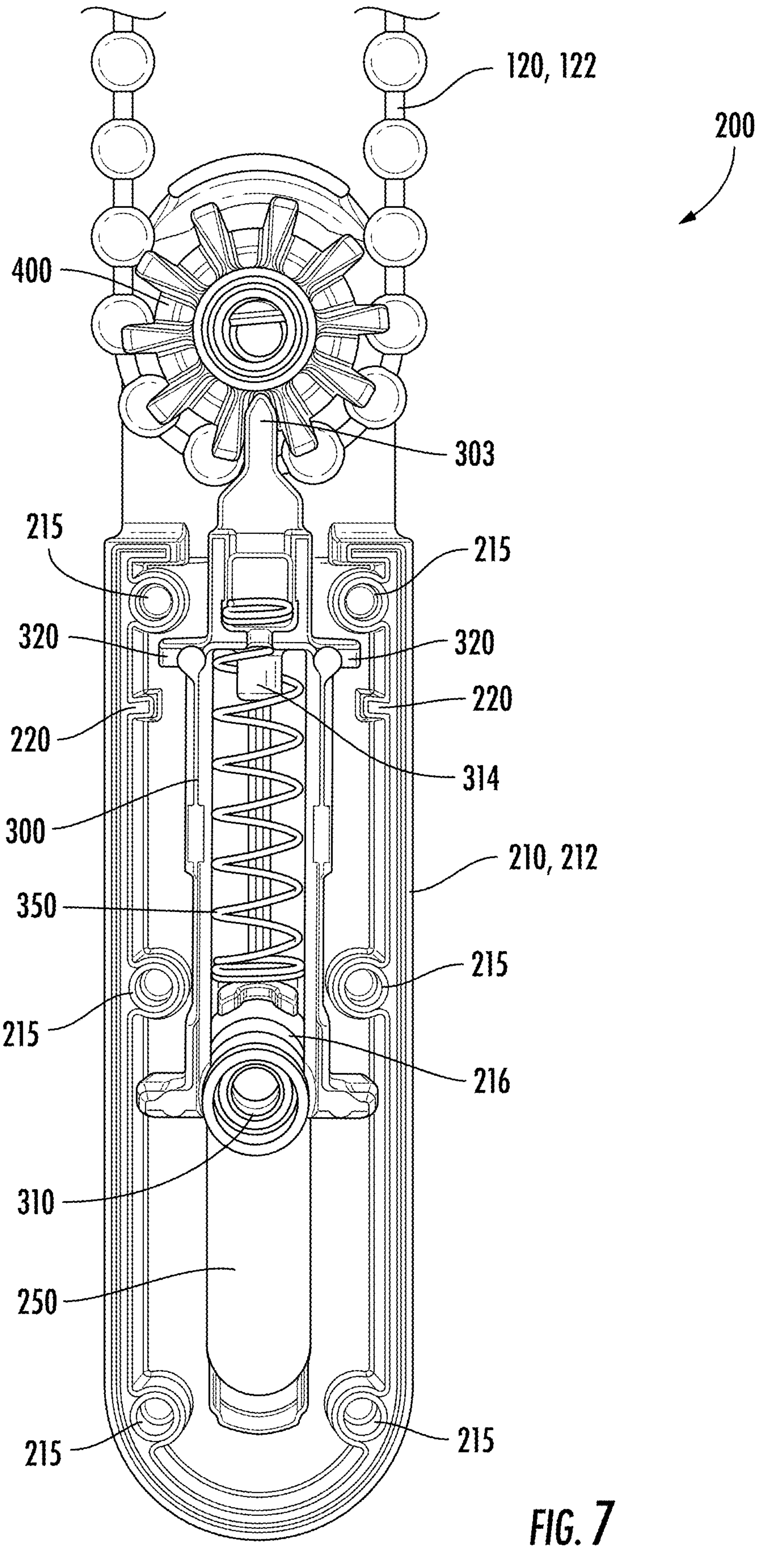
FIG. 7 is a frontal view of the tensioner shown in FIG. 2, the body of the tensioner being partially removed for illustrative purposes, the slider shown in a first or locked position.
Figure 8:
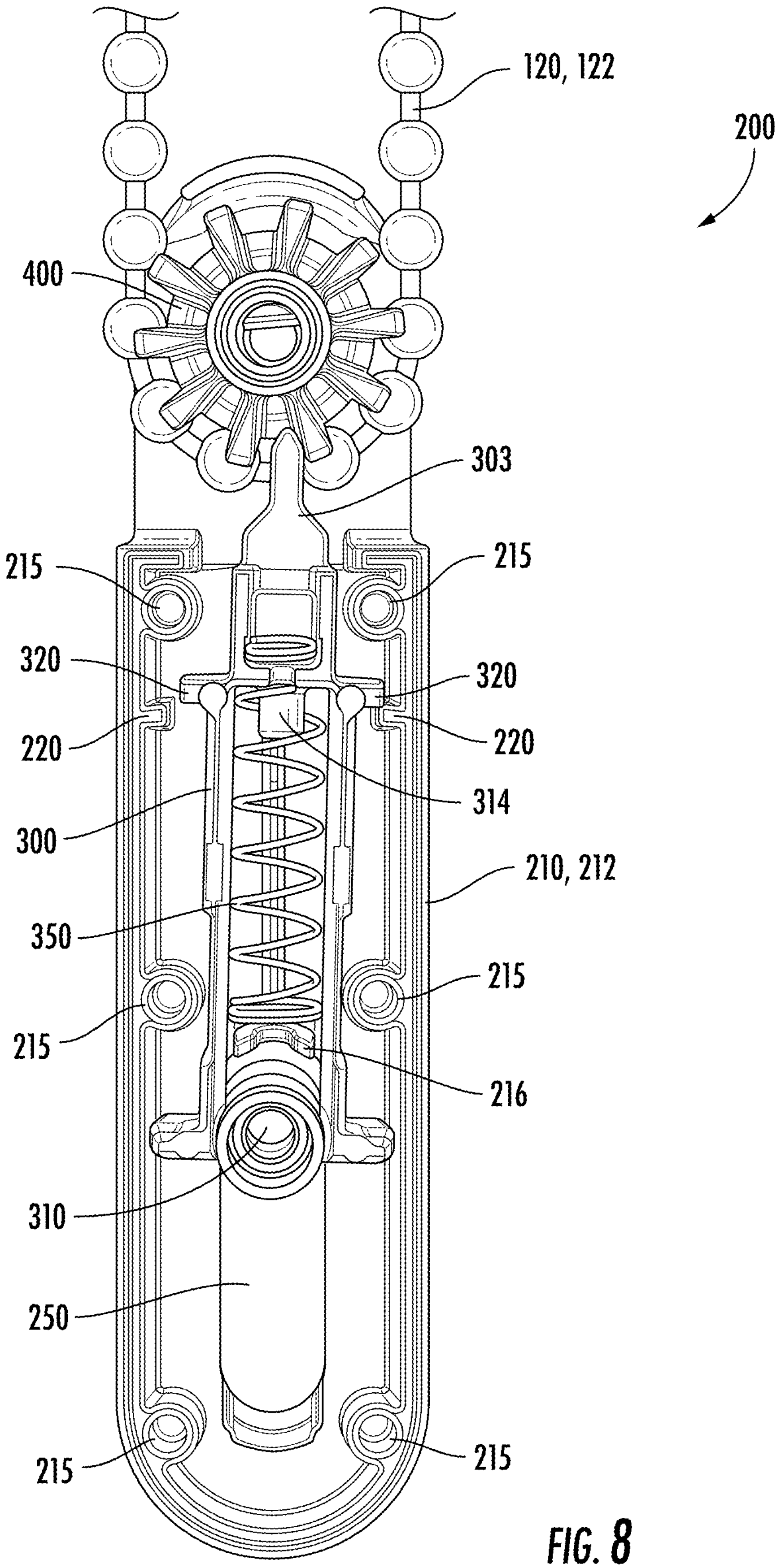
FIG. 8 is a frontal view of the tensioner shown in FIG. 2, the body of the tensioner being partially removed for illustrative purposes, the slider shown in the first or locked position with the slider in a partially tilted position.
Figure 9:
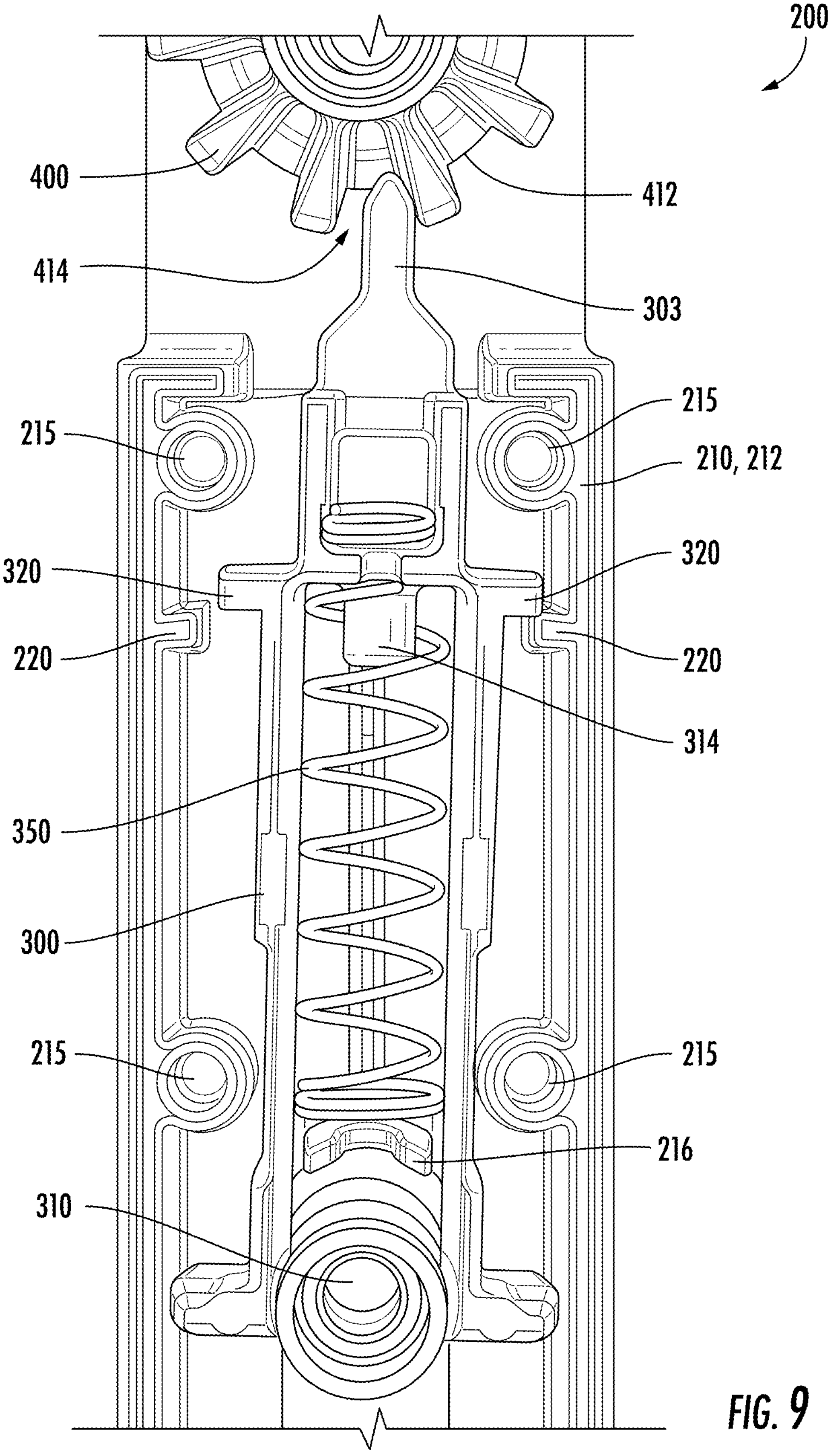
FIG. 9 is a frontal, detailed view of the tensioner shown in FIG. 8.
Figure 10:
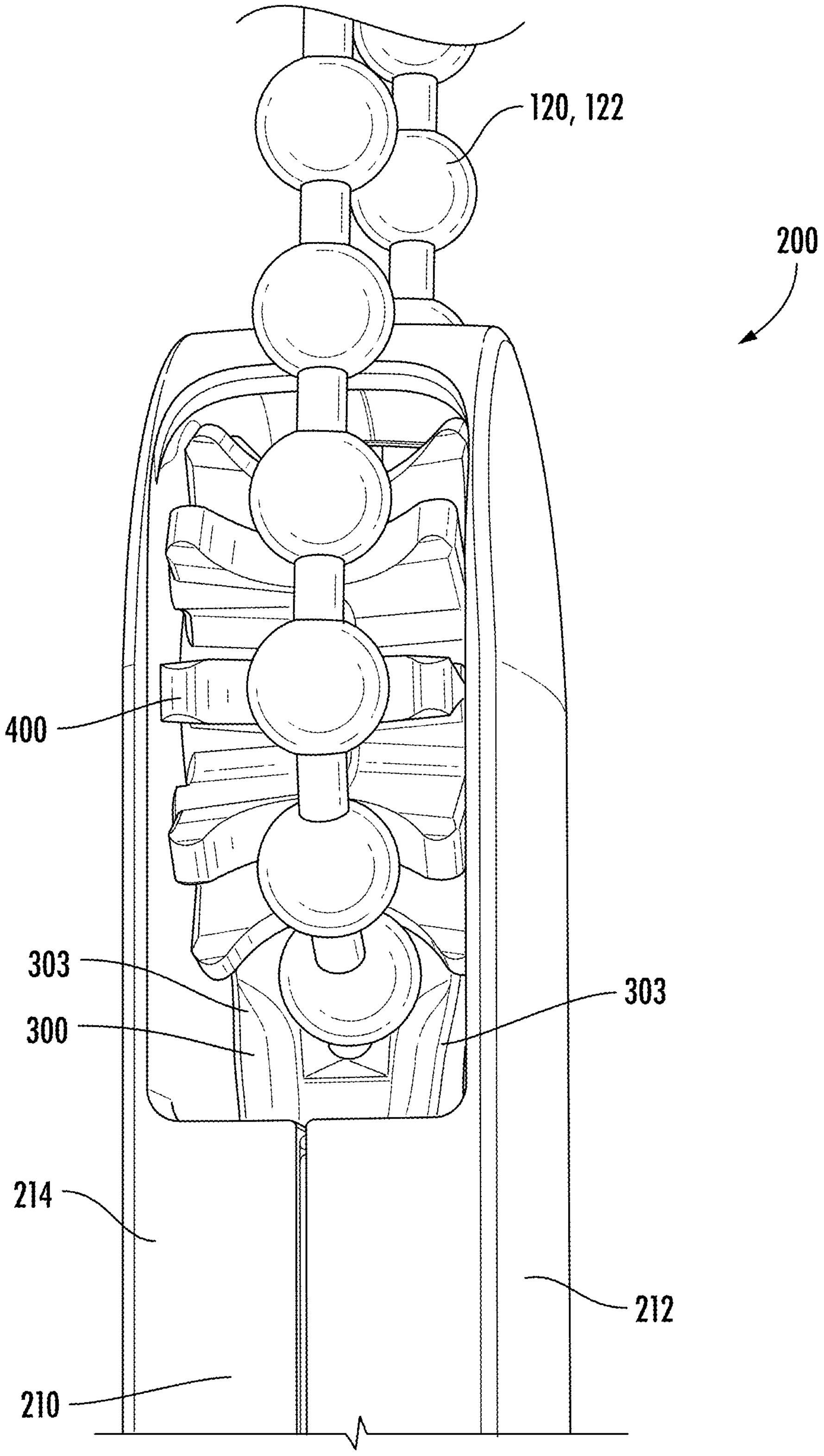
FIG. 10 is a detailed, side view of the tensioner shown in FIG. 2, the slider shown in the first or locked position.
Figure 11:
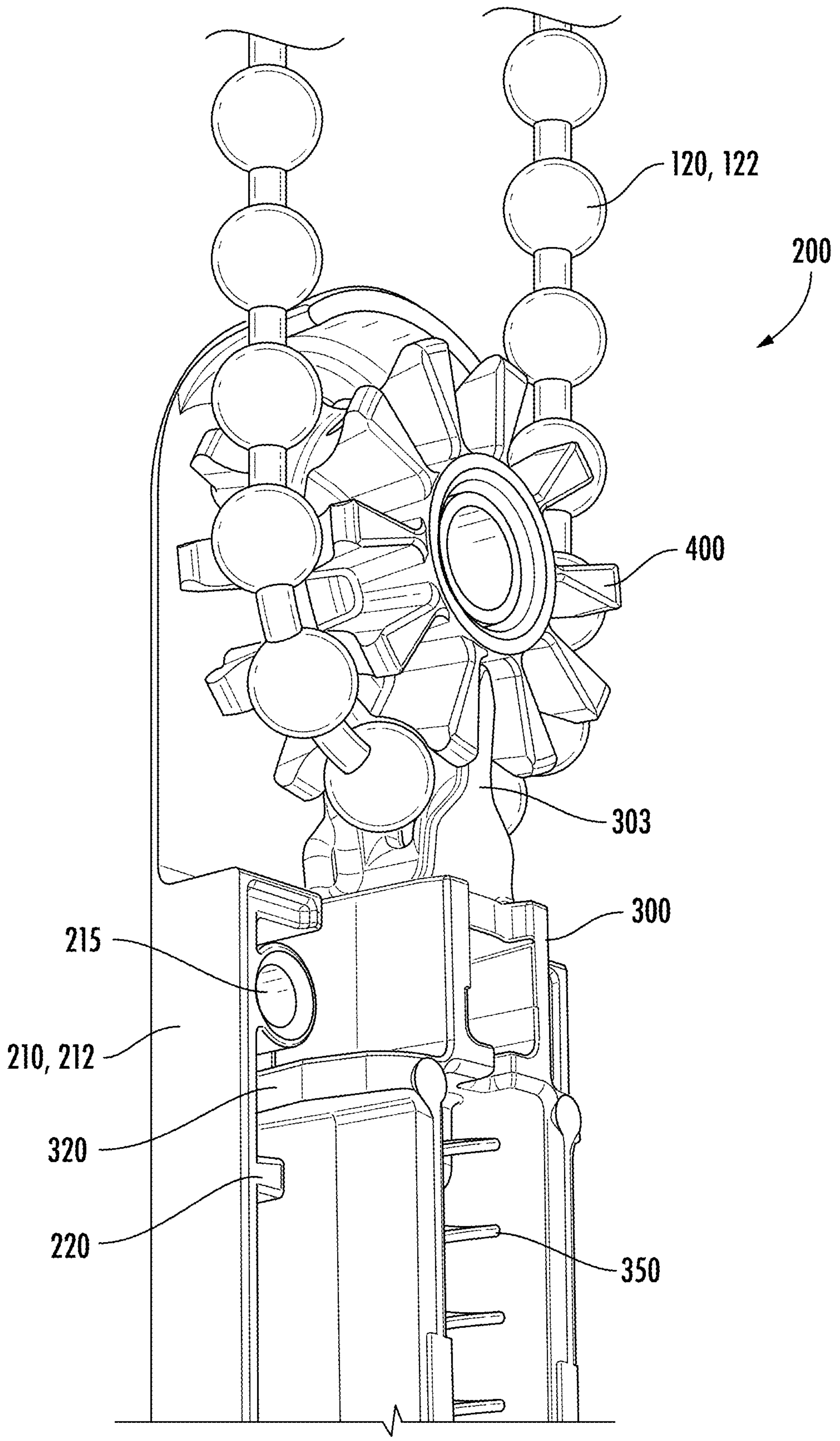
FIG. 11 is a detailed, side view of the tensioner shown in FIG. 2, the body of the tensioner being partially removed for illustrative purposes, the slider shown in the first or locked position.

In accordance with one or more features of the present disclosure and with reference to FIGS. 7-9, in use, with the tensioner 200 decoupled from the adjacent structure or with the tensioner 200 installed improperly, movement of the bead chain 122 causes the first end 302 of the slider 300 to move, tilt, pivot, angle, or the like, relative to the tensioner 200 and/or relative to the second end 304 of the slider 300. Thus arranged, one or more stops, projections, ledges, or the like 320 (terms used interchangeably without the intent to distinguish or limit) formed on the slider 300 align and/or contact one or more stops, projections, ledges, or the like 220 formed on the body 210. Thus arranged, movement of the slider 300 from the first position (FIGS. 7-11) to the second position (FIG. 6) is prevented. That is, as best illustrated in FIGS. 7-9, with the tensioner 200 decoupled from the adjacent structure or with the tensioner 200 installed improperly, movement of the bead chain 122 causes the first end 302 of the slider 300 to move (e.g., pivot) relative to the tensioner 200 (e.g., the first end 302 of the slider 300 moves (e.g., pivots) relative to the second end 304 of the slider 300) so that the slider 300 tilts, which causes one or more stops 320 on the slider 300 to align with one or more stops 220 formed on the body 210 of the tensioner 200 so that movement of the slider 300 from the first position to the second position is prevented (e.g., stop 320 formed on the slider 300 contacts the stop 220 formed on the body 210 prior to the tines 303 releasing the bead chain 122). Thus arranged, with the tensioner 200 decoupled from the adjacent structure or with the tensioner 200 installed improperly, movement of the bead chain 122 causes the slider 300 to tilt, which causes the stop 320 formed on the slider 300 to align with the stop 220 formed on the body 210, which prevents the slider 300 from retracting or moving to the second position, which prevents the slider 300 from releasing the bead chain 122. In use, the length of the tines 303 formed on the first end 302 of the slider 300 are of a sufficient overall length such that the stops 320 formed on the slider 300 contact the stops 220 formed on the body 210 prior to the tines 303 releasing the bead chain 122. In essence, the length of the tines 303 are arranged and configured to interact with the beads for a sufficient period of time to enable the stop 320 formed on the slider 300 to contact the stop 220 formed on the body 210.

In addition, the tensioner 200 may include one or more features for guiding movement of the slider 300 relative to the body 210 of the tensioner 200. For example, with reference to FIGS. 6-9, the body 210 may include a longitudinal extending rib, rail, ledge, projection, or the like 240 (terms used interchangeably herein without the intent to limit or distinguish). The slider 300 may include a corresponding slot 340 arranged and configured to interact with the rail 240, although it is envisioned that the slot may be formed on the body and the rail may be formed on the slider. In use, engagement of the rail 240 and slot 340 guides movement of the slider 300 between the first and second positions. For example, with the tensioner 200 properly installed, movement of the slider 300 from the first position to the second position is guided by the interaction between the rail 240 and the slot 340. In one embodiment, the rail 240 is arranged and configured to interact with the slot 340 once the stop 320 formed on the slider 300 has moved past the stop 220 formed on the body 210.

As will be appreciated by one of ordinary skill in the art, direction of movement of the slider 300 relative to the body 210 (e.g., direction of tilting in the lateral direction (i.e., left or right)) depends on direction of movement of the bead chain 122. That is, when a user pulls on the bead chain 122, drag is created, which causes the slider 300 to tilt. The direction of tilt being dependent on which downward depending segment or loop of the bead chain 122 is being moved. Movement of the bead chain 122 causes one of the stops 320 formed on the slider 300 to align with one of the stops 220 formed on the body 210, which prevents the slider 300 from moving to the second position, which prevents the slider 300 from releasing the bead chain 122 (e.g., beads on the bead chain cannot move past the tines 303 formed on the first end 302 of the slider 300).

With reference to FIG. 12C, in some embodiments, the first end 302 of the slider 300 may include a reinforced yoke 308 arranged and configured to receive a bead of the bead chain 122. For example, the first end 302 of the slider 300 may include reinforcement ribs such as, for example, horizontally extending ribs, arranged and configured to prevent the tines 303 from flexing. Thus arranged, increased retention strength has been found.

With reference to FIG. 13, in use, the roller 400 is arranged and configured to be rotatably coupled to the body 210. For example, as illustrated, the roller 400 may include a bore 402 arranged and configured to receive a post extending from one of the first and second body members 212, 214.

Thus arranged, in accordance with one or more features of the present disclosure, with the tensioner 200 not installed or installed improperly, the operating element 120 (e.g., bead chain 122) is prevented from moving relative to the tensioner 200.

With reference to FIGS. 14-21, an alternate embodiment of a tensioner 500 is illustrated. In use, the tensioner 500 is substantially similar to tensioner 200 described above except as provided herein. As such, for sake of brevity, some description of the tensioner 500 is omitted herefrom. As previously mentioned, in use, the architectural-structure covering may include an operating element 120, which, in use, is operatively associated with an operating system (not shown) to move the covering 106 between the extended and retracted positions. As previously illustrated and described in connection with tensioner 200, the operating element 120 was in the form of a bead chain 122. In accordance with one or more features of the present disclosure, the operating element 120 can be in the form of an operating cord 124. In use, the tensioner 500 is adapted and configured to receive a portion of the operating cord 124.

Similar to tensioner 200, tensioner 500 is movable between a first configuration and a second configuration. In the first configuration, the operating cord 124 is secured relative to the tensioner 500 (e.g., prevented from moving) while in the second configuration, the operating cord 124 is freely movable relative to the tensioner 500. That is, the tensioner 500 is adapted and configured to enable the operating cord 124 to be locked and unlocked against relative movement with respect to the tensioner 500. In the unlocked or second configuration (FIG. 15), the operating cord 124 is permitted to move sufficiently relative to the tensioner 500 so that the covering 106 can move between the extended and retracted positions. In the locked or first configuration (FIGS. 16-19), the operating cord 124 is prohibited or prevented from moving sufficiently relative to the tensioner 500. In this manner, with the tensioner 500 in the unlocked configuration, the operating cord 124 can be moved relative to the tensioner 500 so that the covering 106 can be moved between the extended and retracted positions. In use, the tensioner 500 is in the unlocked configuration when properly mounted to an adjacent structure. However, in use, if the tensioner 500 is decoupled from the adjacent structure (e.g., the tensioner 500 is not mounted to the adjacent structure) or if the tensioner 500 is mounted incorrectly such that, for example, the operating cord 124 is held in a non-taut condition, the tensioner 500 is biased to the first or locked configuration to prevent the operating cord 124 from moving relative to the tensioner 500. In this manner, for the operating cord 124 to function properly (e.g., to move the covering 106 between the extended and retracted positions), the tensioner 500 is mounted to the adjacent structure with the slider 600 in the second or unlocked position with the operating cord 124 in a taut condition.

Figure 14:
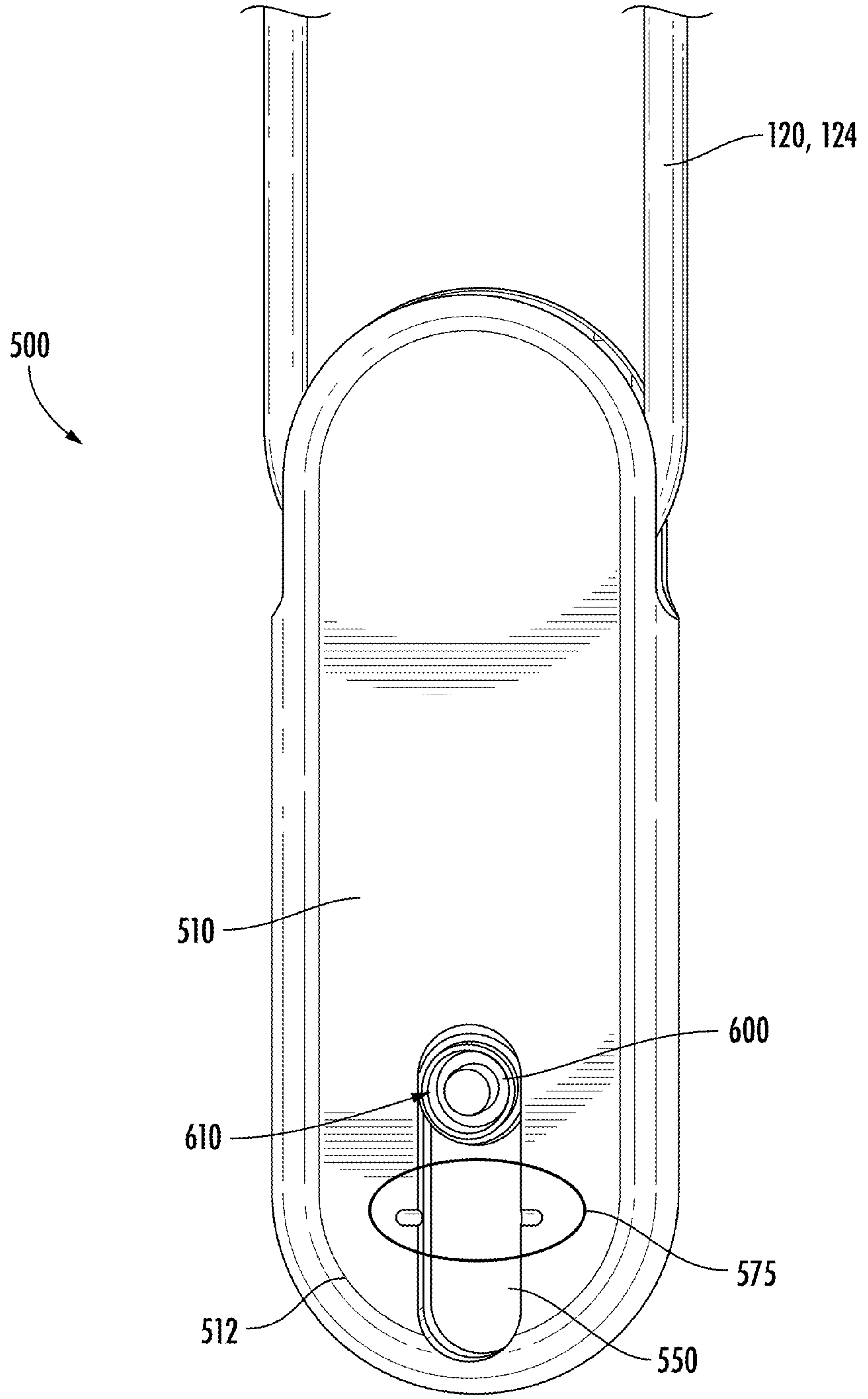
FIG. 14 is a perspective view illustrating an alternate example of an embodiment of a tensioner in accordance with one or more features of the present disclosure, the tensioner may be used in connection with the architectural-structure covering shown in FIG. 1, the tensioner arranged and configured to operate with an operating element in the form of an operating cord.

Referring to FIG. 14, in one embodiment, the tensioner 500 may include a body 510 including an elongated slot 550 formed therein for accessing a slider 600 movably positioned within the body 510 of the tensioner 500. In use, as previously mentioned, the slider 600 may be moved from a first position to a second position such that the slider 600 no longer contacts the operating cord 124, thereby permitting the operating cord 124 to move relative to the tensioner 500.

As previously mentioned, in use, a fastener may be used to mount the tensioner 500 to a wall or other adjacent structure. That is, for example, a fastener (not shown) may be inserted through an opening 610 formed in the slider 600 for mounting the tensioner 500 to the adjacent structure. In use, the tensioner 500 may be mounted to the adjacent structure with the slider 600 in the second position (e.g., the slider 600 is positioned such that it does not contact the operating cord 124). Additionally, as best illustrated in FIG. 14, in some embodiments, the body 510 of the tensioner 500 may include indicia 575 thereon to indicate a position for mounting the second end 604 of the slider 600 relative to the body 510 to ensure that the slider 600 is in the second position.

As previously mentioned, the tensioner 500 is mounted to the adjacent structure with the operating cord 124 in a taut condition. As such, with the operating cord 124 in a taut condition and with the slider 600 in the second position, the operating cord 124 is free to move relative to the tensioner 500 so that the covering 106 can be moved between the extended and retracted positions. However, in use, if the tensioner 500 is decoupled from the adjacent structure (e.g., the tensioner 500 is no longer mounted to the adjacent structure) or if the tensioner 500 is mounted incorrectly such that, for example, the operating cord 124 is in a non-taut condition, the slider 600 is biased to the first position (e.g., the slider 600 moves into contact with the operating cord 124) to prevent the operating cord 124 from moving relative to the slider 600 and hence the tensioner 500.

In some embodiments, as previously mentioned, the tensioner 500 may include a body 510 including first and second body members 512, 514. The tensioner 500 also includes a slider 600 movably positioned within the body 510, a biasing member 650 for biasing the slider 600 in the first position, and a bearing 700. As will be described in greater detail, in the first position, the slider 600 is adapted and configured to operate in conjunction with the bearing 700 to secure the operating cord 124 relative to the slider 600 to lock a position of the operating cord 124.

As previously mentioned, the first and second body members 512, 514 may be coupled to each other by any suitable mechanism now known or hereafter developed such as, for example, fasteners, interconnecting projections and recesses, etc. In addition, as previously mentioned, in some embodiments, the first and second body members 512, 514 may be arranged and configured with one or more interconnecting snap-fit connectors such that attempts to decouple the first and second body members 512, 514 results in permanent breakage. Thus arranged, the tensioner 500 may be considered to incorporate a tamper resistant or tamper indicating mechanism.

Figure 15:
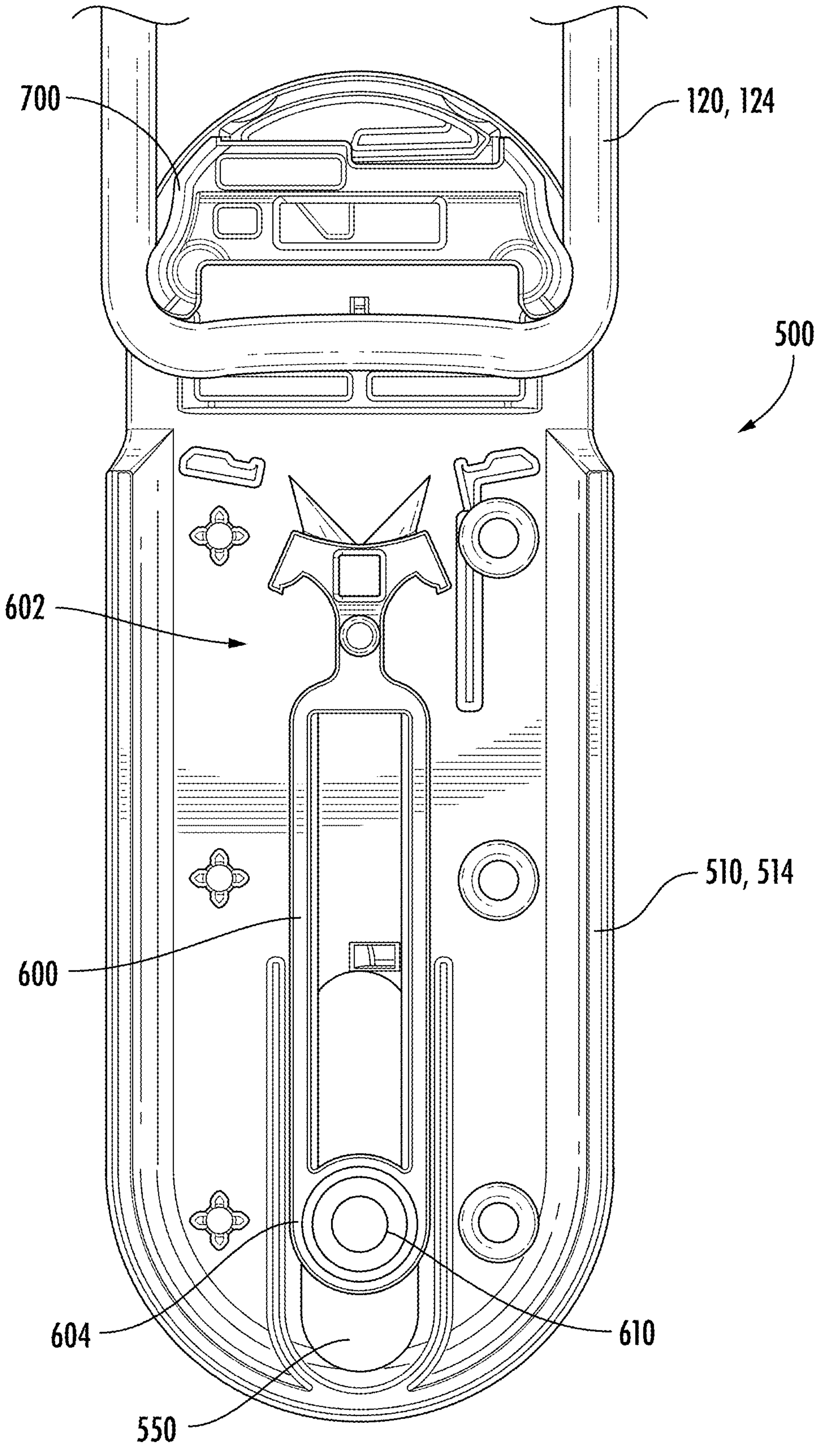
FIG. 15 is a frontal view of the tensioner shown in FIG. 14, the body of the tensioner being partially removed for illustrative purposes, the slider shown in a second or unlocked position.
Figure 16:
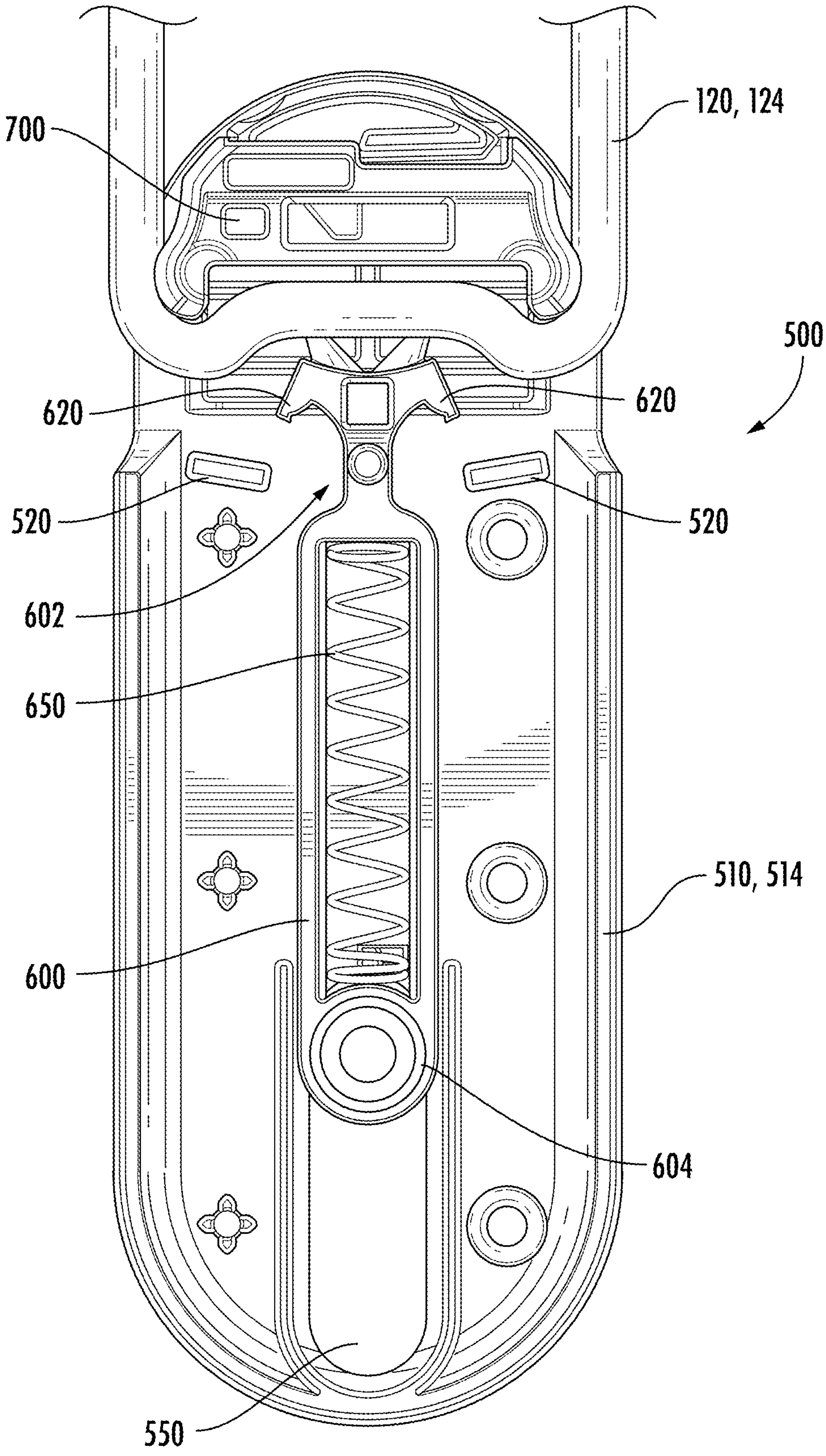
FIG. 16 is a frontal view of the tensioner shown in FIG. 14, the body of the tensioner being partially removed for illustrative purposes, the slider shown in a first or locked position.
Figure 17:
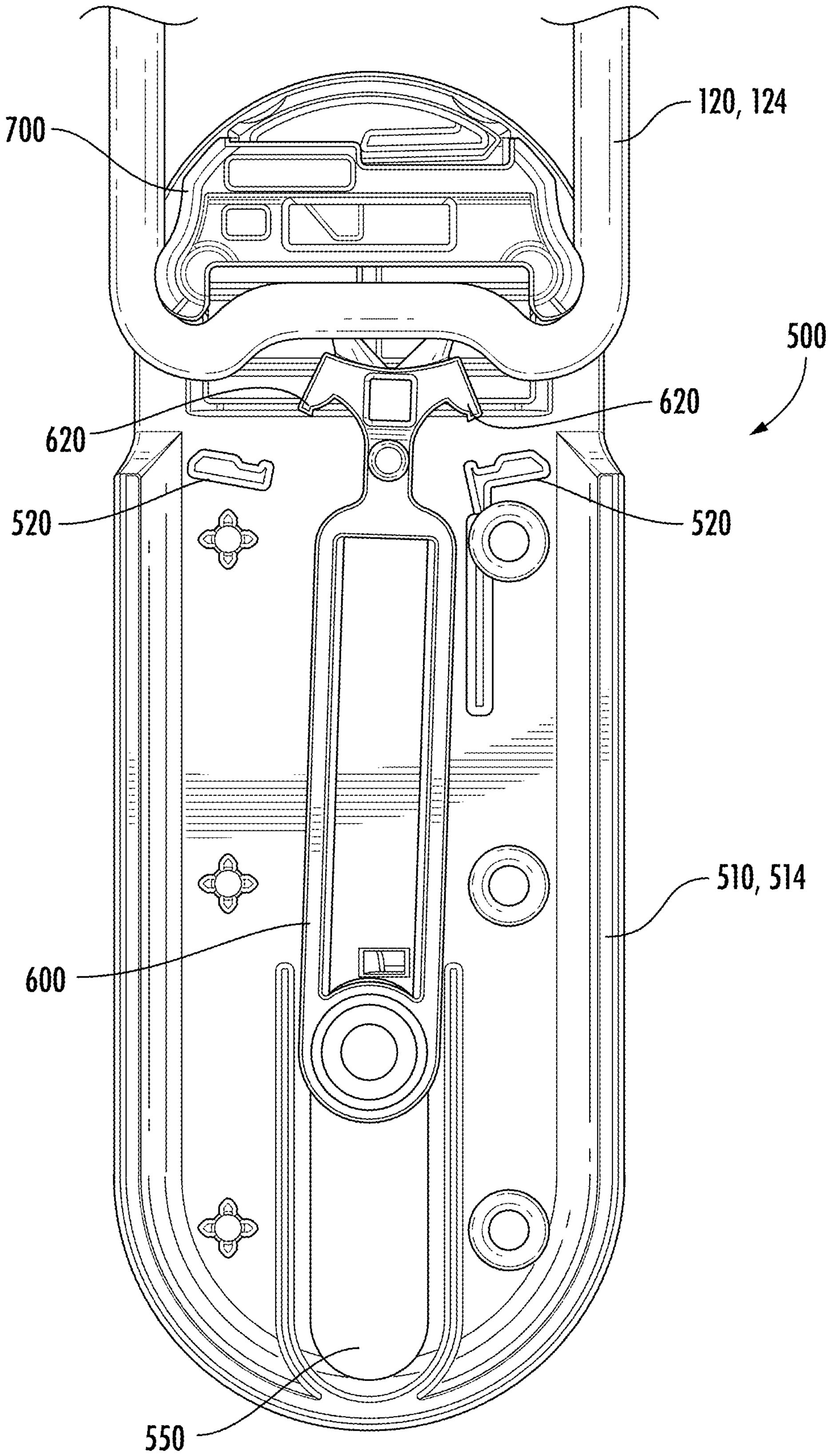
FIG. 17 is a frontal view of the tensioner shown in FIG. 14, the body of the tensioner being partially removed for illustrative purposes, the slider shown in the first or locked position with the slider in a partially tilted position.
Figure 18:
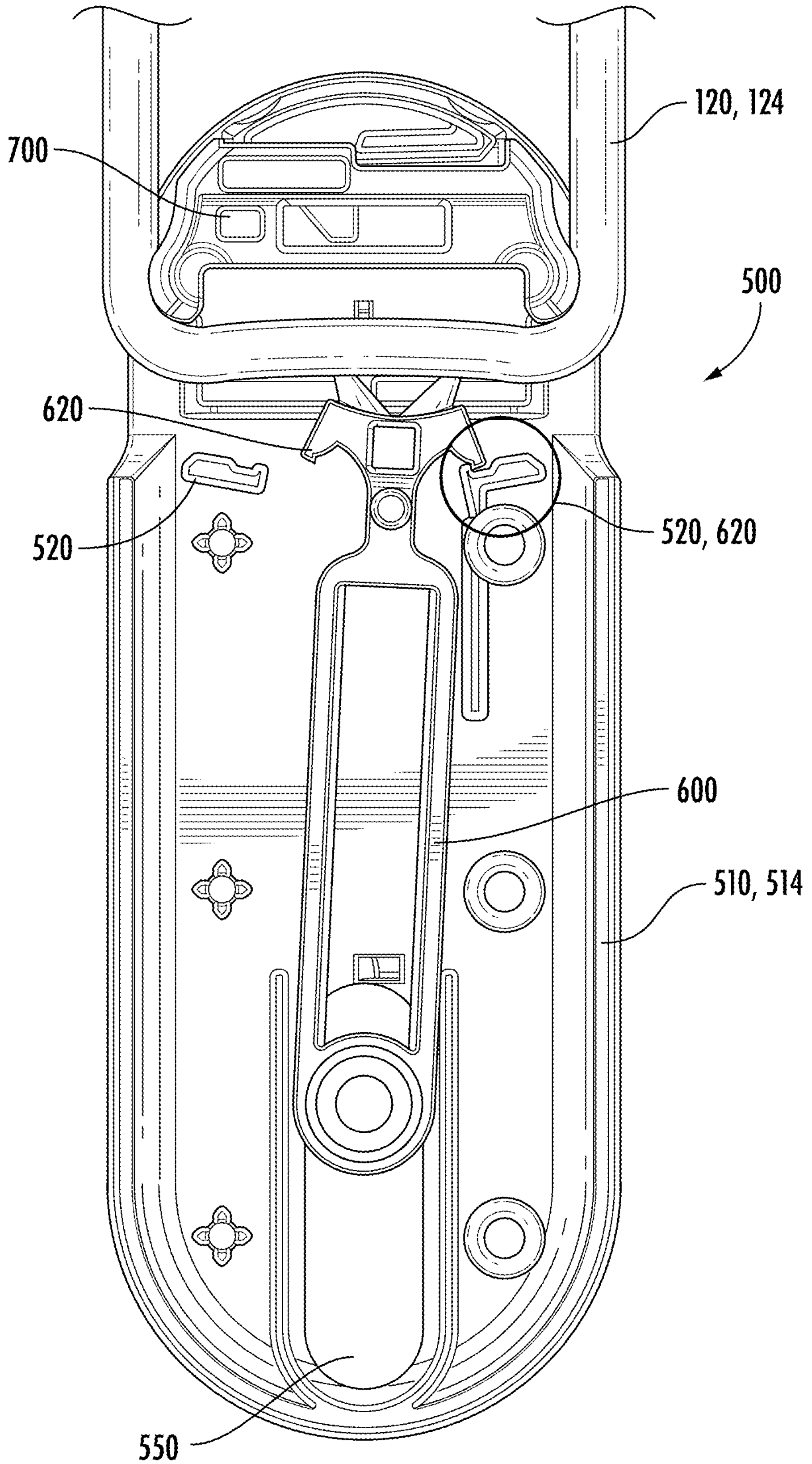
FIG. 18 is an alternate frontal view of the tensioner shown in FIG. 14, the body of the tensioner being partially removed for illustrative purposes, the slider shown in the first or locked position with the slider in the partially tilted position.
Figure 19:
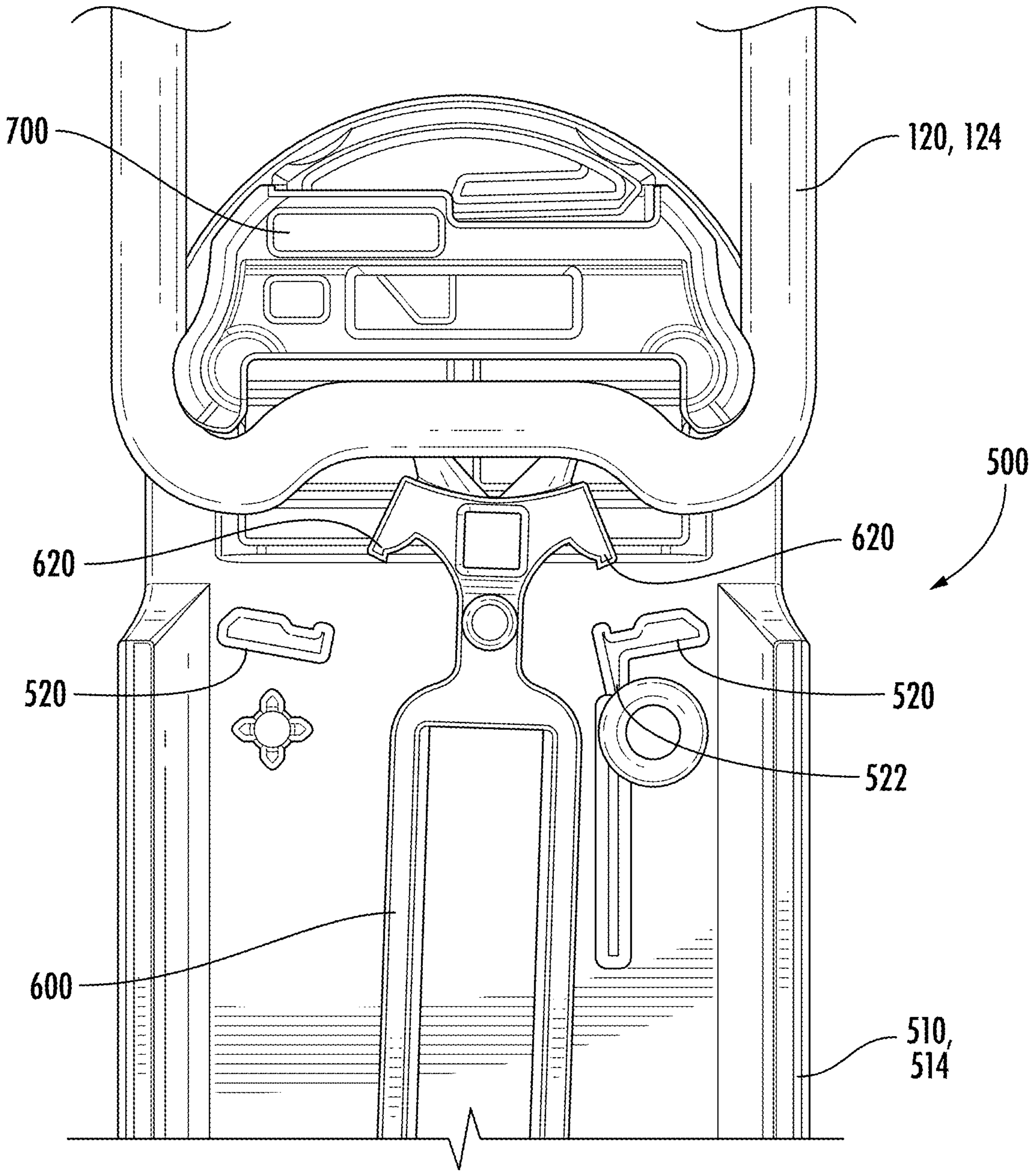
FIG. 19 is an alternate frontal view of the tensioner shown in FIG. 14, the body of the tensioner being partially removed for illustrative purposes, the slider shown in the first or locked position with the slider in the partially tilted position.

Similar to tensioner 200, with reference to FIGS. 15-19, in the illustrated embodiment, the slider 600 is movable between a first position (illustrated in FIGS. 16-19) and a second position (illustrated in FIG. 15). In the first position, the slider 600 contacts the operating cord 124. Thus, in the first position, movement of the operating cord 124 relative to the tensioner 500 is prevented. However, in the second position (illustrated in FIG. 15), the slider 600 is moved or retracted relative to body 510 of the tensioner 500 so that the slider 600 no longer contacts the operating cord 124 (e.g., slider 600 is moved or retracted a distance away from the bearing 700 so that the operating cord 124 can pass through the tensioner 500). As such, in the second position, the operating cord 124 can move relative to the tensioner 500. In one embodiment, the basing member 650 biases the slider 600 into the first position and thus into contact with the operating cord 124.

Figure 20A:
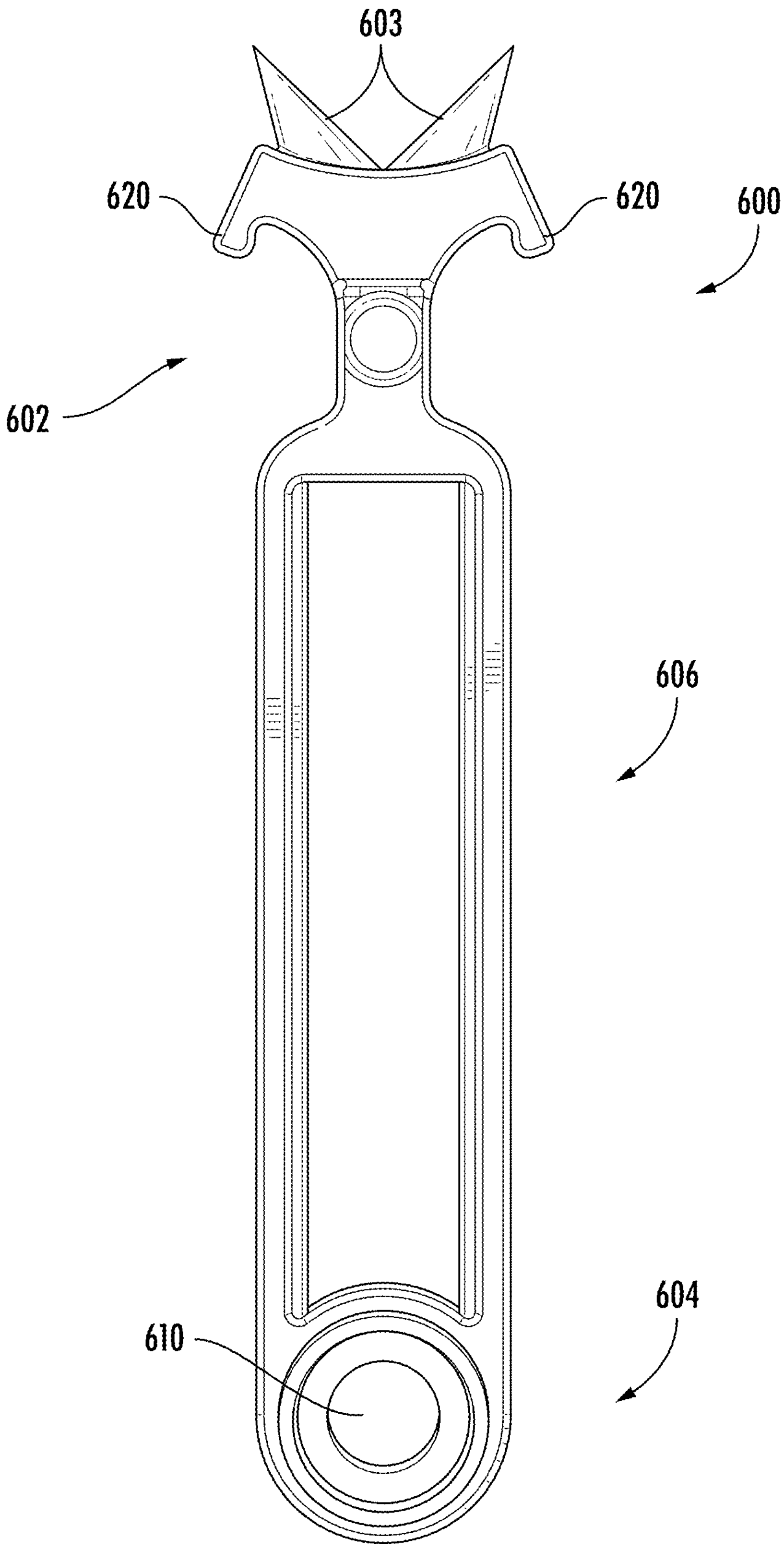
FIG. 20A is a perspective view illustrating an example of an embodiment of a slider in accordance with one or more features of the present disclosure, the slider may be used in connection with the tensioner shown in FIG. 14.
Figure 20B:
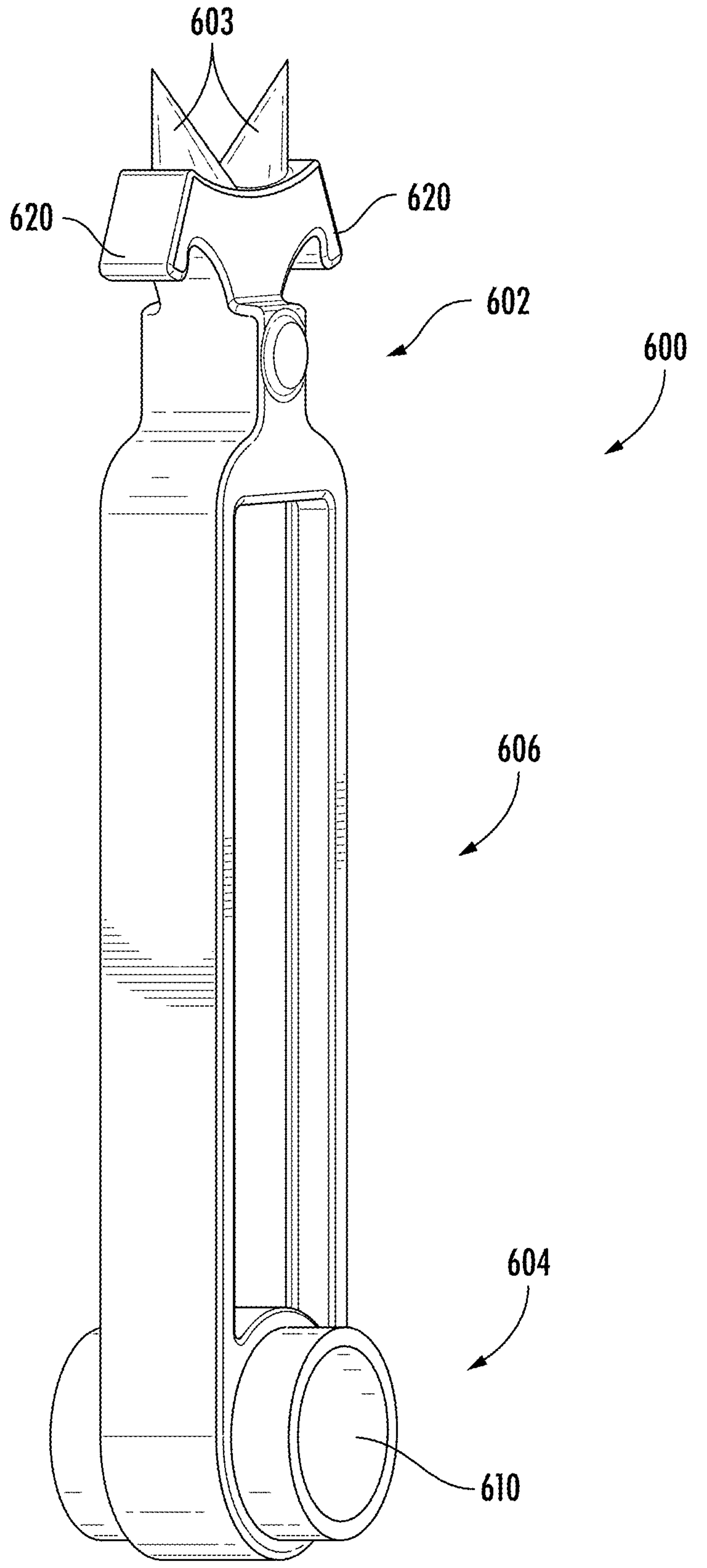
FIG. 20B is a side, perspective view of the slider shown in FIG. 20A.

With additional references to FIGS. 20A and 20B, in the illustrated embodiment, the slider 600 includes a first end 602, a second end 604, and an intermediate portion 606 extending between the first and second ends 602, 604. The first end 602 of the slider 600 is arranged and configured to interact, engage, etc. the operating cord 124. For example, as illustrated, the first end 602 of the slider 600 may include first and second teeth, spikes, or projections 603 extending therefrom, although more or less spikes are envisioned. In some embodiments, in the first position, the spikes 603 may be arranged and configured to bite into the operating cord 124.

Figure 21:
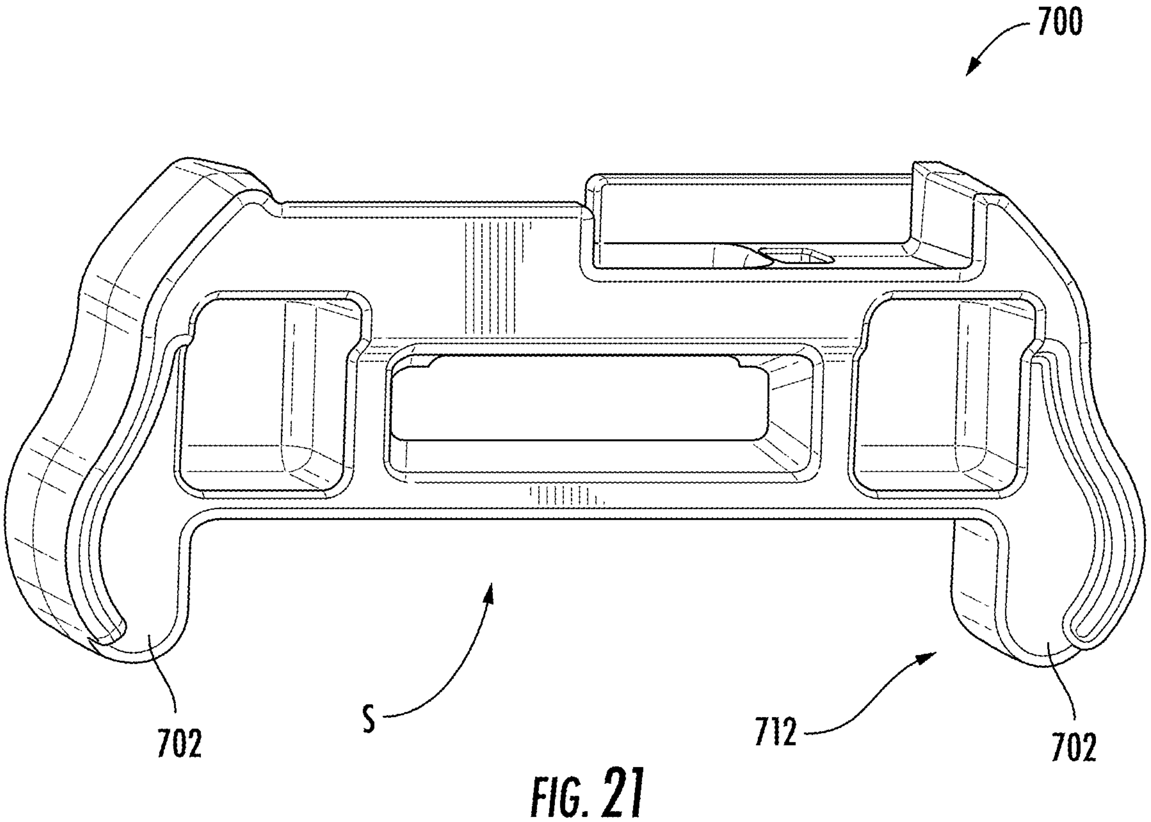
FIG. 21 is a perspective view illustrating an example of an embodiment of a bearing in accordance with one or more features of the present disclosure, the bearing may be used in connection with the tensioner shown in FIG. 14.

Moreover, with reference to FIG. 21, the bearing 700 may be coupled to the body 510 via any suitable mechanism now known or hereafter developed including, for example, interconnecting projections and recesses. In addition, as illustrated, in some embodiments, the bearing 700 may include downwardly projecting legs 702 so that, in use, the bearing 700 appears to have a U-shaped configuration. In use, the bearing 700 defines a bearing surface 712 for enabling the operating cord 124 to move there along. In addition, the bearing 700 operates in conjunction with the slider 600 to enable or disable the operating cord 124 from moving relative to the tensioner 500 depending on the location of the slider 600. In use, the legs 702 of the bearing 700 are arranged and configured to guide passage of the operating cord 124 through the tensioner 500. For example, as illustrated, the legs 702 are arranged and configured to enable the operating cord 124 to extend straight through the tensioner 500 (e.g., the operating cord 124 passes laterally through the tensioner 500 substantially perpendicular to a longitudinal axis of the tensioner 500). In addition, the legs 702 of the bearing 700 are arranged and configured so that, with the slider 600 in the first position, the spikes 603 formed on the first end 602 of the slider 600 engage the operating cord 124 in-between the legs 702. Thus arranged, alignment of the spikes 603 formed on the first end 602 of the slider 600 are centered on the operating cord 124. In addition, as illustrated, interaction of the spikes 603 with the operating cord 124 in the first position, pushes the operating cord 124 upwards into the space S between the downwardly extending legs 702. Thus arranged, increased gripping strength has been found to prevent the operating cord 124 from passing through the tensioner 500 when the tensioner 500 is either not installed or installed improperly.

As previously mentioned, the second end 604 of the slider 600 is adapted and configured to be accessed via, for example, the elongated slot 550 formed in the body 510 of the tensioner 500. As illustrated, the second end 604 of the slider 600 includes an opening 610 for receiving a fastener for mounting the tensioner 500 to, for example, an adjacent structure such as, for example, a window frame. In this manner, with the first end 602 of the slider 600 (e.g., spikes 603) in contact with the operating cord 124, a user may (e.g., during mounting) move the slider 600 from the first position to the second position against the biasing force of the biasing member 650. Thereafter, the second end 604 of the slider 600 may be mounted to the adjacent structure with the slider 600 in the second position so that the first end 602 of the slider 600 (e.g., spikes 603) do not contact the operating cord 124.

As previously mentioned, the slider 600 may be biased towards the first position so that the first end 602 of the slider 600 (e.g., spikes 603) prevents movement of the operating cord 124 relative to the tensioner 500. As such, in use, when properly mounted, the tensioner 500 is mounted so that the slider 600 is in the second position so that the first end 602 of the slider 600 (e.g., spikes 603) do not engage the operating cord 124 so that the operating cord 124 can be freely moveable. Thus arranged, the tensioner 500 allows the operating cord 124 to move relative to the tensioner 500. However, when the tensioner 500 is decoupled from the adjacent structure or when the tensioner 500 is installed improperly, the biasing member 650 biases the slider 600 (e.g., spikes 603) into contact with the operating cord 124 so that the operating cord 124 is prevented from moving relative to the tensioner 500.

In accordance with one or more features of the present disclosure and with reference to FIGS. 16-19, in use, with the tensioner 500 decoupled from the adjacent structure or with the tensioner 500 installed improperly, movement of the operating cord 124 causes the first end 602 of the slider 600 to move, tilt, pivot, angle, or the like, relative to the tensioner 500. Thus arranged, one or more stops 620 formed on the slider 600 contact one or more stops 520 formed on the body 510. As illustrated, in some embodiments, the stops 620 formed on the slider 600 may be provided in the form of downwardly extending legs on the head of the slider 600. Thus arranged, movement of the slider 600 from the first position (FIGS. 16-19) to the second position (FIG. 15) is prevented. That is, as best illustrated in FIGS. 16-19, with the tensioner 500 decoupled from the adjacent structure or with the tensioner 500 installed improperly, movement of the operating cord 124 causes the first end 602 of the slider 600 to move (e.g., tilt, pivot, etc.) relative to the tensioner 500 (e.g., the first end 602 of the slider 600 moves (e.g., pivots) relative to the second end 604 of the slider 600) so that the slider 600 tilts, which causes one or more stops 620 on the slider 600 to align with one or more stops 520 formed on the body 510 of the tensioner 500 so that movement of the slider 600 from the first position to the second position is prevented (e.g., stop 620 formed on the slider 600 contacts the stop 520 formed on the body 510 prior to the spikes 603 releasing the operating cord 124). Thus arranged, with the tensioner 500 decoupled from the adjacent structure or with the tensioner 500 installed improperly, movement of the operating cord 124 causes the slider 600 to tilt, which causes the stop 620 formed on the slider 600 to align with the stop 520 formed on the body 510, which prevents the slider 600 from retracting or moving to the second position, which prevents the slider 600 from releasing the operating cord 124. In use, the length of the spikes 603 formed on the first end 602 of the slider 600 are of a sufficient overall length such that the stops 620 formed on the slider 600 contact the stops 520 formed on the body 510 prior to the spikes 603 releasing the operating cord 124. In essence, the length of the spikes 603 are arranged and configured to contact the operating cord 124 for a sufficient period of time to enable the stop 620 formed on the slider 600 to contact the stop 520 formed on the body 510.

In addition, in some embodiments, the body 510 may include a second stop 522 formed on either side of the slider 600. In use, the second stop 522 may be positioned adjacent to, beneath, etc. the first stop 520. Thus arranged, the tensioner 500 provides an additional feature to ensure that the slider 600 contacts the body 510 of the tensioner 500 if the operating cord 124 is moved with the tensioner 500 uninstalled or installed improperly.

In addition, as previously mentioned, the tensioner 500 may include one or more features for guiding movement of the slider 600 relative to the body 510 of the tensioner 500. For example, as previously described, the body 510 may include a longitudinal extending rail and the slider 600 may include a corresponding slot arranged and configured to interact with the rail, although it is envisioned that the slot may be formed on the body and the rail may be formed on the slider. In use, engagement of the rail and the slot guides movement of the slider 600 between the first and second positions. For example, with the tensioner 500 properly installed, movement of the slider 600 from the first position to the second position is guided by the interaction between the rail and the slot. In one embodiment, the rail is arranged and configured to interact with the slot once the stop 620 formed on the slider 600 has moved past the stop 520 formed on the body 510.

As will be appreciated by one of ordinary skill in the art, direction of movement of the slider 600 relative to the body 510 (e.g., direction of tilting in the lateral direction (i.e., left or right)) depends on direction of movement of the operating cord 124. That is, when a user pulls on the operating cord 124, drag is created, which causes the slider 600 to tilt. The direction of tilt being dependent on which downward depending segment or loop of the operating cord 124 is being moved. Movement of the operating cord 124 causes one of the stops 620 formed on the slider 600 to align with one of the stops 520 formed on the body 510, which prevents the slider 600 from moving to the second position, which prevents the slider 600 from releasing the operating cord 124.

Thus arranged, in accordance with one or more features of the present disclosure, with the tensioner 500 not installed or installed improperly, the operating element 120 (e.g., operating cord 124) is prevented from moving relative to the tensioner 500.

In connection with tensioner 500, in use, during assembly, the interconnecting projections and recesses for coupling the first body member 512 to the second body member 514 are arranged and configured to enable the bearing 700 to be installed after the operating cord 124 has been positioned within the body 510. In addition, as previously mentioned in connection with tensioner 200, at least one of the interconnecting projections and recesses is arranged and configured so that if the first and second body members 512, 514 of the body 510 are disassemble, the snap-fit connectors break or become permanently deformed.

With reference to FIGS. 22-28, alternate embodiments of a tensioner in accordance with one or more features of the present disclosure will now be described. As will be described, the alternate embodiments of the tensioner are substantially similar to those previous described herein and thus for the sake of brevity discussion of common features may be omitted herefrom. In accordance with one or more features of the present disclosure, the alternate embodiments of the tensioner incorporate an active locking mechanism such as, for example, a button mechanism, which requires an end user, an installer, etc. to actively release or disengage the slider of the tensioner during, for example, installation. That is, as will be described herein, in some embodiments, the tensioner may include a spring-loaded button mechanism. In use, compression of the spring-loaded button mechanism by the end user, the installer, etc. releases the slider which enables the slider to move to the second or unlocked position so that the operating element (e.g., operating cord, bead chain, etc.) can be moved relative to the tensioner. As will be described herein, the button mechanism can be used separately from, or in combination with, the stops previously described.

Figure 22:
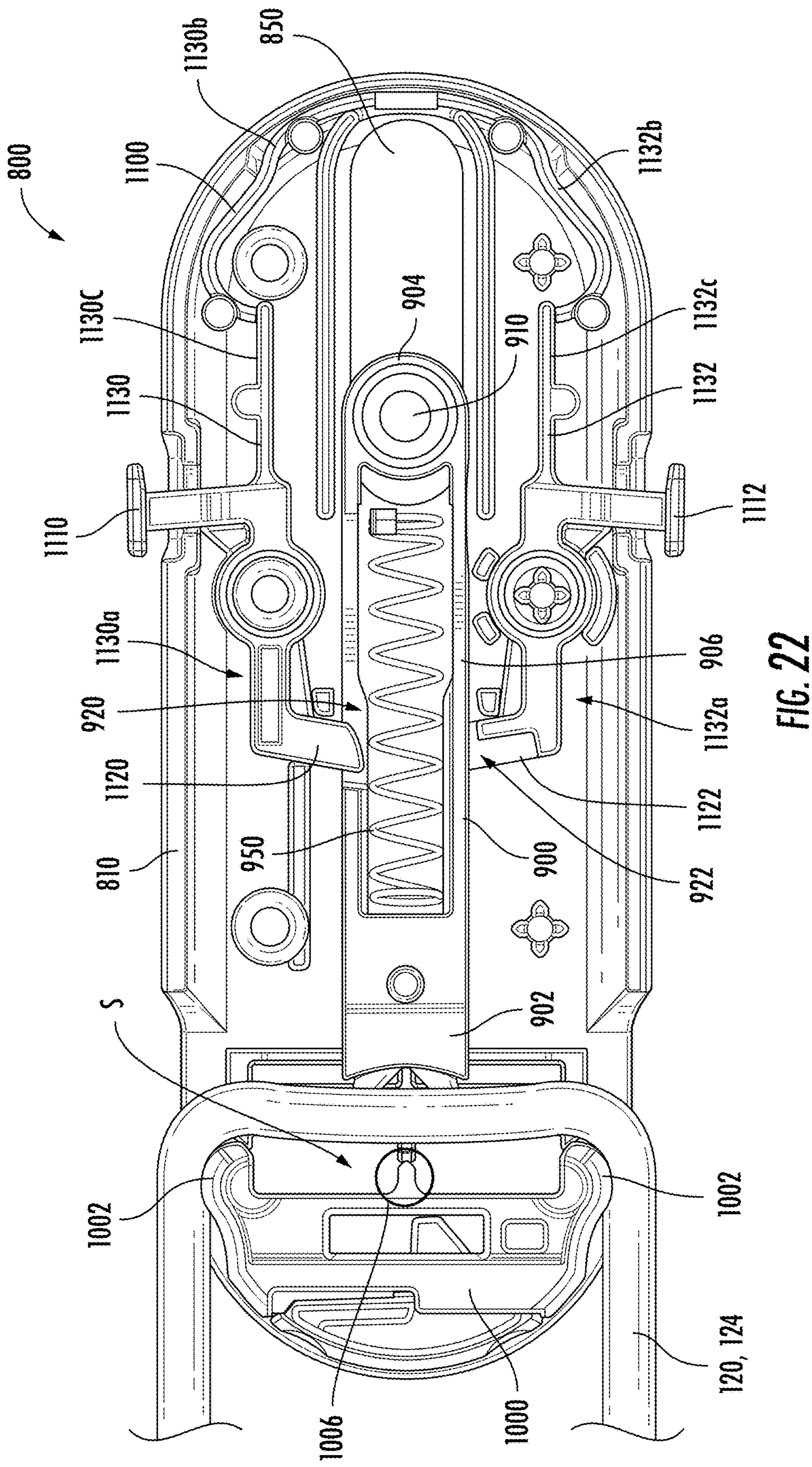
FIG. 22 is a frontal view illustrating an alternate example of an embodiment of a tensioner in accordance with one or more features of the present disclosure, the tensioner may be used in connection with the architectural-structure covering shown in FIG. 1, the tensioner arranged and configured to operate with an operating element in the form of an operating cord, the tensioner including a body, a slider, and a button mechanism, the body being partially removed for illustrative purposes, the button mechanism shown in a first or engaged position, the slider shown in a first or locked position.
Figure 23:
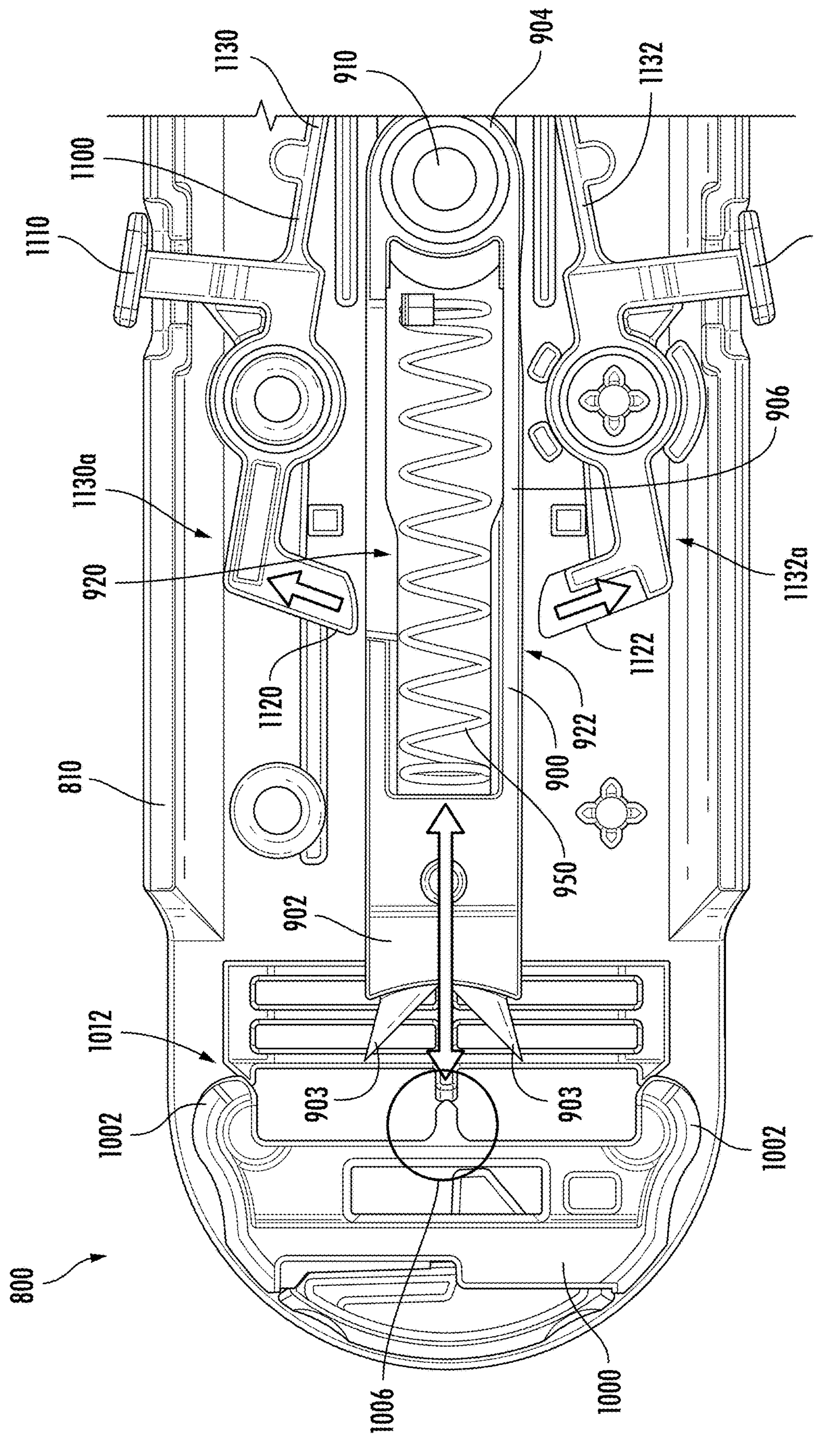
FIG. 23 is an alternate frontal view of the tensioner shown in FIG. 22, the button mechanism shown in a second or disengaged position, the slider shown in a second or unlocked position.
Figure 24:
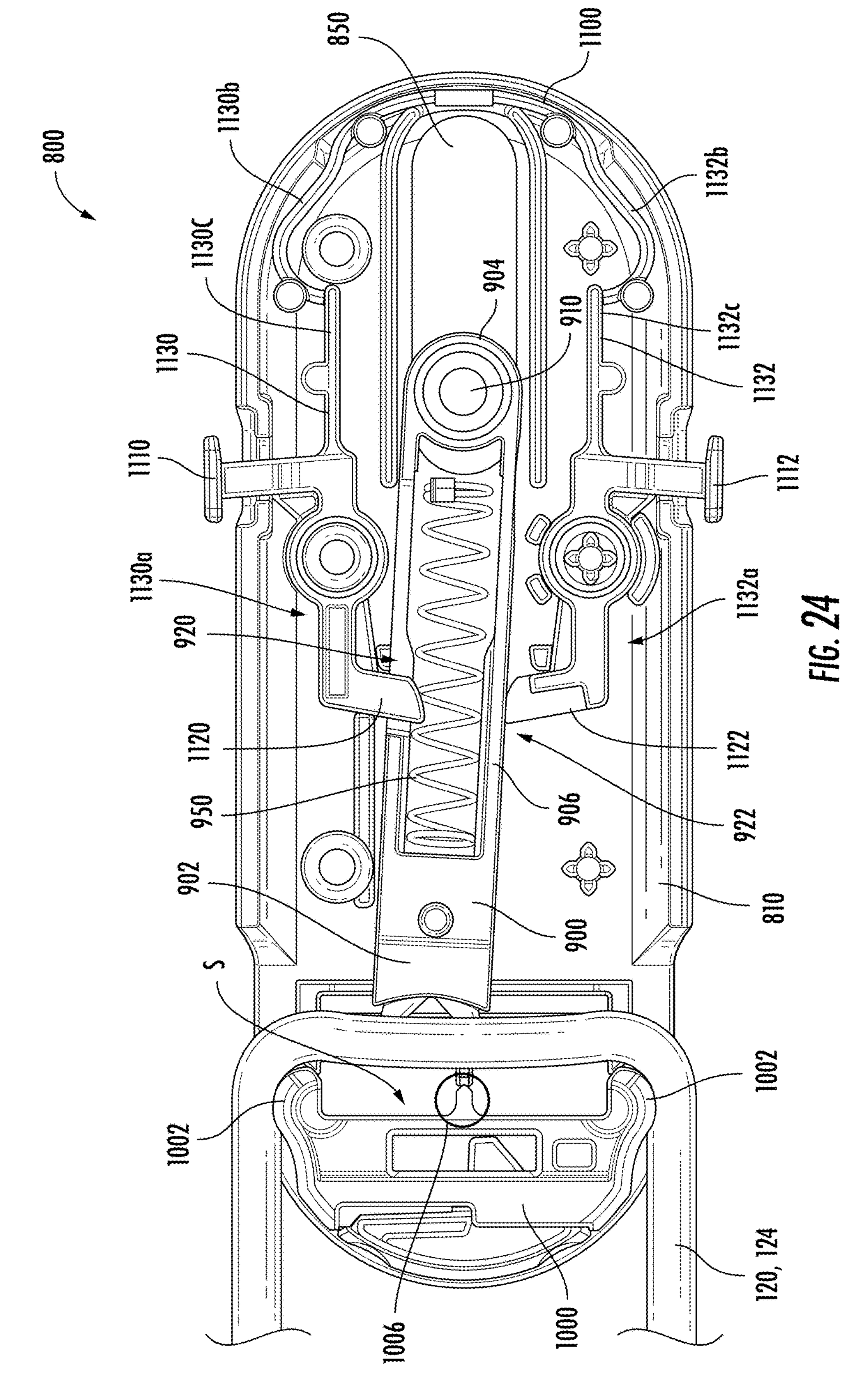
FIG. 24 is an alternate frontal view of the tensioner shown in FIG. 22, the slider shown in a tilted position, the button mechanism shown in the first or engaged position, the slider shown in the first or locked position.

With reference to FIGS. 22-24, an alternate embodiment of a tensioner 800 in accordance with one or more features of the present disclosure will be illustrated and described. As illustrated, and similar to the previous embodiments described herein, the tensioner 800 may include a body 810. The body 810 may include an elongated slot 850 formed therein for accessing a slider 900 movably positioned within the body 810 of the tensioner 800. In use, the slider 900 is moveable between a first position and a second position. In the first position (e.g., the first or locked configuration), the slider 900 interacts with, contacts, etc. the operating element 120. Meanwhile, in the second position (e.g., the second or unlocked configuration), the slider 900 does not interact with or contact the operating element 120 thereby permitting the operating element 120 to move relative to the tensioner 800.

In use, and as previously described, the tensioner 800 is mounted to an adjacent structure (e.g., a window frame or the like). In use, one or more fasteners, such as a screw, a nail, a bolt, or the like, may be used to mount the tensioner 800 to a wall of a window frame or other structure. For example, as previously mentioned, a fastener (not shown) may be inserted through an opening 910 formed in the slider 900 for mounting the tensioner 800 to the adjacent structure. In use, the tensioner 800 may be mounted to the adjacent structure with the slider 900 in the second position (e.g., the slider 900 is positioned such that it does not contact the operating element 120).

In this configuration (e.g., the second or unlocked configuration), the tensioner 800 is mounted to the adjacent structure with the operating element 120 in a taut condition. As such, with the operating element 120 in a taut condition and with the slider 900 in the second position, the operating element 120 is free to move relative to the tensioner 800 so that the covering 106 can be moved between the extended and retracted positions. However, in use, if the tensioner 800 is decoupled from the adjacent structure (e.g., the tensioner 800 is not mounted to the adjacent structure) or if the tensioner 800 is mounted incorrectly such that, for example, the operating element 120 is held in a non-taut condition, the slider 900 is biased to the first position (e.g., the slider 900 moves into contact with the operating element 120) to prevent the operating element 120 from moving relative to the slider 900 and hence the tensioner 800.

In some embodiments, the body 810 may include first and second body members as previously described and thus for the sake of brevity additional disclosure is omitted herefrom. The tensioner 800 may also include a biasing member 950 for biasing the slider 900 into the first position, and a bearing 1000, which is substantially similar to bearing 700 previously described. As will be described in greater detail, in the first position, the slider 900 is adapted and configured to operate in conjunction with the bearing 1000 to secure a position of the operating element 120 relative to the slider 900 to lock the position of the operating element 120.

As previously described, the slider 900 is movable between a first position (illustrated in FIGS. 22 and 24) and a second position (illustrated in FIG. 23). In the first position (FIGS. 22 and 24), the slider 900 is in contact with the operating element 120, which in connection with this embodiment is in the form of an operating cord 124. In the first position, movement of the operating cord 124 relative to the tensioner 800 is prevented. However, in the second position (FIG. 23), the slider 900 is moved (e.g., retracted) relative to the body 810 of the tensioner 800 so that the slider 900 no longer contacts the operating cord 124 (e.g., the slider 900 is moved or retracted a sufficient distance away from the bearing 1000 so that the operating cord 124 can pass through the tensioner 800 unaffected). As such, in the second position, the operating cord 124 can move relative to the tensioner 800. In one embodiment, the basing member 950 biases the slider 900 into the first position and thus into contact with the operating cord 124.

As previously described, the slider 900 includes a first end 902, a second end 904, and an intermediate portion 906 extending between the first and second ends 902, 904. The first end 902 of the slider 900 is arranged and configured to interact, engage, etc. the operating cord 124. For example, as illustrated, the first end 902 of the slider 900 may include first and second teeth, spikes, or projections 903 extending therefrom, although more or less spikes are envisioned. In some embodiments, in the first position, the spikes 903 may be arranged and configured to bite into the operating cord 124.

As previously described, and thus for the sake of brevity, additional disclosure is omitted herein, the bearing 1000 may include downwardly projecting legs 1002 so that, in use, the bearing 1000 appears to have a U-shaped configuration. In use, the bearing 1000 defines a bearing surface 1012 for enabling the operating cord 124 to move there along. In addition, the bearing 1000 operates in conjunction with the slider 900 to enable or disable the operating cord 124 from moving relative to the tensioner 800 depending on the location of the slider 900. In use, the legs 1002 of the bearing 1000 are arranged and configured to guide passage of the operating cord 124 through the tensioner 800. For example, as illustrated, the legs 1002 are arranged and configured to enable the operating cord 124 to extend straight through the tensioner 800 (e.g., the operating cord 124 passes laterally through the tensioner 800 substantially perpendicular to a longitudinal axis of the tensioner 800). In addition, the legs 802 of the bearing 1000 are arranged and configured so that, with the slider 900 in the first position, the spikes 903 formed on the first end 902 of the slider 900 engage the operating cord 124 in-between the legs 1002. Thus arranged, alignment of the spikes 903 are centered on the operating cord 124. In addition, as illustrated, interaction of the spikes 903 with the operating cord 124 in the first position, pushes the operating cord 124 upwards into the space S between the downwardly extending legs 1002. In addition, in some embodiments, the bearing 1000 may include a rib 1006 positioned in between the legs 1002. For example, as illustrated, in some embodiments, the rib 1006 may be centrally located on the bearing 1000. In use, the rib 1006 provides increased gripping strength. Thus arranged, increased gripping strength has been found to prevent the operating cord 124 from passing through the tensioner 800 when the tensioner 800 is either not installed or installed improperly.

As previously mentioned, and thus for the sake of brevity, additional disclosure is omitted herein, the second end 904 of the slider 900 is adapted and configured to be accessed via, for example, the elongated slot 850 formed in the body 810 of the tensioner 800. As illustrated, the second end 904 of the slider 900 includes the opening 910 for receiving a fastener for mounting the tensioner 800 to, for example, an adjacent structure such as, for example, a window frame. In this manner, with the first end 902 of the slider 900 in contact with the operating cord 124, an end user, an installer, etc. may (e.g., during mounting) move the slider 900 from the first position to the second position against the biasing force of the biasing member 950. In use, the second end 904 of the slider 900 may be mounted to the adjacent structure with the slider 900 in the second position so that the first end 902 of the slider 900 does not contact the operating cord 124.

As previously mentioned, the slider 900 may be biased towards the first position so that the first end 902 of the slider 900 blocks or prevents movement of the operating cord 124 relative to the tensioner 800. As such, in use, when properly mounted, the tensioner 800 is positioned so that the slider 900 is in the second position so that the first end 902 of the slider 900 does not block or prevent movement of the operating cord 124 relative to the tensioner 800. Thus arranged, the tensioner 800 allows the operating cord 124 to move relative to the tensioner 800. However, when the tensioner 800 is decoupled from the adjacent structure or when the tensioner 800 is installed improperly, the biasing member 950 biases the slider 900 into contact with the operating cord 124 so that the operating cord 124 is prevented from moving relative to the tensioner 800.

As previously described, the tensioner 800 (e.g., slider 900) may be biased towards the first position by any suitable mechanism now known or hereafter developed such as, for example, the biasing member 950 may be in the form of a spring such as, for example, a coil spring.

In accordance with one or more features of the present disclosure, in use, the tensioner 800 may include a button mechanism, also referred to herein as a spring-loaded button mechanism 1100. In use, the spring-loaded button mechanism 1100 is moveable from a first position (FIGS. 22 and 24) to a second position (FIG. 23). In the first position (FIGS. 22 and 24), the spring-loaded button mechanism 1100 is arranged and configured to interact with, contact, engage, or the like (terms used interchangeably herein without the intent to limit or distinguish) the slider 900 to prevent the slider 900 from moving to its second position. In the second position (FIG. 23), the spring-loaded button mechanism 1100 releases the slider 900 so that an end user, an installer, etc. is able to move the slider 900 to its second position. In some embodiments, the spring-loaded button mechanism 1100 is biased to the first position. For example, the spring-loaded button mechanism 1100 may be internally biased or configured to contact the slider 900. In use, the spring-loaded button mechanism 1100 is arranged and configured to be manipulated, compressed, depressed, etc. (terms used interchangeably herein without the intent to limit or distinguish) by the end user, installer, etc. in order to move the spring-loaded button mechanism 1100 from its first position to its second position so that the slider 900 can be moved from its first position to its second position during, for example, installation.

As illustrated, in some embodiments, the spring-loaded button mechanism 1100 may include first and second buttons 1110, 1112 accessible through the body 810 of the tensioner 800. In addition, the spring-loaded button mechanism 1100 may include first and second stops 1120, 1122, which may be arranged and configured as inwardly projecting legs, tabs, projections, or the like (terms used interchangeably herein without the intent to limit or distinguish). In use, the first and second stops 1120, 1122 are arranged and configured to interact with the slider 900 to prevent the slider 900 from moving to the second position. However, as illustrated, in use, an end user, installer, etc. during, for example, installation, may depress the first and second buttons 1110, 1112 causing the first and second stops 1120, 1122 to release the slider 900 (e.g., first and second stops 1120, 1122 can move away from, pivot, etc. from the slider 900) thereby disengaging or releasing the slider 900 so that the slider 900 can be moved to its second position against the biasing force of the biasing member 950 thereby enabling the second end 904 of the slider 900 to be mounted to the adjacent structure with the slider 900 in its second position so that the first end 902 of the slider 900 does not contact the operating cord 124. However, in use, if the tensioner 800 is decoupled from the adjacent structure, the biasing member 950 biases the slider 900 to its first position so that the first end 902 of the slider 900 contacts the operating cord 124. In addition, in some embodiments, the spring-loaded button mechanism 1100 is arranged and configured to bias the first and second stops 1120, 1122 into contact with the slider 900 to lock the slider 900 into its first position until the first and second buttons 1110, 1112 are depressed once again.

In some embodiments, as illustrated, the spring-loaded button mechanism 1100 may include first and second arms 1130, 1132. Each of the first and second arms 1130, 1132 being pivotably connected to the body 810 of the tensioner 800. For example, as illustrated, each of the first and second arms 1130, 1132 may be characterized as including a first end portion **1130*a*, 1132*a*, a second end portion 1130*b*, 1132*b*, and an intermediate portion 1130*c*, 1132*c*. In use, the first and second buttons 1110, 1112 may be associated with the intermediate portion 1130*c*, 1132*c*. The first and second stops 1120, 1122 may be associated with the first end portions 1130*a*, 1132*a*. The first and second arms 1130, 1132 may be pivotably coupled to the body 810 of the tensioner 800 at a position in-between the stops 1120, 1122 and the buttons 1110, 1112. As such, in use, pressing the first button 1110 causes the first arm 1130 to deflect or move, which causes the first stop 1120 or leg to disengage from the slider 900. Similarly, pressing the second button 1112 causes the second arm 1132 to deflect or move, which causes the second stop 1122 or leg to disengage from the slider 900. In some embodiments, the spring-loaded button mechanism 1100 is arranged and configured so that the first and second buttons 1110, 1112 require simultaneous activation in order to release the slider 900. In some embodiments, the slider 900 may also include first and second stops. As illustrated, in some embodiments, the stops may be configured as first and second cutouts, recesses, or pockets 920, 922 (terms used interchangeably herein without the intent to limit or distinguish) for receiving the first and second stops 1120, 1122 (e.g., legs) formed on the spring-loaded button mechanism 1100, although this is but one configuration. In some embodiments, as illustrated, the first and second pockets 920, 922 are symmetrically arranged about the slider 900 (e.g., first pocket 920 may be formed along a top surface of the slider 900 while the second pocket 922 may be formed along a bottom surface of the slider 900**).

In use, when the first and second buttons 1110, 1112 are compressed, the first and second stops 1120, 1122 (e.g., legs) formed on the spring-loaded button mechanism 1100 disengage the first and second pockets 920, 922 (e.g., stops) formed on the slider 900, thereby releasing or unlocking the slider 900 so that the slider 900 can be moved to its second position to release the operating cord 124.

As illustrated, in some embodiments, the spring-loaded button mechanism 1100 may be formed as a single integral or monolithic component. For example, the first and second arms including the first end portions, the second end portions, the intermediate portions, the stops, and the buttons may be integrally or monolithically formed. However, this is but one configuration, and the spring-loaded button mechanism may be manufactured from multiple components and thereafter assembled together.

With reference to FIG. 24, similar to tensioners 200, 500 previously described herein, with the tensioner 800 decoupled from the adjacent structure or with the tensioner 800 installed improperly, movement of the operating cord 124 may cause the first end 902 of the slider 900 to move, tilt, pivot, angle, or the like, relative to the tensioner 800 and/or relative to the second end 904 of the slider 900. In use, by enabling the slider 900 to tilt relative to the body 810 of the tensioner 800, the angle of attack or engagement via the spikes 903 into the operating cord 124 is increased, which has been found to increase the pinching or locking force of the slider 900 into the operating cord 124. As previously described, direction of movement of the slider 900 relative to the body 810 (e.g., direction of tilting in the lateral direction (i.e., left or right)) depends on direction of movement of the operating cord 124. In accordance with this embodiment, the first and second stops 1120, 1122 include a length sufficient to engage the first and second pockets 920, 922 formed in the slider 900.

Figure 25:
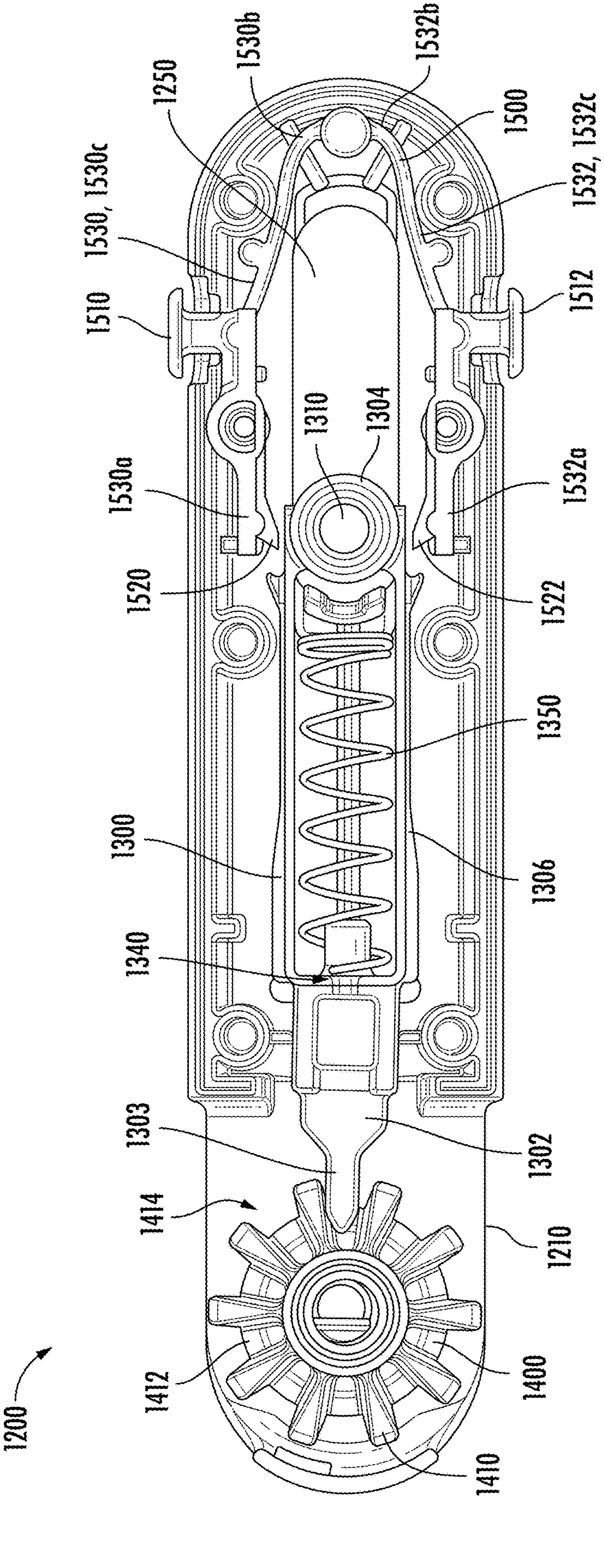
FIG. 25 is a frontal view illustrating an alternate example of an embodiment of a tensioner in accordance with one or more features of the present disclosure, the tensioner may be used in connection with the architectural-structure covering shown in FIG. 1, the tensioner arranged and configured to operate with an operating element in the form of a bead chain, the tensioner including a body, a slider, and a button mechanism, the body being partially removed for illustrative purposes, the button mechanism shown in a first or engaged position, the slider shown in a first or locked position.
Figure 26:
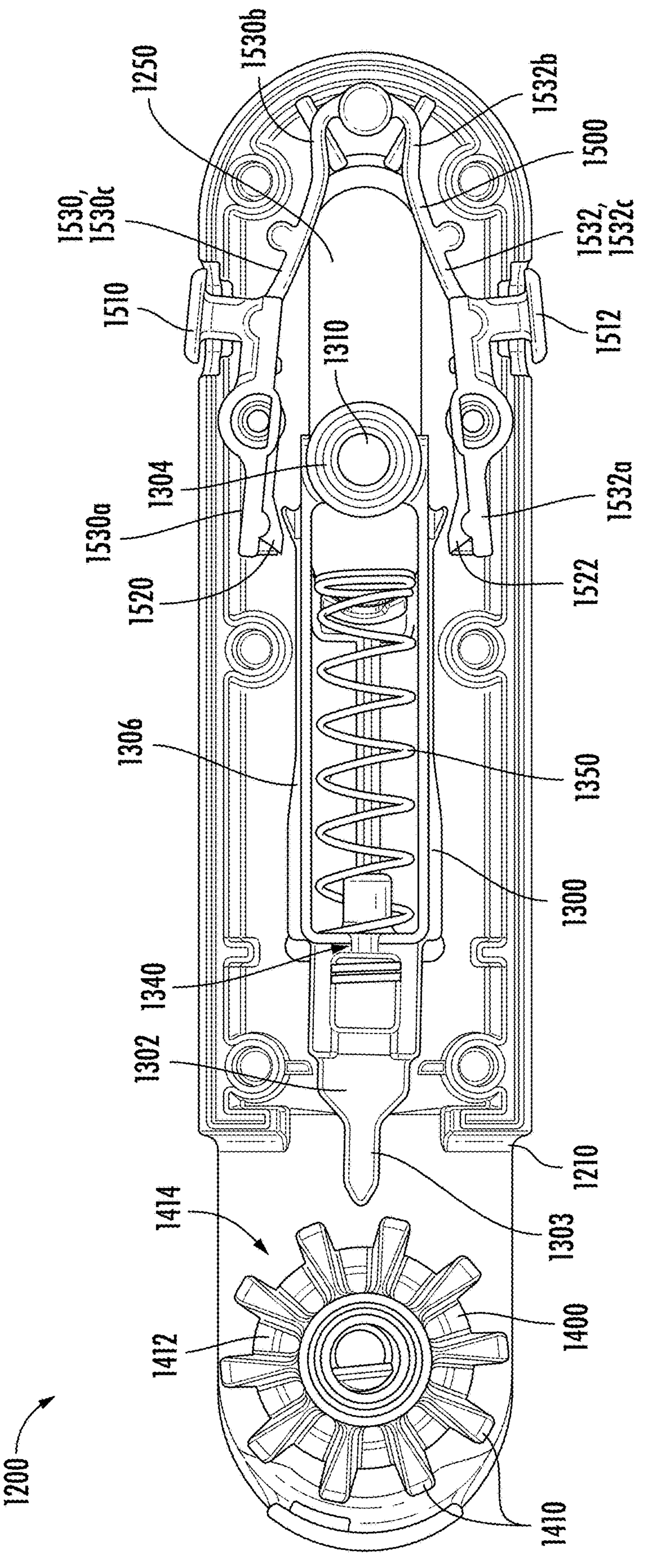
FIG. 26 is an alternate frontal view of the tensioner shown in FIG. 25, the button mechanism shown in a second or disengaged position, the slider shown in a second or unlocked position.
Figure 27:
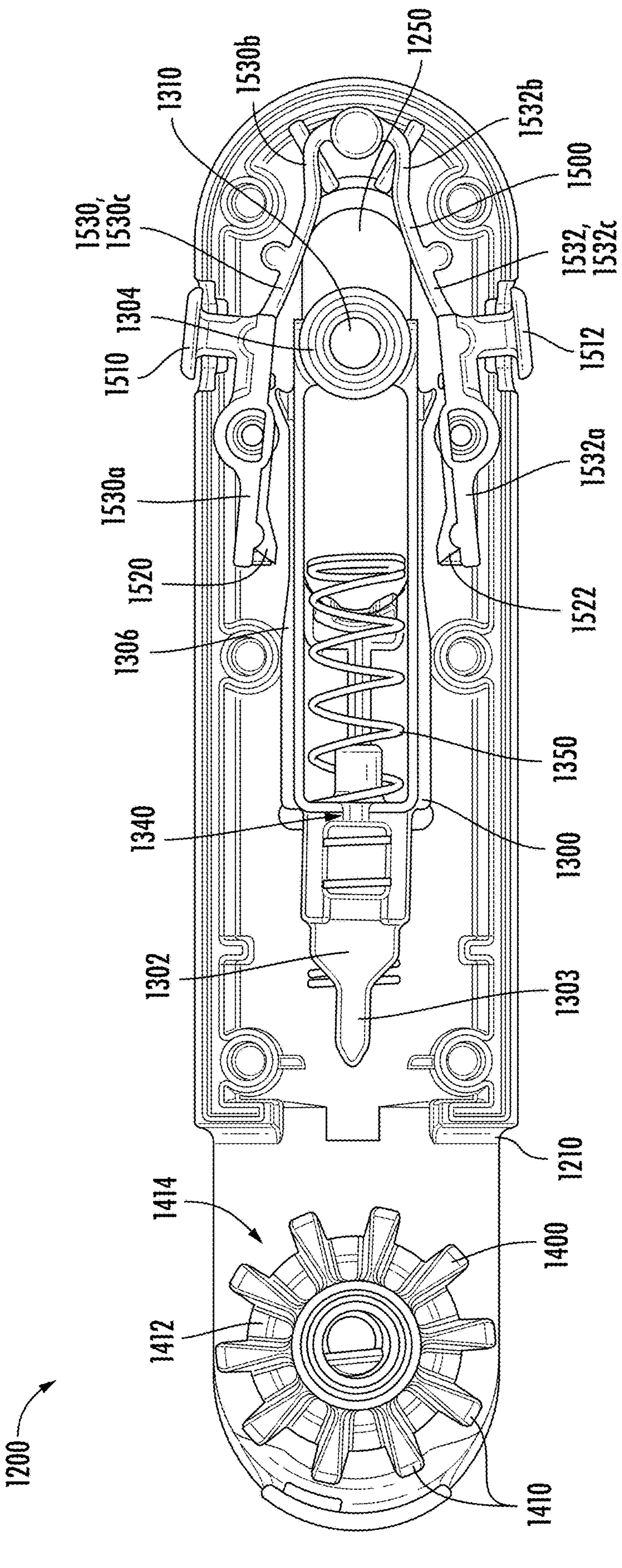
FIG. 27 is an alternate frontal view of the tensioner shown in FIG. 25, the button mechanism shown in a second or disengaged position, the slider shown in a second or unlocked position.
Figure 28:
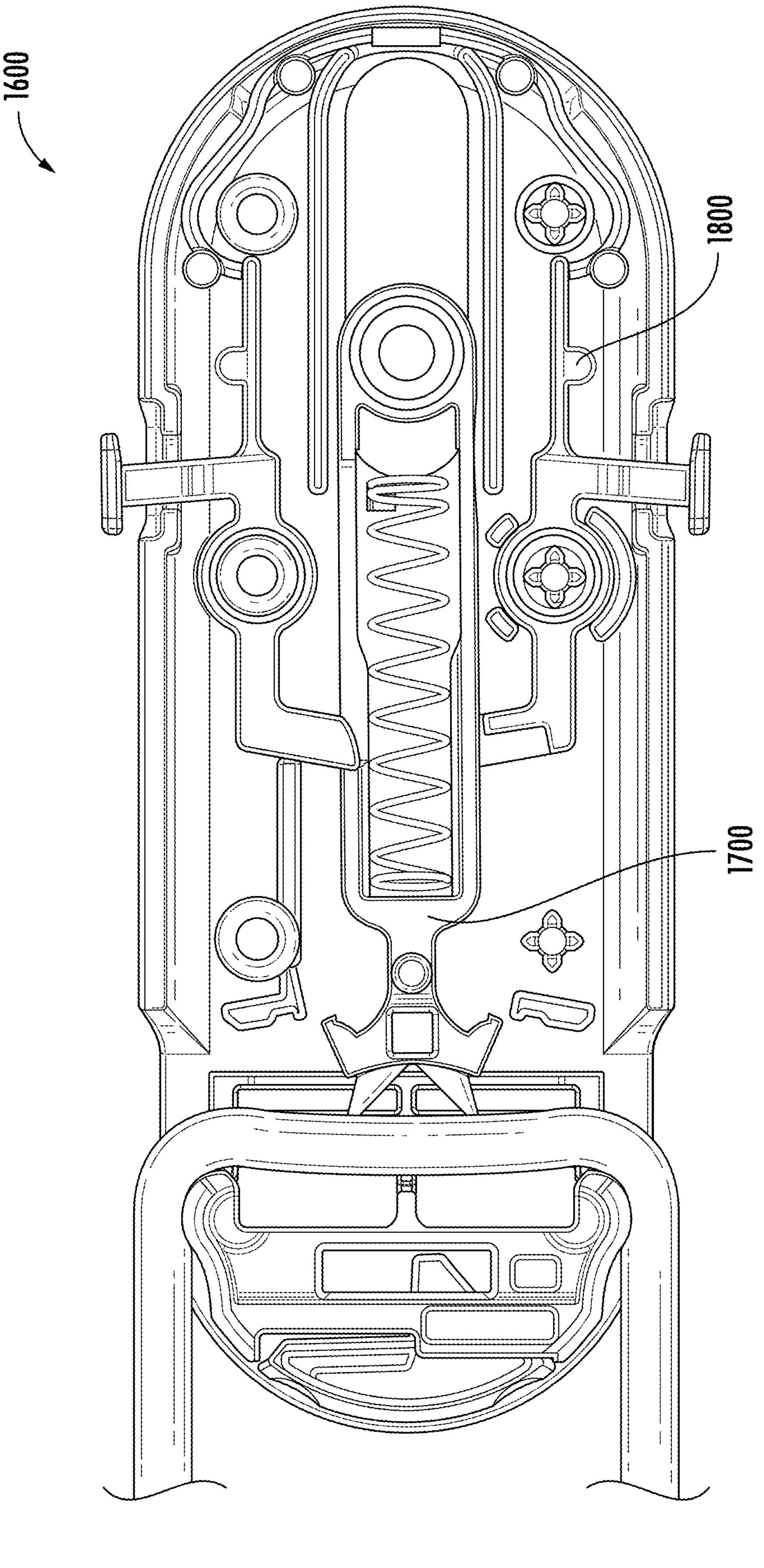
FIG. 28 is a frontal view illustrating an alternate example of an embodiment of a tensioner in accordance with one or more features of the present disclosure, the tensioner may be used in connection with the architectural-structure covering shown in FIG. 1, the tensioner arranged and configured to operate with an operating element in the form of an operating cord, the tensioner including a body, a slider, and a secondary button mechanism, the body being partially removed for illustrative purposes, the secondary button mechanism shown in a first or engaged position, the slider shown in a first or locked position.

With reference to FIGS. 25-27, an alternate embodiment of a tensioner 1200 is illustrated. In use, the tensioner 1200 is substantially similar to the previous tensioners described above except as provided herein. As such, for sake of brevity, some description of the tensioner 1200 is omitted herefrom. As previously mentioned, in use, the architectural-structure covering may include an operating element 120, which, in use, is operatively associated with an operating system (not shown) to move the covering 106 between the extended and retracted positions. As previously illustrated and described, the operating element 120 may be in the form of a bead chain 122.

Similar to previously described tensioners, tensioner 1200 is movable between a first configuration and a second configuration. In the first configuration, the bead chain 122 is secured relative to the tensioner 1200 (e.g., prevented from moving) while in the second configuration, the bead chain 122 is freely movable relative to the tensioner 1200. That is, the tensioner 1200 is adapted and configured to enable the bead chain 122 to be locked and unlocked against relative movement with respect to the tensioner 1200. In the unlocked or second configuration (FIGS. 26 and 27) (e.g., with a slider 1300 in the second position), the bead chain 122 is permitted to move sufficiently relative to the tensioner 1200 so that the covering 106 can move between the extended and retracted positions. In the locked or first configuration (FIG. 25) (e.g., with the slider 1300 in the first position), the bead chain 122 is prohibited or prevented from moving sufficiently relative to the tensioner 1200. In this manner, with the tensioner 1200 in the unlocked configuration, the bead chain 122 can be moved relative to the tensioner 1200 so that the covering 106 can be moved between the extended and retracted positions. In use, the tensioner 1200 is in the unlocked configuration when properly mounted to an adjacent structure. However, in use, if the tensioner 1200 is decoupled from the adjacent structure (e.g., the tensioner 1200 is not mounted to the adjacent structure) or if the tensioner 1200 is mounted incorrectly such that, for example, the bead chain 122 is held in a non-taut condition, the tensioner 1200 is biased to the first or locked configuration to prevent the bead chain 122 from moving relative to the tensioner 1200. In this manner, for the bead chain 122 to function properly (e.g., to move the covering 106 between the extended and retracted positions), the tensioner 1200 is mounted to the adjacent structure with the slider 1300 in the second or unlocked position with the bead chain 122 in a taut condition.

As illustrated, and as previously described, the tensioner 1200 may include a body 1210 including an elongated slot 1250 formed therein for accessing a slider 1300 movably positioned within the body 1210 of the tensioner 1200.

The tensioner 1200 also includes a biasing member 1350 for biasing the slider 1300 into the first position and thus into contact with the bead chain 122. The tensioner 1200 also includes a roller 1400, which is substantially similar to roller 400 previously described. In use, the roller 1400 is arranged and configured to be rotatably coupled to the body 1210. As will be described in greater detail, in the first position, the slider 1300 is adapted and configured to operate in conjunction with the roller 1400 to secure the bead chain 122 relative to the slider 1300 to lock a position of the bead chain 122.

In use, as previously mentioned, the slider 1300 may be moved from a first position to a second position such that the slider 1300 no longer contacts the bead chain 122, thereby permitting the bead chain 122 to move relative to the tensioner 1200. In use, a fastener may be used to mount the tensioner 1200 to a wall or other adjacent structure. For example, a fastener (not shown) may be inserted through an opening 1310 formed in the slider 1300 for mounting the tensioner 1200 to the adjacent structure. In use, the tensioner 1200 may be mounted to the adjacent structure with the slider 1300 in the second position (e.g., the slider 1300 is positioned such that it does not contact the bead chain 122).

As previously mentioned, the tensioner 1200 is mounted to the adjacent structure with the bead chain 122 in a taut condition. As such, with the bead chain 122 in a taut condition and with the slider 1300 in the second position, the bead chain 122 is free to move relative to the tensioner 1200 so that the covering 106 can be moved between the extended and retracted positions. However, in use, if the tensioner 1200 is decoupled from the adjacent structure (e.g., the tensioner 1200 is no longer mounted to the adjacent structure) or if the tensioner 1200 is mounted incorrectly such that, for example, the bead chain 122 is in a non-taut condition, the slider 1300 is biased to the first position (e.g., the slider 1300 moves into contact with the bead chain 122) to prevent the bead chain 122 from moving relative to the slider 1300 and hence the tensioner 1200.

As illustrated, the slider 1300 includes a first end 1302, a second end 1304, and an intermediate portion 1306 extending between the first and second ends 1302, 1304. The first end 1302 of the slider 1300 is arranged and configured to interact with the bead chain 122. For example, as illustrated and as previously described in connection with tensioner 200, the first end 1302 of the slider 1300 may include first and second projections, tines, or the like 1303. Thus arranged, the first end 1302 of the slider 1300 may be characterized as including a "pitch-fork" configuration. In use, the first end 1302 of the slider 1300 is adapted and configured for interacting with the bead chain 122. In addition, the first end 1302 of the slider 1300 is adapted and configured for interacting with the roller 1400. That is, the tines 1303 are arranged and configured to be positioned in-between beads of the bead chain. In addition, the tines 1303 are arranged and configured to be received in pockets 1414 formed in the roller 1400.

As previously described, the roller 1400 may include a plurality of legs, projections, or the like 1410. In use, the roller 1400 includes a bearing surface 1412 for enabling the bead chain 122 to move there along. In addition, the plurality of legs 1410 define a series of pockets 1414 for receiving the tines 1303 formed on the first end 1302 of the slider 1300. Thus arranged, in the first position, the tines 1303 formed on the first end 1302 of the slider 1300 are adapted and configured to be received within one of the pockets 1414 formed on the roller 1400. In addition, the tines 1303 formed on the first end 1302 of the slider 1300 are adapted and configured to interact with the bead chain 122. Thus arranged, in the first position, with the tines 1303 contacting the plurality of legs 1410 formed on the roller 1400 and with the tines 1303 contacting the bead chain 122, the bead chain 122 is prevented from moving relative to the tensioner 1200.

In use, as previously mentioned, the slider 1300 may be biased towards the first position so that the first end 1302 of the slider 1300 prevents movement of the bead chain 122 relative to the tensioner 1200. As such, in use, when properly mounted, the tensioner 1200 is mounted so that the slider 1300 is in the second position so that the first end 1302 of the slider 1300 does not engage the bead chain 122 so that the bead chain 122 can be freely moveable. Thus arranged, the tensioner 1200 allows the bead chain 122 to move relative to the tensioner 1200. However, when the tensioner 1200 is decoupled from the adjacent structure or when the tensioner 1200 is installed improperly, the biasing member 1350 biases the slider 1300 into contact with the roller 1400 and/or the bead chain 122 so that the bead chain 122 is prevented from moving relative to the tensioner 1200.

In accordance with one or more features of the present disclosure, in use, the tensioner 1200 may include a button mechanism, also referred to herein as a spring-loaded button mechanism 1500. In use, as previously described in connection with tensioner 800, the spring-loaded button mechanism 1500 is moveable from a first position to a second position. In the first position (FIG. 25), the spring-loaded button mechanism 1500 is arranged and configured to interact with, contact, engage, or the like (terms used interchangeably herein without the intent to limit or distinguish) the slider 1300 to prevent the slider 1300 from moving to its second position. In the second position (FIGS. 26 and 27), the spring-loaded button mechanism 1500 releases the slider 1300 so that an end user, installer, etc. is able to move the slider 1300 to its second position. In some embodiments, the spring-loaded button mechanism 1500 is biased to the first position. For example, the spring-loaded button mechanism 1500 may be internally biased or configured to contact the slider 1300. In use, the spring-loaded button mechanism 1500 is arranged and configured to be manipulated, compressed, depressed, etc. (terms used interchangeably herein without the intent to limit or distinguish) by the end user, installer, etc. in order to move the spring-loaded button mechanism 1500 from the first position to the second position.

As illustrated, in some embodiments, the spring-loaded button mechanism 1500 may include first and second buttons 1510, 1512 accessible through the body 1210 of the tensioner 1200. In addition, the spring-loaded button mechanism 1500 may include first and second stops 1520, 1522, which may be arranged and configured as inwardly projecting legs, tabs, projections, or the like (terms used interchangeably herein without the intent to limit or distinguish). In use, the first and second stops 1520, 1522 are arranged and configured to interact with the slider 1300 to prevent the slider 1300 from moving to its second position. However, as illustrated, in use, an end user, installer, etc. during, for example, installation, may depress the first and second buttons 1510, 1512 causing the first and second stops 1520, 1522 on the spring-loaded button mechanism 1500 to release the slider 1300 (e.g., first and second stops 1520, 1522 on the spring-loaded button mechanism 1500 move away from, pivot, etc. from the slider 1300) thereby releasing or disengaging the slider 1300 so that the slider 1300 can be moved to its second position against the biasing force of the biasing member 1350 thereby enabling the second end 1304 of the slider 1300 to be mounted to the adjacent structure with the slider 1300 in its second position so that the first end 1302 of the slider 1300 does not contact the bead chain 122. However, in use, if the tensioner 1200 is decoupled from the adjacent structure, the biasing member 1350 biases the slider 1300 to its first position so that the first end 1302 of the slider 1300 interacts with the roller 1400 and the bead chain 122. In addition, in some embodiments, the spring-loaded button mechanism 1500 is arranged and configured to bias the first and second stops 1520, 1522 into contact with the slider 1300 to lock the slider 1300 into its first position until the first and second buttons 1510, 1512 are depressed once again.

In some embodiments, as illustrated, the spring-loaded button mechanism 1500 may include first and second arms 1530, 1532. Each of the first and second arms 1530, 1532 being pivotably connected to the body 1210 of the tensioner 1200. For example, as illustrated, each of the first and second arms 1530, 1532 may be characterized as including a first end portion **1530*a*, 1532*a*, a second end portion 1530*b*, 1532*b*, and an intermediate portion 1530*c*, 1532*c*. In use, the first and second buttons 1510, 1512 may be associated with the intermediate portion 1530*c*, 1532*c*. The first and second stops 1520, 1522 may be associated with the first end portions 1530*a*, 1532*a*. The first and second arms 1530, 1532 may be pivotably coupled to the body 1210 of the tensioner 1200 at a position in-between the stops 1520, 1522 and the buttons 1510, 1512. As such, in use, pressing the first button 1510 causes the first arm 1530 to deflect or move, which causes the first stop 1520 to disengage from the slider 1300. Similarly, pressing the second button 1512 causes the second arm 1532 to deflect or move, which causes the second stop 1522 to disengage from the slider 1300. In some embodiments, the spring-loaded button mechanism 1500 is arranged and configured so that the first and second buttons 1510, 1512 require simultaneous activation in order to release the slider 1300. As illustrated, in some embodiments, the slider 1300 may also include first and second stops 1320, 1322 for contacting the first and second stops 1520, 1522 formed on the spring-loaded button mechanism 1500**, although this is but one configuration.

In use, when the first and second buttons 1510, 1512 are compressed, the first and second stops 1520, 1522 formed on the spring-loaded button mechanism 1500 disengage the first and second stops 1320, 1322 formed on the slider 1300, thereby releasing or unlocking the slider 1300 so that the slider 1300 can be moved to its second position to release the bead chain 122.

As illustrated, in some embodiments, the spring-loaded button mechanism 1500 may be formed as a single integral or monolithic component. For example, the first and second arms including the first end portions, the second end portions, the intermediate portions, the stops, and the buttons may be integrally or monolithically formed. However, this is but one configuration, and the spring-loaded button mechanism may be manufactured from multiple components and thereafter assembled together.

In accordance with one or more features of the present disclosure, in a preferred embodiment, the tensioner 1200 may include one or more features for guiding movement of the slider 1300 relative to the body 1210 of the tensioner 1200. In use, in accordance with this particular embodiment, the guiding feature prevents the slider 1300 from tilting relative to the body 1210 of the tensioner 1200. For example, the body 1210 may include a longitudinal extending rib, rail, ledge, projection, or the like (terms used interchangeably herein without the intent to limit or distinguish). The slider 1300 may include a corresponding slot or recess 1340 (terms used interchangeably herein without the intent to limit or distinguish) arranged and configured to interact with the rail, although it is envisioned that the slot may be formed on the body and the rail may be formed on the slider. In use, engagement of the rail and slot 1340 guides movement of the slider 1300 between the first and second positions and prevents, or at least inhibits, tilting, pivoting, etc. of the slider 1300, although this is but one configuration and the slider 1300 may be arranged and configured to tilt as desired.

In accordance with one or more features of the present disclosure, tensioners 200, 500 have been described with one or more features including, for example, tilting of the slider 300, 600 so that one or more stops formed on the slider 300, 500 contact one or more stops formed in the body 210, 510 of the tensioner 200, 500. Tensioners 800, 1200 have been described with one or more features including, for example, spring-loaded button mechanisms 1100, 1500 for enabling an end user, installer, etc. to release the slider 900, 1300 so that the slider 900, 1300 may be moved to the second position. It should be understood that one or more features from one or more embodiments may be interchangeable as desired. For example, with reference to FIG. 28, an alternate embodiment of a tensioner 1600 may be arranged and configured to include a slider 1700, which is tiltable so that one or more stops formed on the slider 1700 contact one or more stops formed in the body of the tensioner 1600. In addition, the tensioner 1600 may include a spring-loaded button mechanism 1800 arranged and configured as a secondary locking mechanism.

Figure 29A:
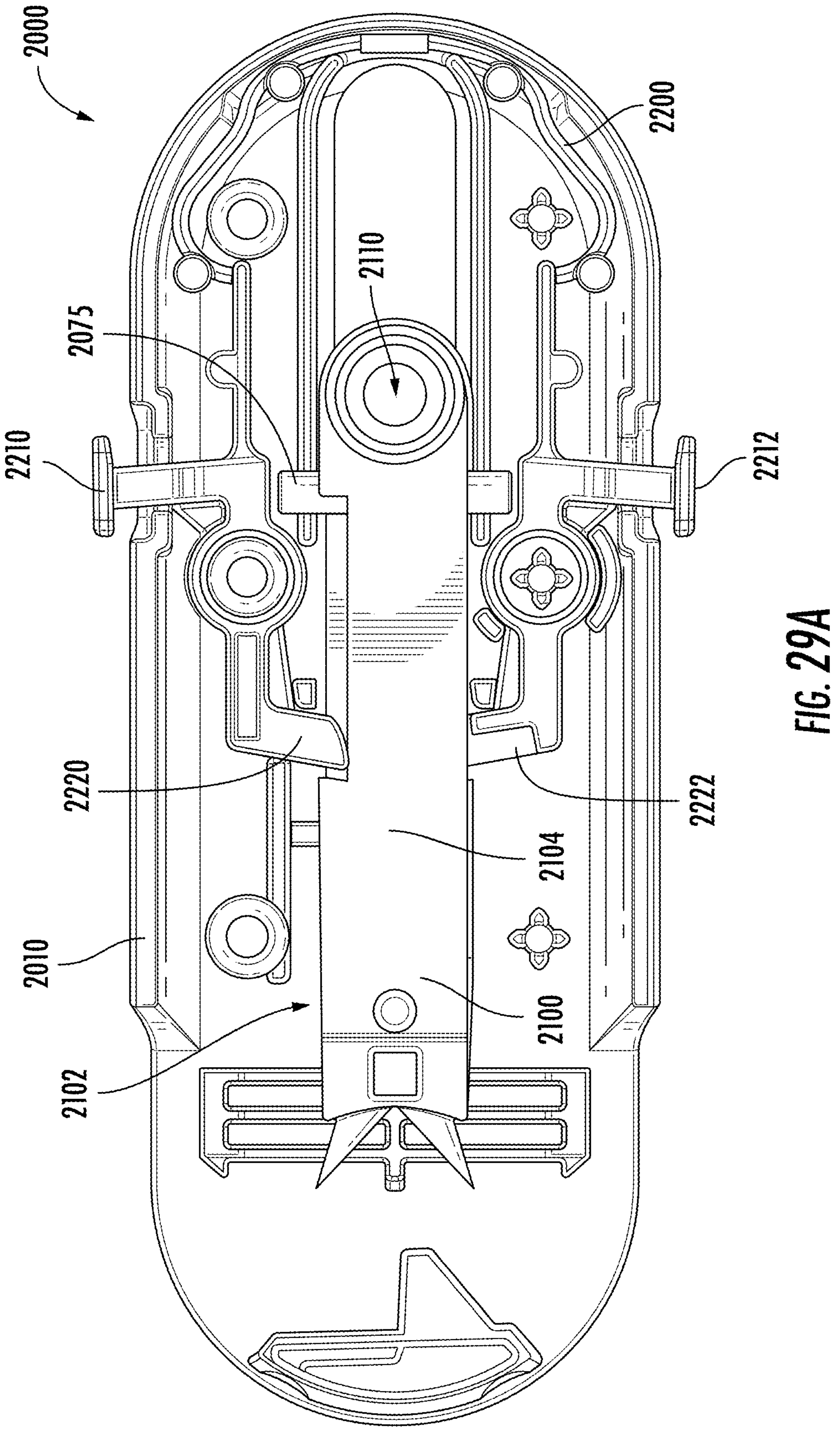
FIG. 29A-29C illustrate various views of an alternate example of an embodiment of a tensioner in accordance with one or more features of the present disclosure.
Figure 29B:
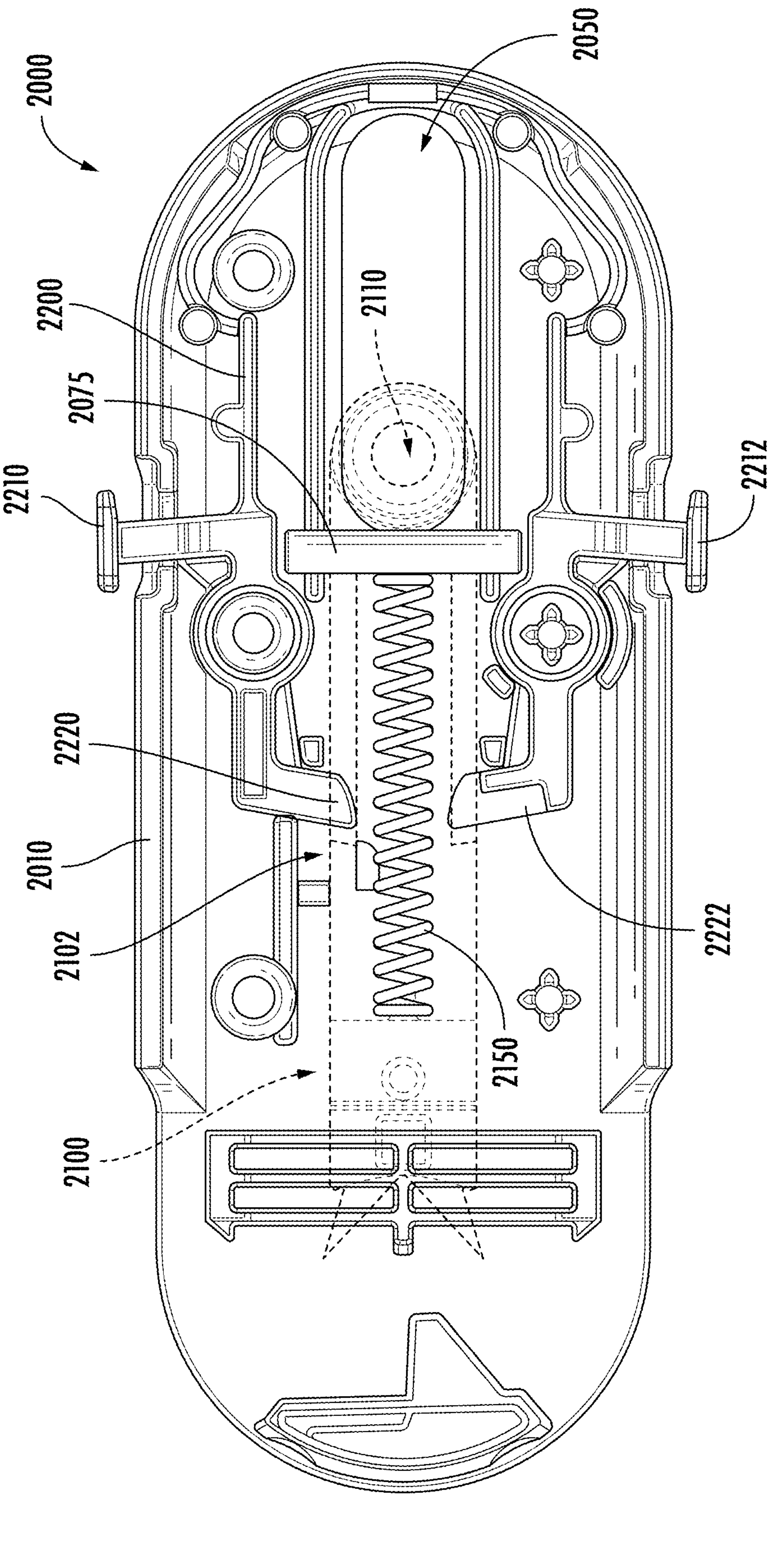
Figure 29C:
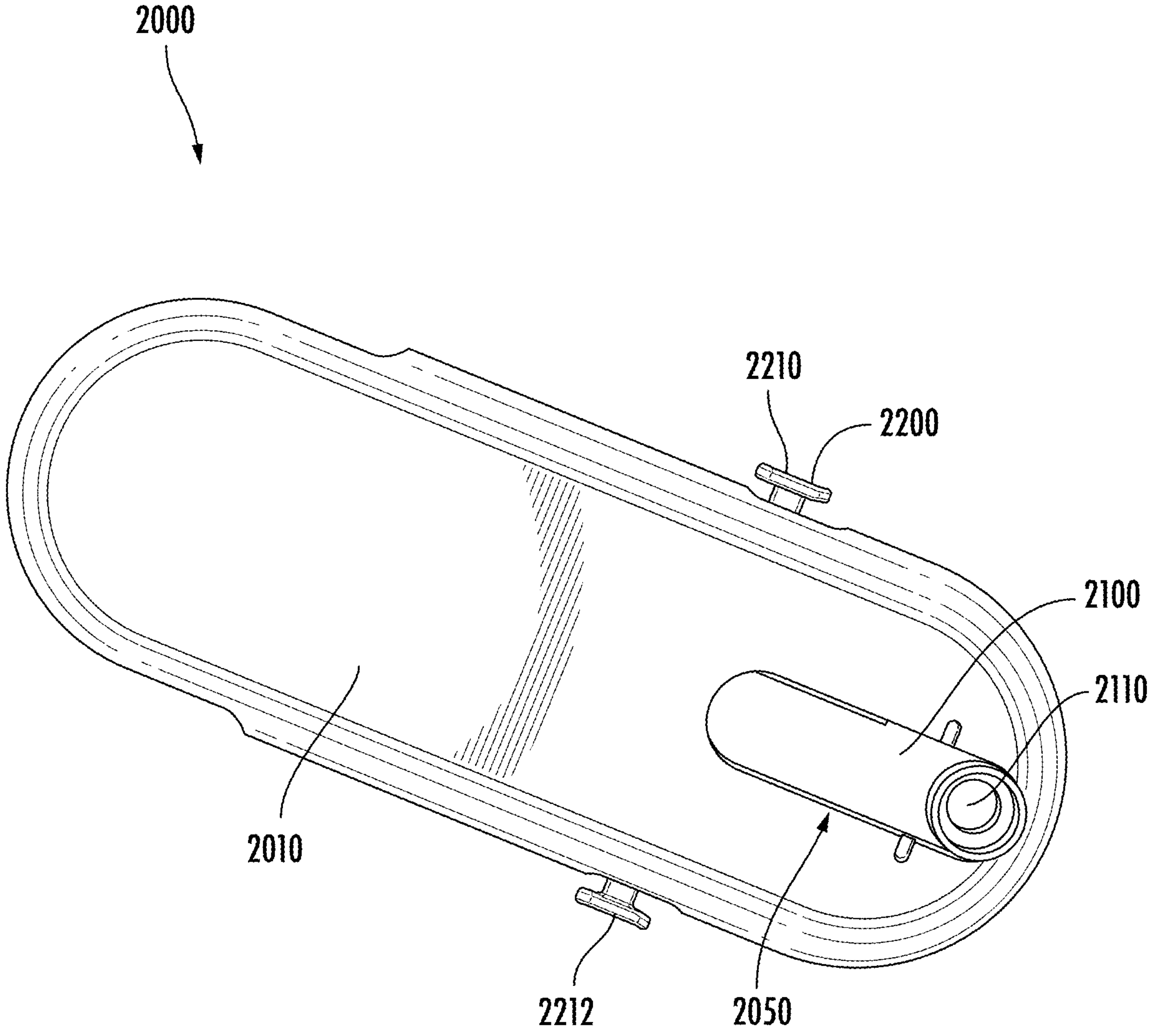

With reference to FIGS. 29A-29C, an alternate embodiment of a tensioner 2000 in accordance with one or more features of the present disclosure will now be described. As will be described, the alternate embodiment of the tensioner 2000 is substantially similar to those previous described herein and, in particular to tensioners 800, 1200, 1600 described in connection with FIGS. 22-27, thus for the sake of brevity discussion of common features may be omitted herefrom.

As illustrated, the tensioner 2000 may include a body 2010. The body 2010 may include an elongated slot 2050 formed therein for accessing a slider 2100 movably positioned within the body 2010 of the tensioner 2000. In use, as previously described, the slider 2100 is moveable between a first position and a second position. In the first position (e.g., the first or locked configuration), the slider 2100 interacts with, contacts, etc. the operating element 120. Meanwhile, in the second position (e.g., the second or unlocked configuration), the slider 2100 does not interact with or contact the operating element 120 thereby permitting the operating element 120 to move relative to the tensioner 2000.

In use, and as previously described, the tensioner 2000 is mounted to an adjacent structure (e.g., a window frame or the like). As previously described, the second end of the slider 2100 is adapted and configured to be accessed via, for example, the elongated slot 2050 formed in the body 2010 of the tensioner 2000. As illustrated, the second end of the slider 2100 includes the opening 2110 for receiving a fastener for mounting the tensioner 2000 to the adjacent structure. In this manner, with the first end of the slider 2100 in contact with the operating element 120, an end user, an installer, etc. may (e.g., during mounting) move the slider 2100 from the first position to the second position against the biasing force of a biasing member. Thereafter, one or more fasteners, such as a screw, a nail, a bolt, or the like, may be used to mount the tensioner 2000 to a wall of the adjacent structure (e.g., a fastener may be inserted through the opening 2110 formed in the slider 2100 for mounting the tensioner 2000 to the adjacent structure). The tensioner 2000 may be mounted to the adjacent structure with the slider 2100 in the second position (e.g., the slider 2100 is positioned such that it does not contact the operating element 120; the second end of the slider 2100 may be mounted to the adjacent structure with the slider 2100 in the second position so that the first end of the slider 2100 does not contact the operating element 120).

In this configuration (e.g., the second or unlocked configuration), the tensioner 2000 is mounted to the adjacent structure with the operating element 120 in a taut condition. As such, with the operating element 120 in a taut condition and with the slider 2100 in the second position, the operating element 120 is free to move relative to the tensioner 2000 so that the covering 106 can be moved between the extended and retracted positions. However, in use, if the tensioner 2000 is decoupled from the adjacent structure (e.g., the tensioner 2000 is not mounted to the adjacent structure) or if the tensioner 2000 is mounted incorrectly such that, for example, the operating element 120 is held in a non-taut condition, the slider 2100 is biased to the first position (e.g., the slider 2100 moves into contact with the operating element 120) to prevent the operating element 120 from moving relative to the slider 2100 and hence the tensioner 2000.

In some embodiments, as previously described, the body 2010 may include first and second body members. In addition, the tensioner 2000 may also include a biasing member (e.g., a biasing spring) for biasing the slider 2100 into the first position, and a bearing/roller, which may have various configurations as previously described herein depending on whether the operating element 120 being used is in the form of an operating cord or a bead chain.

In addition, as previously described, the tensioner 2000 may incorporate an active locking mechanism such as, for example, a button mechanism, which requires an end user, an installer, etc. to actively release or disengage the slider 2100 of the tensioner 2000 during, for example, installation. That is, in some embodiments, the tensioner 2000 may include a spring-loaded button mechanism 2200. In use, compression of the spring-loaded button mechanism 2200 by the end user, the installer, etc. releases the slider 2100 which enables the slider 2100 to move to the second or unlocked position so that the operating element (e.g., operating cord, bead chain, etc.) can be moved relative to the tensioner 2000.

That is, in use, the spring-loaded button mechanism 2200 is moveable from a first position to a second position. In the first position, the spring-loaded button mechanism 2200 is arranged and configured to interact with, contact, engage, or the like (terms used interchangeably herein without the intent to limit or distinguish) the slider 2100 to prevent the slider 2100 from moving to its second position. In the second position, the spring-loaded button mechanism 2200 releases the slider 2100 so that an end user, an installer, etc. is able to move the slider 2100 to its second position. In use, the spring-loaded button mechanism 2200 may be arranged and configured to be manipulated, compressed, depressed, etc. (terms used interchangeably herein without the intent to limit or distinguish) by the end user, installer, etc. in order to move the spring-loaded button mechanism 2200 from its first position to its second position so that the slider 2100 can be moved from its first position to its second position during, for example, installation.

As previously described, in some embodiments, the spring-loaded button mechanism 1100 may include first and second buttons 2210, 2212 accessible through the body 2010 of the tensioner 2000. In addition, the spring-loaded button mechanism 2200 may include first and second stops 2220, 2222, which may be arranged and configured as inwardly projecting legs, tabs, projections, or the like (terms used interchangeably herein without the intent to limit or distinguish). In use, the first and second stops 2220, 2222 are arranged and configured to interact with the slider 2100 to prevent the slider 2100 from moving to the second position. However, in use, an end user, installer, etc. during, for example, installation, may depress the first and second buttons 2210, 2212 causing the first and second stops 2220, 2222 to release the slider 2100 thereby disengaging or releasing the slider 2100 so that the slider 2100 can be moved to its second position against the biasing force of the biasing member thereby enabling the second end of the slider 2100 to be mounted to the adjacent structure with the slider 2100 in its second position so that the first end of the slider 2100 does not contact the operating element 120.

As the structure, configuration, and operation of the body 2010, the slider 2100, the spring-loaded button mechanism 2200, etc. is substantially similar to previously described embodiments, for the sake of brevity, additional disclosure is omitted herein.

In accordance with tensioner 2000, in contrast to tensioner 800, 1200, 1600 previously described herein, the portion of the slider 2100 housing the biasing element (e.g., biasing spring) is orientated (e.g., rotated) approximately ninety-degrees relative to the portion of the slider housing the biasing element (e.g., biasing spring) in tensioners 800, 1200, 1600. That is, as illustrated, the opening 2102 formed in the slider 2100 for receiving the biasing member (e.g., biasing spring 2150) is orientated perpendicular relative to the opening 2110 for receiving the fastener. Thus arranged, upon moving the slider 2100 from the first position to the second position, a wall or surface 2104 of the slider 2100 closes the elongated slot 2050 formed in the body 2010. As such, with the tensioner 2000 mounted to the adjacent structure with the operating element 120 in a taut condition and with the slider 2100 in the second position, the elongated slot 2050 formed in the body 2010 is rendered inaccessible (as best illustrated in FIG. 29C).

As illustrated, in accordance with one or more features of the present disclosure, the tensioner 2000 may include a pin 2075 (e.g., dowel pin) arranged and configured to contact the basing element (e.g., biasing spring). In use, the pin 2075 acts as a bearing surface for the biasing element (e.g., biasing spring) to bear against to bias the slider 2100 to the first position (e.g., biasing spring is positioned between the inside surface of the slider 2100 and the pin 2075).

Figure 30A:
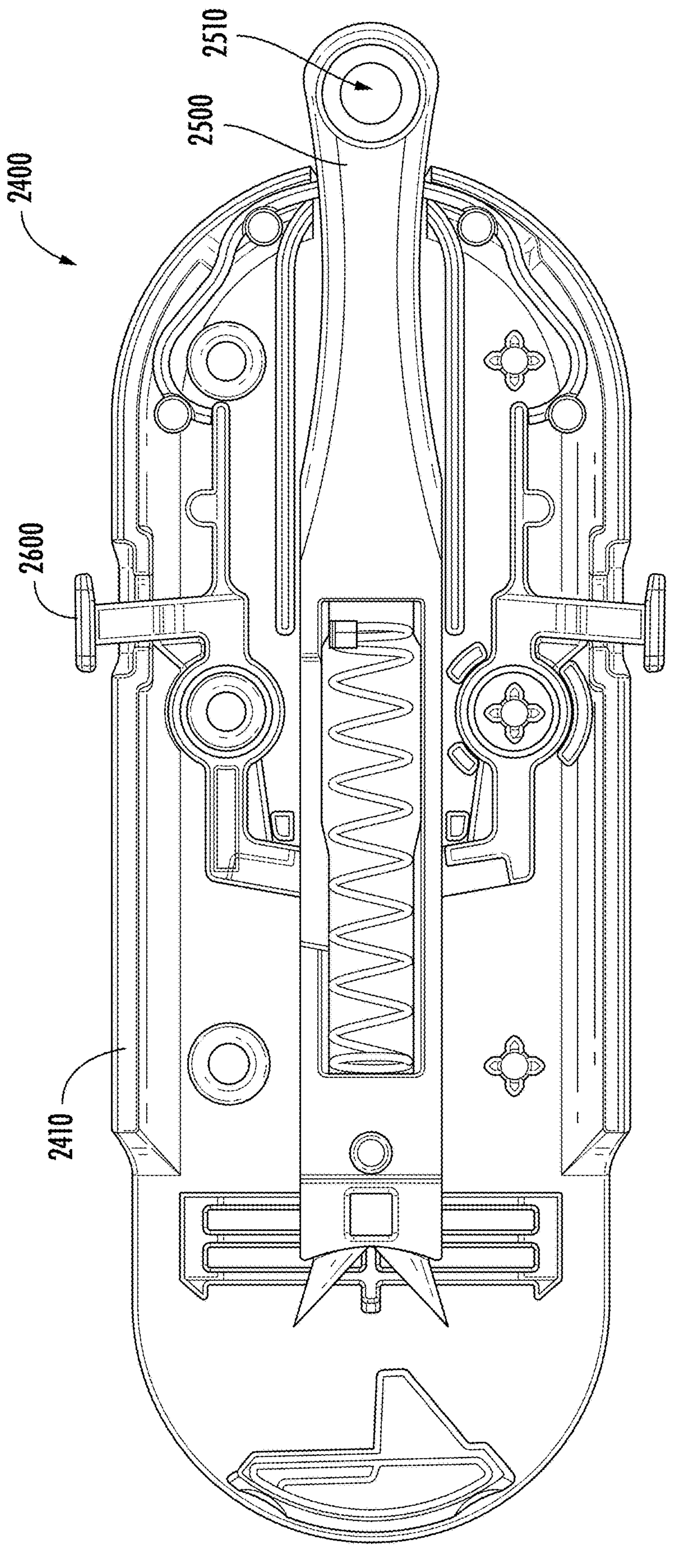
FIG. 30A-30C illustrate various views of an alternate example of an embodiment of a tensioner in accordance with one or more features of the present disclosure.
Figure 30B:
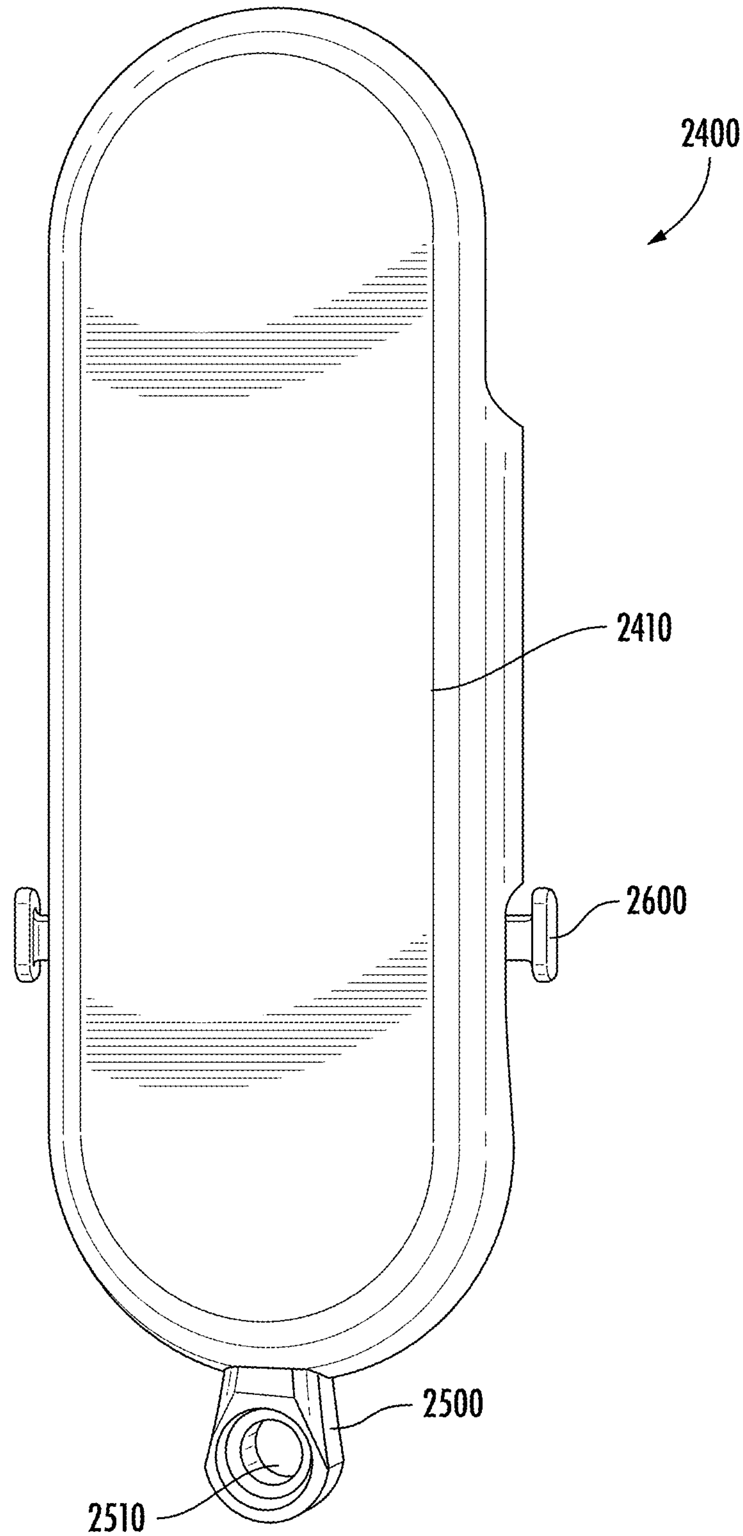
Figure 30C:
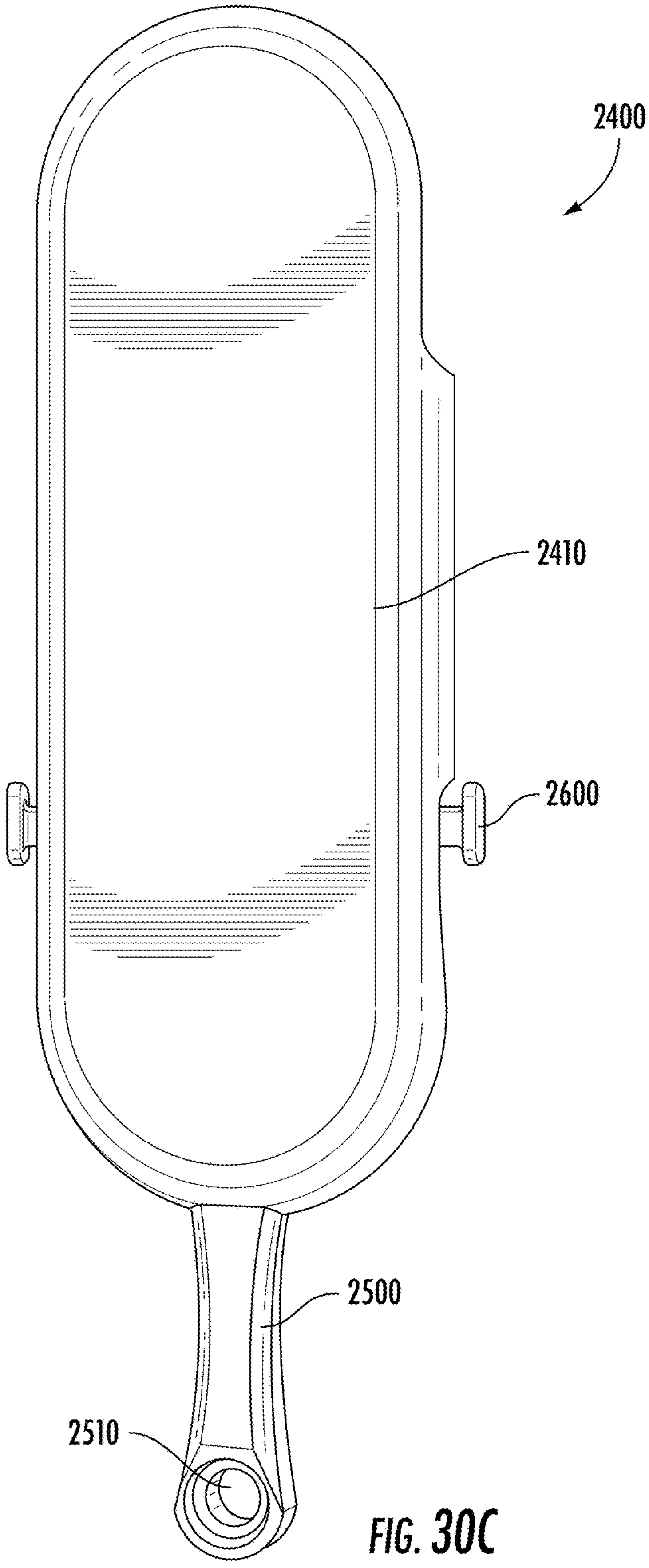

With reference to FIGS. 30A-30C, an alternate embodiment of a tensioner 2400 in accordance with one or more features of the present disclosure will now be described. As will be described, the alternate embodiment of the tensioner 2400 is substantially similar to those previous described herein and, in particular to tensioners 800, 1200, 1600, 2000, thus for the sake of brevity discussion of common features may be omitted herefrom.

As illustrated, the tensioner 2400 may include a body 2410. In accordance with tensioner 2400, the slider 2500 is arranged and configured to extend from the body 2410. For example, the slider 2500 is arranged and configured with a sufficient length so that the second end of the slider 2500 extends through an opening formed in the body 2410 of the tensioner 2400. That is, as illustrated, the second end of the slider 2500 includes an opening 2510 for receiving a fastener for mounting the tensioner 2400 to, for example, an adjacent structure such as, for example, a window frame. The opening 2510 formed in the second end of the slider 2500 being formed in the segment of the slider 2500, which extends from the body 2410 of the tensioner 2400. Thus arranged, in contrast to previously described tensioners, the body 2410 is devoid of an elongated slot for accessing the opening formed in the slider (e.g., the body 2410 does not include an elongated slot formed therein for accessing the slider).

Thus arranged, in use, the end user, installer, etc. may grip the second end of the slider 2500, which extends from the body 2410 of the tensioner 2400, to move the slider 2500 between a first position (FIG. 30B) and a second position (FIG. 30C). As previously described, in the first position (e.g., the first or locked configuration), the slider 2500 interacts with, contacts, etc. the operating element 120. Meanwhile, in the second position (e.g., the second or unlocked configuration), the slider 2500 does not interact with or contact the operating element 120 thereby permitting the operating element 120 to move relative to the tensioner 2400.

As previously described, the tensioner 2400 is mounted to an adjacent structure (e.g., a window frame or the like). In use, with the first end of the slider 2500 in contact with the operating element 120, an end user, an installer, etc. may (e.g., during mounting) move the slider 2500 from the first position to the second position against the biasing force of a biasing member. The second end of the slider 2500 may then be mounted to the adjacent structure with the slider 2500 in the second position so that the first end of the slider 2500 does not contact the operating element 120. For example, one or more fasteners, such as a screw, a nail, a bolt, or the like, may be used to mount the tensioner 2400 to the adjacent structure (e.g., a fastener may be inserted through the opening 2510 formed in the slider 2500 for mounting the tensioner 2400 to the adjacent structure). The tensioner 2400 is mounted to the adjacent structure with the slider 2500 in the second position (e.g., the slider 2500 is positioned such that it does not contact the operating element 120).

In some embodiments, as previously described, the body 2410 may include first and second body members. In addition, the tensioner 2400 may also include a biasing member (e.g., a biasing spring) for biasing the slider 2500 into the first position, and a bearing/roller, which may have various configurations as previously described depending on whether the operating element 120 being used is in the form of an operating cord or bead chain. In addition, as previously described, the tensioner 2400 may incorporate an active locking mechanism such as, for example, a button mechanism, which requires an end user, an installer, etc. to actively release or disengage the slider 2500 of the tensioner 2400 during, for example, installation. That is, in some embodiments, the tensioner 2400 may include a spring-loaded button mechanism 2600. In use, compression of the spring-loaded button mechanism 2600 by the end user, the installer, etc. releases the slider 2500 which enables the slider 2500 to move to the second or unlocked position so that the operating element (e.g., operating cord, bead chain, etc.) can be moved relative to the tensioner 2000.

With reference to FIGS. 31A-31J, an alternate embodiment of a tensioner 3000 is illustrated. In use, the tensioner

3000 operates substantially similar to the previously described tensioners. As such, for sake of brevity, some description of the tensioner 3000 may be omitted herefrom.

Figure 31A:
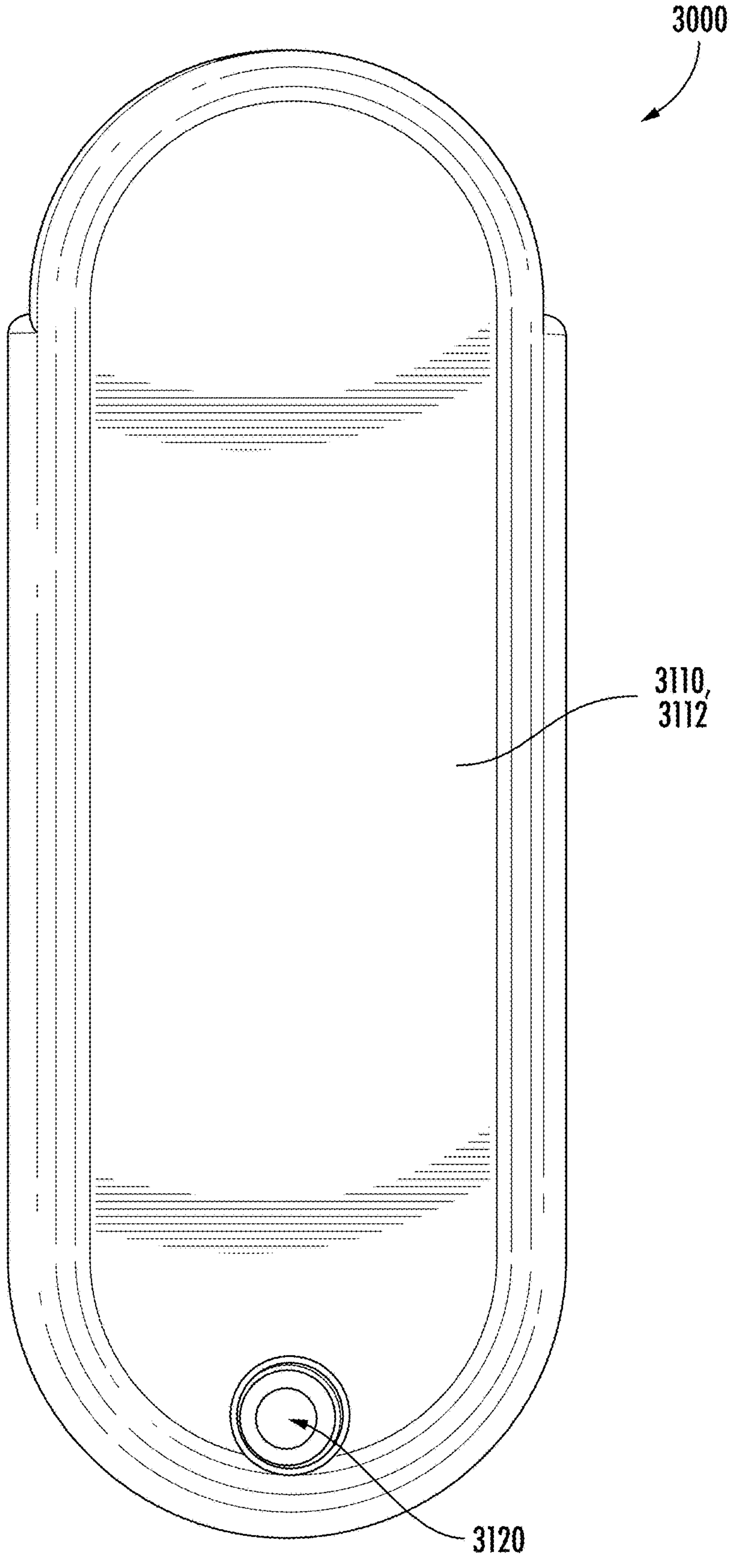
FIG. 31A-31J illustrate various views of alternate examples of embodiments of a tensioner in accordance with one or more features of the present disclosure.
Figure 31B:
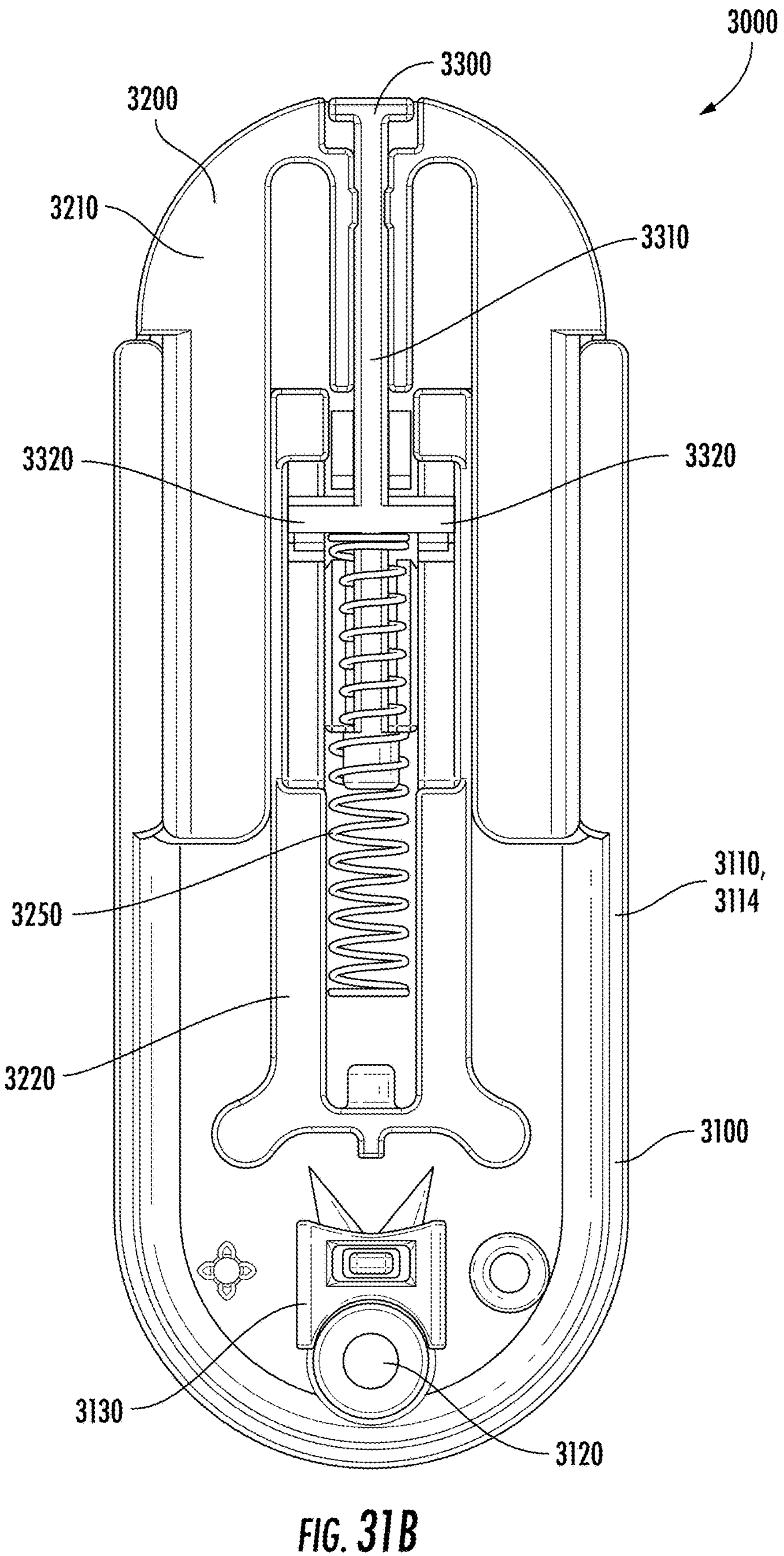
Figure 31C:
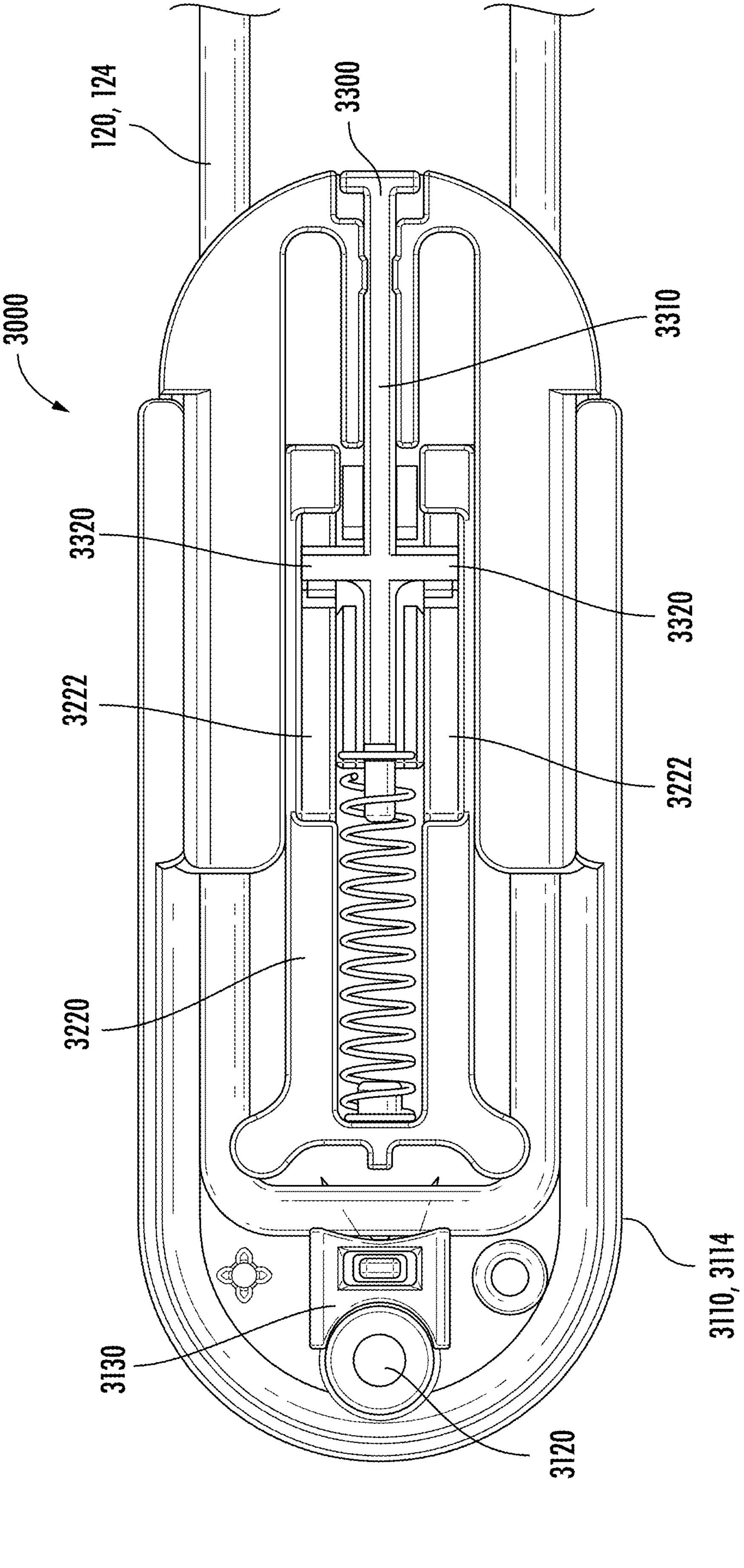
Figure 31D:
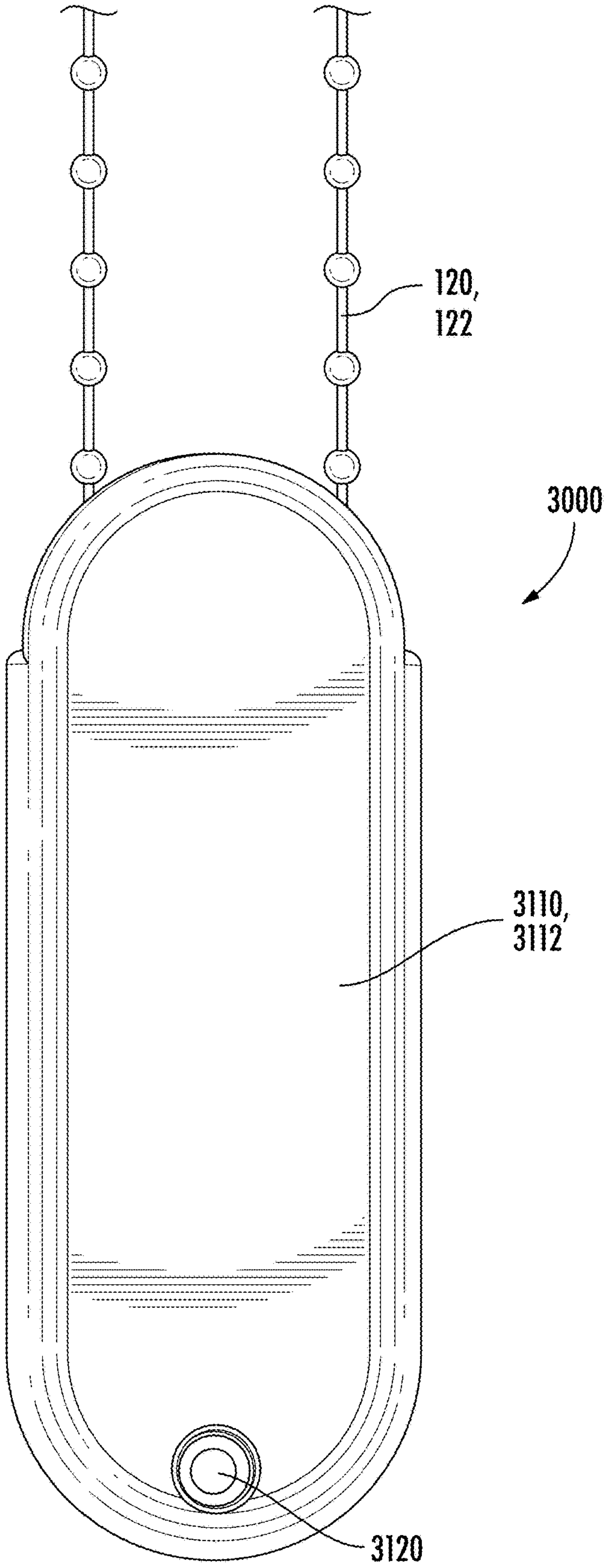
Figure 31E:
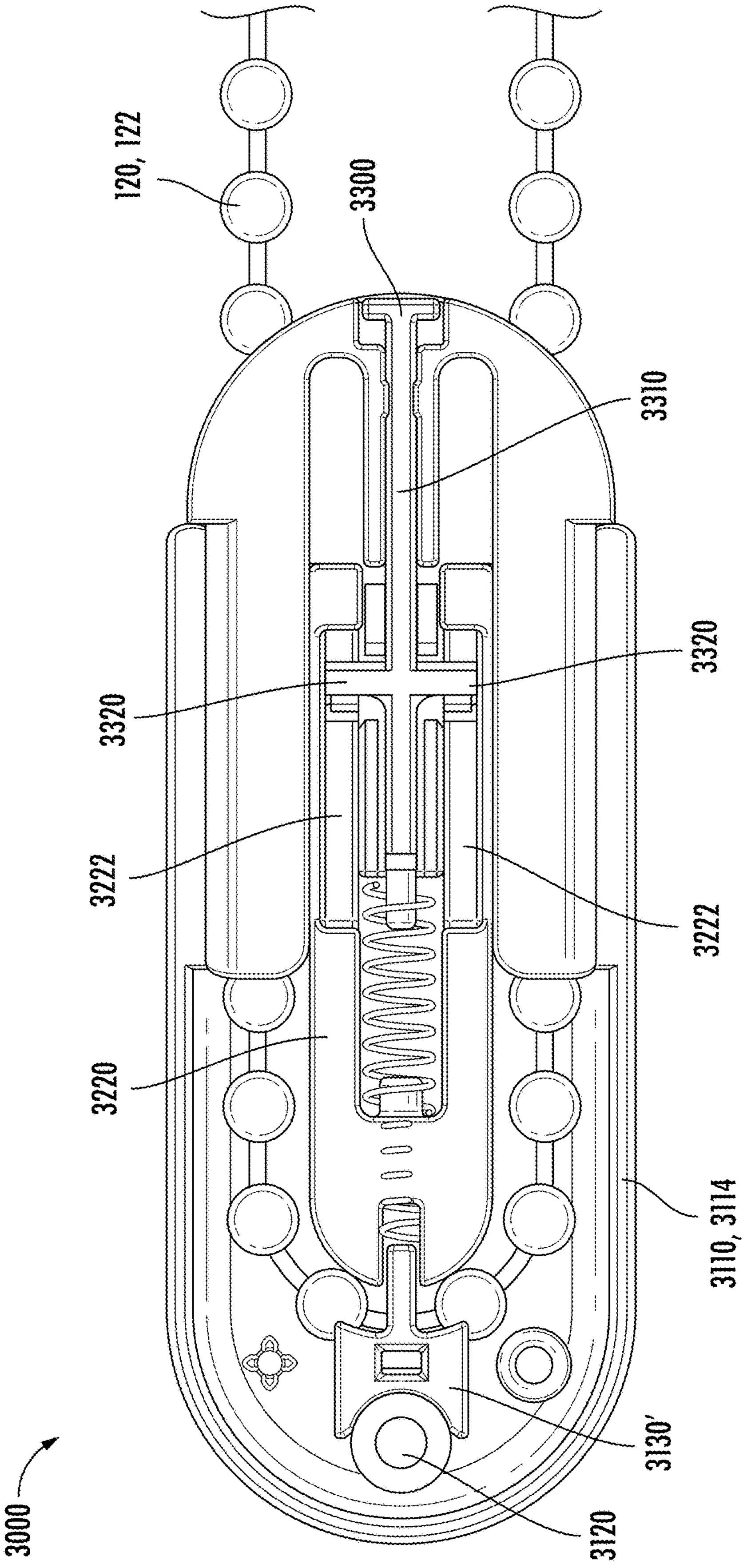
Figure 31F:
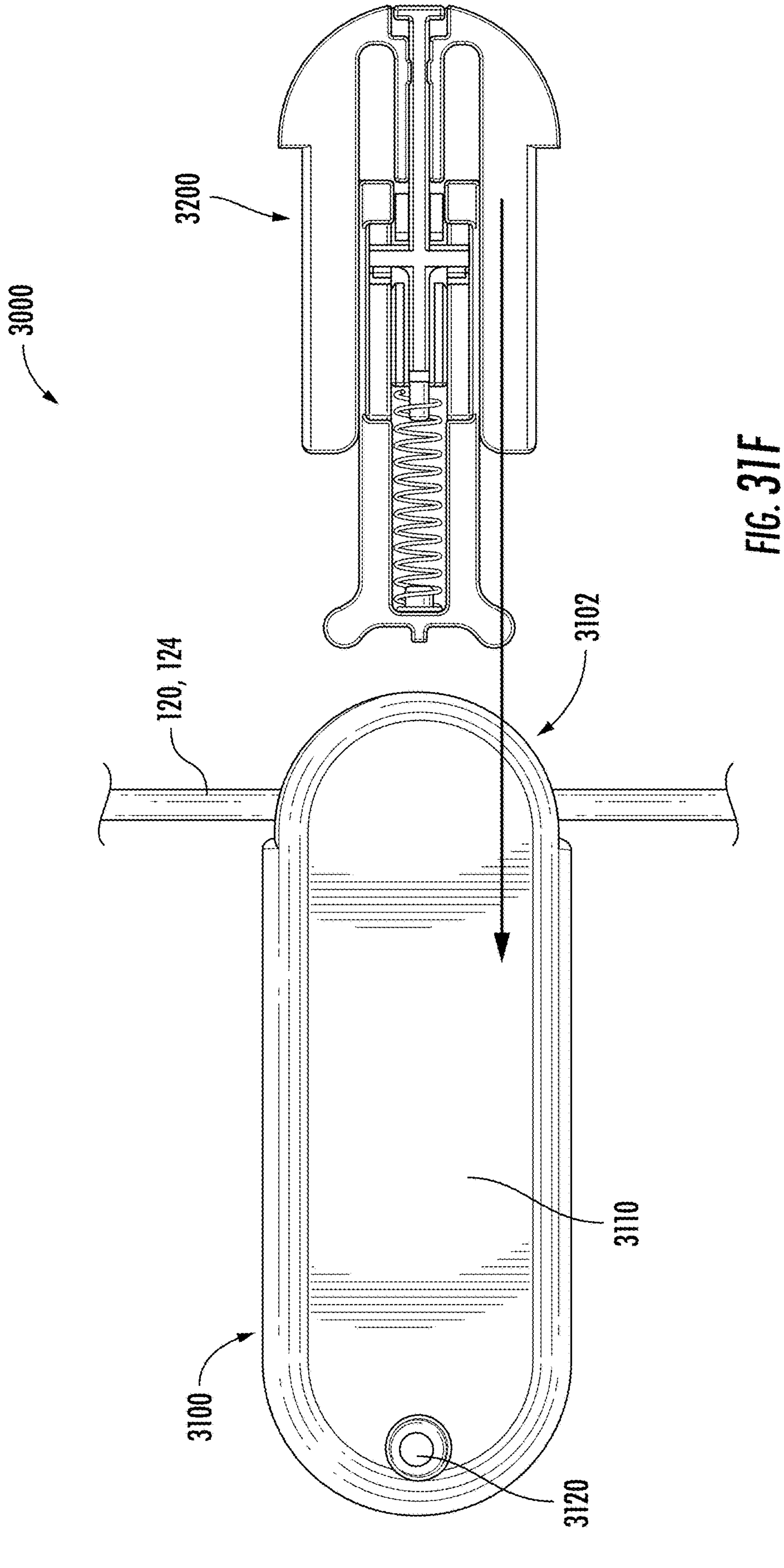

As previously mentioned, in use, the architectural-structure covering may include an operating element 120, which, in use, is operatively associated with an operating system (not shown) to move the covering 106 between the extended and retracted positions. As previously illustrated and described, in some embodiments, the operating element 120 may be in the form of an operating cord 124 (FIGS. 31C and 31F). Alternatively, in some embodiments, the operating element 120 may be in the form of a bead chain 122 (FIGS. 31D and 31E).

Regardless of the form of the operating element 120, as previously described herein, the tensioner 3000 is movable between a first configuration and a second configuration. In the first configuration, the operating element 120 is secured relative to the tensioner 3000 (e.g., prevented from moving) while in the second configuration, the operating element 120 is freely movable relative to the tensioner 3000. That is, the tensioner 3000 is adapted and configured to enable the operating element 120 to be locked and unlocked against relative movement with respect to the tensioner 3000. In the unlocked or second configuration, the operating element 120 is permitted to move sufficiently relative to the tensioner 3000 so that the covering 106 can move between the extended and retracted positions. In the locked or first configuration, the operating element 120 is prohibited or prevented from moving sufficiently relative to the tensioner 3000. In this manner, with the tensioner 3000 in the unlocked configuration, the operating element 120 can be moved relative to the tensioner 3000 so that the covering 106 can be moved between the extended and retracted positions. In use, the tensioner 3000 is in the unlocked configuration when properly mounted to an adjacent structure. However, in use, if the tensioner 3000 is decoupled from the adjacent structure (e.g., the tensioner 3000 is not mounted to the adjacent structure) or if the tensioner 3000 is mounted incorrectly such that, for example, the operating element 120 is held in a non-taut condition, the tensioner 3000 is biased to the first or locked configuration to prevent the operating element 120 from moving relative to the tensioner 3000. In this manner, for the operating element 120 to function properly (e.g., to move the covering 106 between the extended and retracted positions), the tensioner 3000 is mounted to the adjacent structure with the slider 3220 in the second or unlocked position with the operating element 120 in a taut condition.

In some embodiments, as illustrated in FIG. 31F, the tensioner 3000 may include a housing subassembly 3100 and a cartridge subassembly 3200. In use, the operating element 120 is positioned with an opening or slot 3102 formed in the housing assembly 3100. Thereafter, the cartridge subassembly 3200 may be inserted into the housing subassembly 3100 (e.g., the operating element 120 (i.e., the operating cord 124 or the bead chain 122) may be laid across the opening or slot 3102 formed in the housing subassembly 3100. Thereafter, the cartridge subassembly 3200 may be inserted into the housing subassembly 3100). In use, the cartridge subassembly 3200 may be inserted into the housing subassembly 3100 until the cartridge subassembly 3200 is locked into position. Once secured, in some embodiments, the cartridge subassembly 3200 cannot be removed from the housing subassembly 3100 without damaging the cartridge subassembly 3200.

Figure 31G:
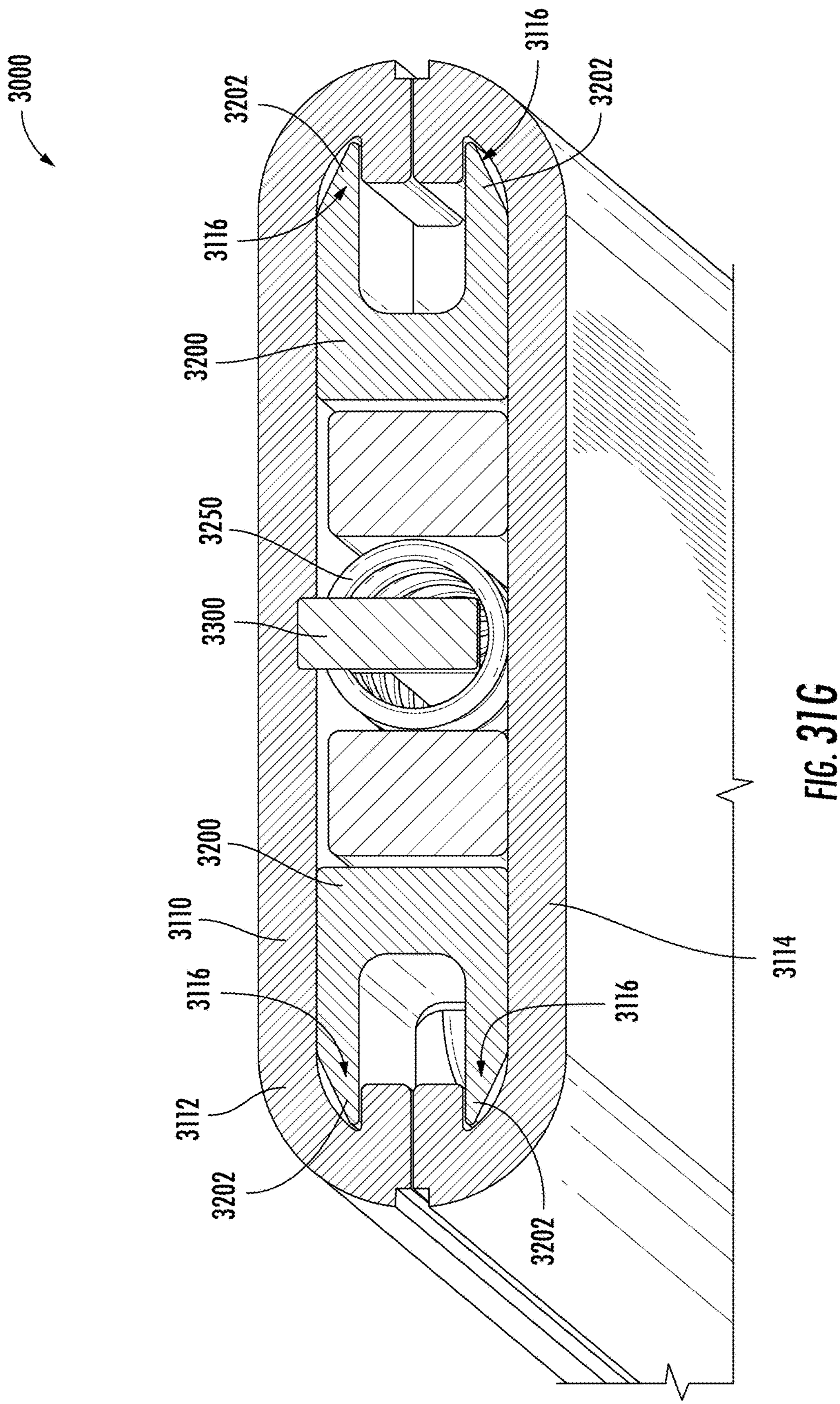
Figure 31H:
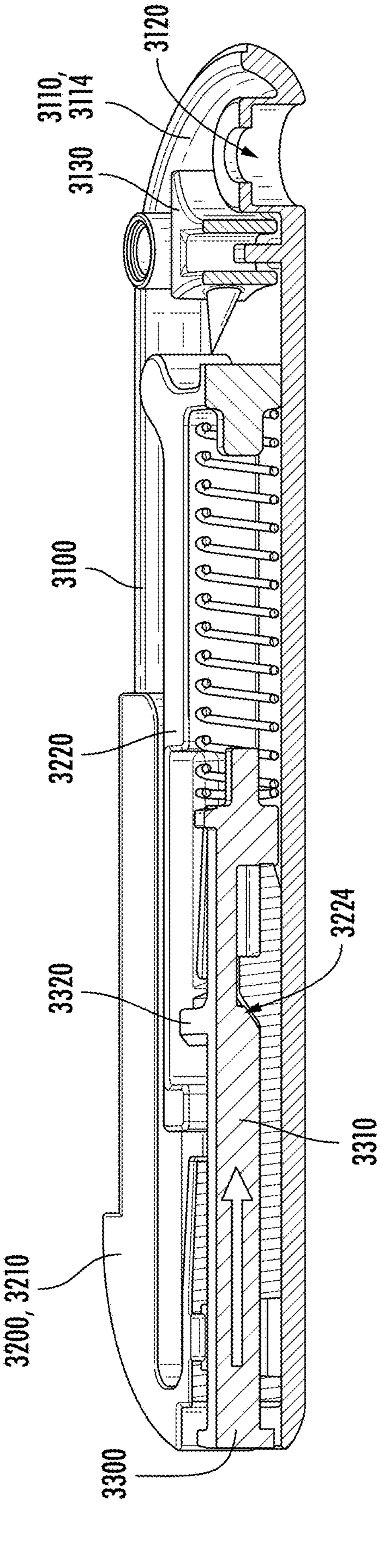
Figure 31I:
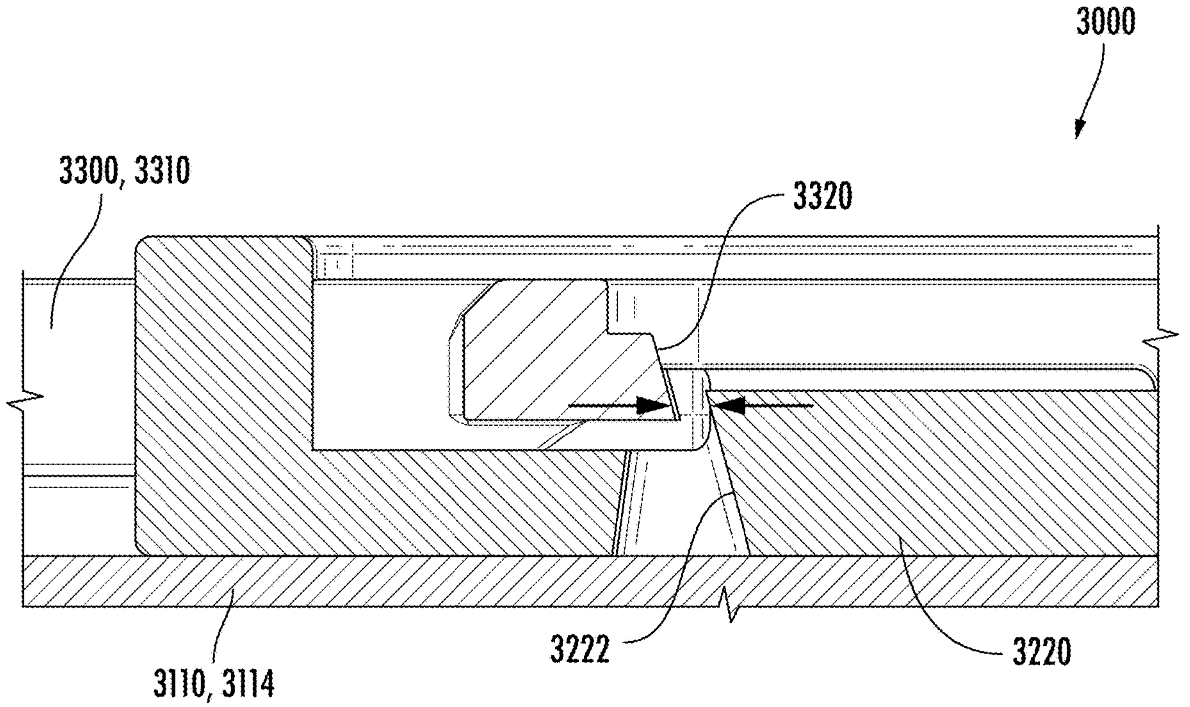
Figure 31J:
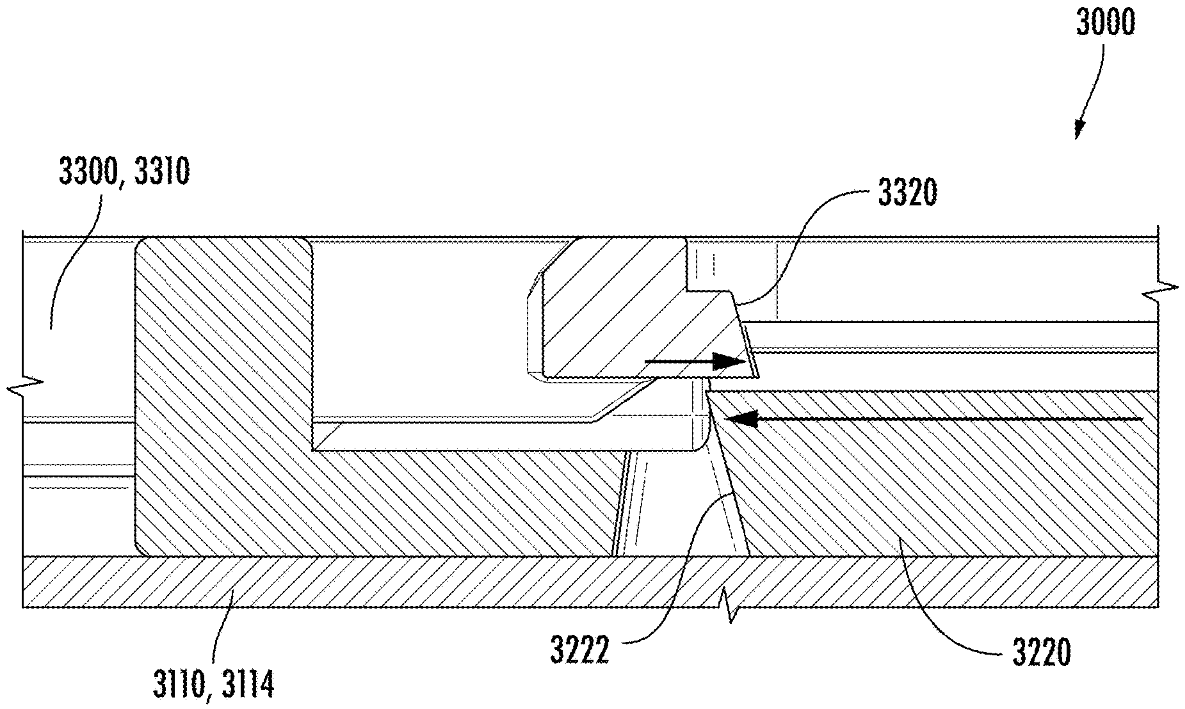

In some embodiments, the housing subassembly 3100 may include a body 3110 including first and second body members 3112, 3114. In use, the first and second body members 3112, 3114 may be arranged and configured to be coupled to each other by any suitable mechanism now known or hereafter developed including, for example, snap-fit connection, press-fit connection, interconnecting projections and/or recesses, etc. In addition, in some embodiments, as best illustrated in FIG. 31G, the cartridge subassembly 3200 may be arranged and configured with projections 3202 arranged and configured to be received within recesses, cutouts, etc. 3116 formed in the first and second body members 3112, 3114 to secure, lock, etc. the first and second body members 3112, 3114 together when the cartridge subassembly 3200 is coupled within the housing subassembly 3100.

In addition, the body 3110 may include an opening 3120 arranged and configured to, in use, receive a fastener for mounting the tensioner 3000 to a wall or other adjacent structure. That is, for example, as previously described herein, a fastener (not shown) may be inserted through an opening 3120 formed in the body 3110 for mounting the tensioner 3000 to the adjacent structure.

In addition, the housing subassembly 3100 may include a bearing 3130 or a roller 3130' as previously described. In use, the bearing 3130/roller 3130' may be preassembled with the body 3110 of the housing subassembly 3100. As previously described herein, in use, the bearing 3130 (e.g., spikes, teeth, etc.) (FIGS. 31B, 31C, and 31H) may be used when the operating element 120 is in the form of an operating cord 124. The roller 3130' (e.g., yoke) (FIG. 31E) may be used when the operating element 120 is in the form of a bead chain 122. As previously described, in the first position, the bearing 3130/roller 3130' is adapted and configured to operate in conjunction with the slider 3220 to secure the operating element 120 relative to the slider 3220 to lock a position of the operating element 120. For the sake of brevity, additional description on the bearing 3130 and roller 3130' is omitted herefrom.

As illustrated, the cartridge subassembly 3200 may include a housing 3210. In use, the housing 3210 of the cartridge subassembly 3200 is arranged and configured to be received with the body 3110 of the housing subassembly 3100. In addition, the cartridge subassembly 3200 includes a slider 3220 movably positioned within the housing 3210 of the cartridge subassembly 3200. The cartridge subassembly 3200 may also include a biasing member 3250 for biasing the slider 3220 in the first position, and an active locking mechanism such as, for example, a button mechanism, assembly, component, etc. 3300 (terms used interchangeably herein without the intent to limit or distinguish), which requires an end user, an installer, etc. to actively release or disengage the slider 3220 relative to the operating element 120 during, for example, installation. That is, as will be described herein, in some embodiments, the tensioner 3000 may include a button mechanism 3300. In use, as will be described in greater detail below, moving, pushing, etc. the button mechanism 3300 by the end user, the installer, etc. moves the button mechanism 3300 relative to the slider 3220 so that the button mechanism 3300 releases the slider 3220 so that the body 3110 of the housing subassembly 3100 can move relative to the slider 3220 and hence the cartridge subassembly 3200 so that the operating element 120 can be moved relative to the tensioner 3000.

That is, the tensioner 3000 may include a button mechanism 3300. In use, the button mechanism 3300 is moveable from a first position to a second position. In the first position, the button mechanism 3300 is arranged and configured to interact with, contact, engage, or the like (terms used interchangeably herein without the intent to limit or distinguish) the slider 3220 to prevent relative movement of the slider 3220 and the housing subassembly 3100 (e.g., to maintain the slider 3220 in contact with the operating element 120 to prevent relative movement of the operating element 120 relative to the tensioner 3000). In the second position, the button mechanism 3300 releases the slider 3220 so that an end user, an installer, etc. is able to move the housing subassembly 3100 relative to the slider 3220 so that the slider 3220 releases the operating element 120 enabling the operating element 120 to move relative to the tensioner 3000.

As illustrated, in some embodiments, the button mechanism 3300 is accessible through the housing 3210 of the cartridge subassembly 3200. In addition, the button mechanism 3300 may include first and second stops 3320, although this is but one configuration and more or less stops may be used. In some embodiments, the stops 3320 may be arranged and configured as outwardly projecting legs, tabs, projections, or the like (terms used interchangeably herein without the intent to limit or distinguish) extending from either side of a body portion 3310 of the button mechanism 3300. In use, as best illustrated with reference to FIGS. 31I and 31J, the first and second stops 3320 are arranged and configured to interact with corresponding stops or abutment surfaces 3222 formed on the slider 3220 to prevent relative movement between the slider 3220 and the body 3110 of the housing subassembly 3100. However, with reference to FIG. 31H, in use, an end user, installer, etc. during, for example, installation, may press the button mechanism 3300 causing the button mechanism 3300 to contact and ride up a ramp 3224 formed on the housing 3210 of the cartridge subassembly 3200. Thus arranged, with reference to FIG. 31J, the stops 3320 formed on the button mechanism 3300 clear the corresponding stops 3222 formed on the housing 3210 of the cartridge subassembly 3200, which enables the button mechanism 3300 to clear (e.g., release) the slider 3220. Thus arranged, the end user, installer, etc. can grip and move the housing subassembly 3100 relative to the cartridge subassembly 3200 a sufficient distance to enable the slider 3220 to release the operating element 120.

That is, in some embodiments, as described herein, the slider 3220 is locked into a forward position so that the slider 3220 engages the operating element 120. In use, during, for example, installation, the end user, installer, etc. can push the button mechanism 3300 forward from its first or rest position to its second position. During travel from the first position to the second position, the button mechanism 3300 contacts a ramp 3224 (FIG. 31H) associated with the cartridge subassembly 3200, which causes the button mechanism 3300 to ride up the ramp 3224 (e.g., ribs or stops 3320 on the button mechanism 3300 bow upwards and over the corresponding stops 3222 associated with the cartridge subassembly 3200). Thus, the slider 3220 is free to move relative to the button mechanism 3300. Thus arranged, with the stops 3320 on the button mechanism 3300 cleared of the stops 3222 associated with the cartridge subassembly 3200, the end user, installer, etc. can subsequently move the housing subassembly 3100 relative to the cartridge subassembly 3200 thereby releasing the operating element 120 from the slider 3220.

In this configuration, similar to previously described embodiments, the end user, installer, etc. can mount the tensioner 3000 to the adjacent structure with the slider 3220 positioned so that the first end of the slider 3220 does not contact the operating element 120. However, in use, if the tensioner 3000 is decoupled from the adjacent structure, the biasing member 3250 biases the slider 3220 to its first position so that the first end of the slider 3220 contacts the operating element 120 thereby preventing movement of the operating element 120 relative to the tensioner 3000.

Thus arranged, similar to previously described embodiments, in use, the tensioner 3000 is mounted to the adjacent structure with the operating element 120 (e.g., operating cord 124 or bead chain 122) in a taut condition. With the operating element 120 in a taut condition and with the slider 3220 not in contact with the operating element 120, the operating element 120 is free to move relative to the tensioner 3000 so that the covering 106 can be moved between the extended and retracted positions. However, in use, if the tensioner 3000 is decoupled from the adjacent structure (e.g., the tensioner 3000 is no longer mounted to the adjacent structure) or if the tensioner 3000 is mounted incorrectly such that, for example, the operating element 120 is in a non-taut condition, the slider 3220 is biased into contact with the operating element 120 to prevent the operating element 120 from moving relative to the slider 3220 and hence the tensioner 3000.

Figure 32A:
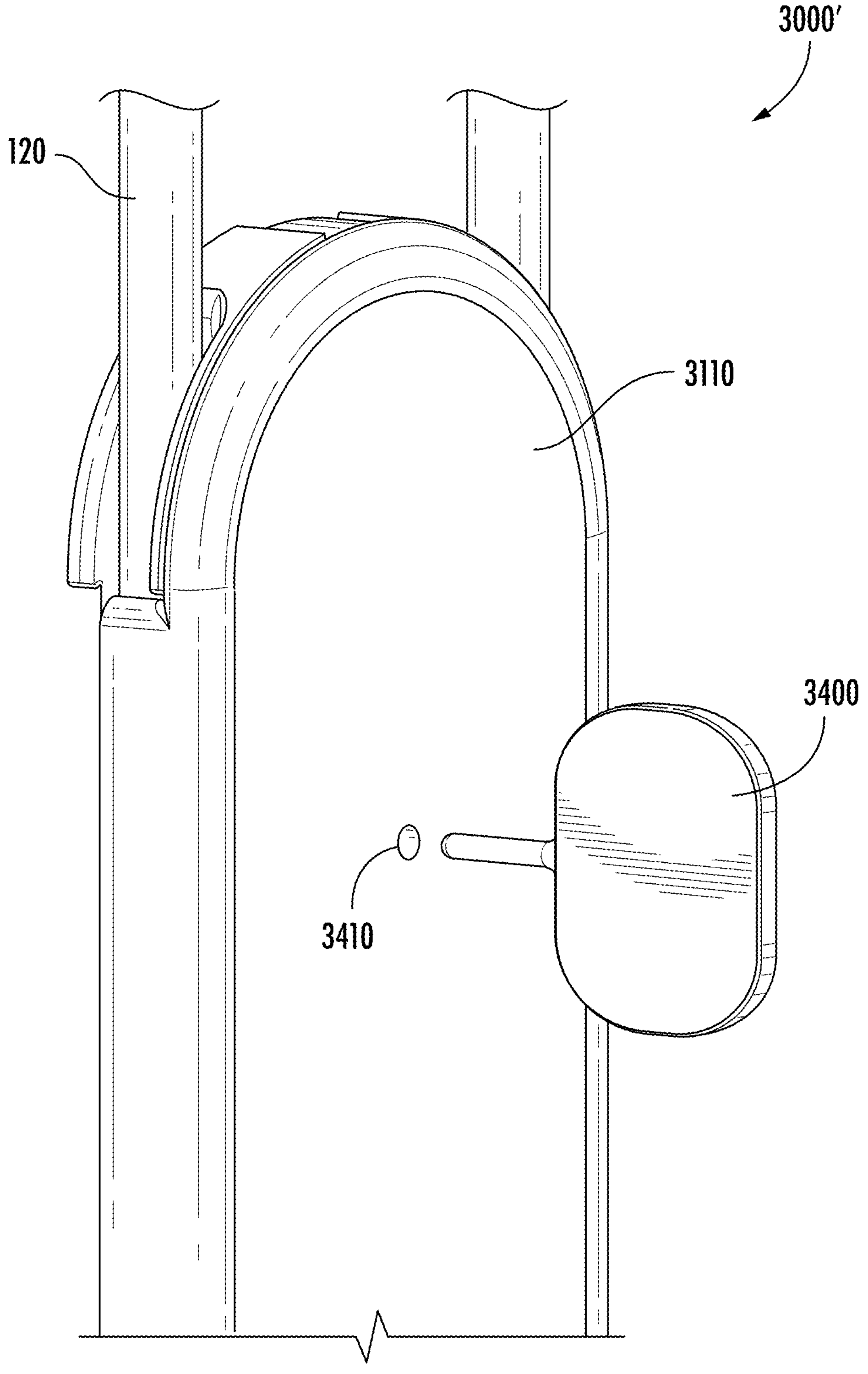
FIGS. 32A and 32B illustrate various views of an alternate example of an embodiment of a tensioner in accordance with one or more features of the present disclosure.
Figure 32B:
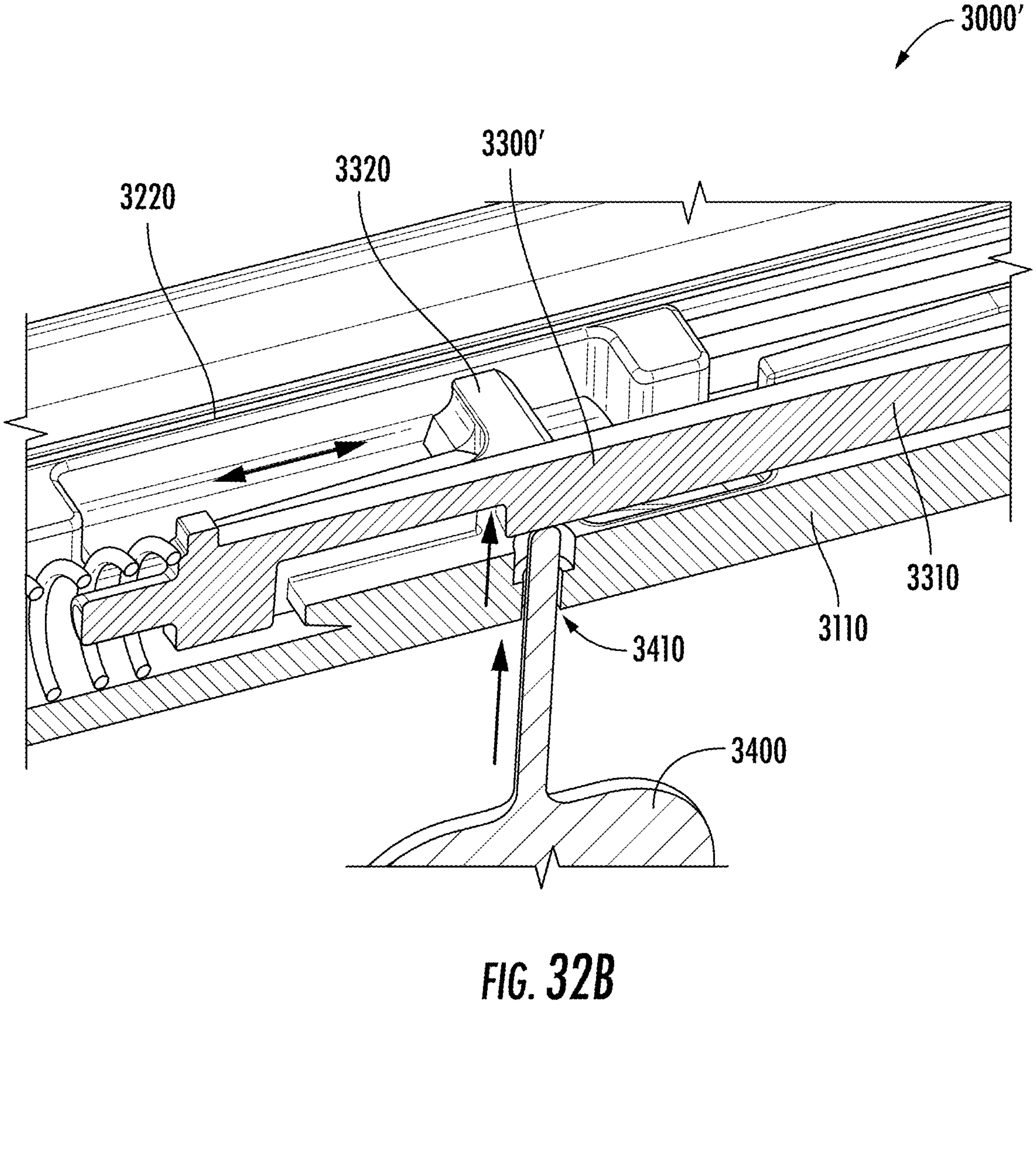

As described herein, in use, the button mechanism 3300 is arranged and configured to be manipulated, pressed, etc. (terms used interchangeably herein without the intent to limit or distinguish) by the end user, installer, etc. in order to move the button mechanism 3300 toward the operating element 120 so that the slider 3220 contacts and rides up the ramp 3224 to clear the corresponding stops 3222, 3320 to release the slider 3220 to enable relative movement between the housing subassembly 3100 and the cartridge subassembly 3200. However, it is envisioned that alternate release/button mechanisms may be used. For example, with reference to FIGS. 32A and 32B, as described herein, the button mechanism 3300' may be rendered inaccessible and an external tool 3400 may be used to move the button 3300' to clear the corresponding stops 3222, 3320 to release the slider 3220. For example, the body 3110 of the housing subassembly 3100 may include an opening 3410 sized and configured to receive the external tool 3400. In use, insertion of the external tool 3400 within the opening 3410 causes the external tool 3400 to contact and displace the button 3300' so that the stops 3320 formed on the button 3300' clear the corresponding stops 3222 on the slider 3220 to enable the end user, installer, etc. to move the housing subassembly 3100 relative to the cartridge subassembly 3200. That is, in contrast, to pressing an exposed button mechanism to move the button mechanism past the slider (e.g., unlocked position), an external tool 3400 may be inserted through an opening 3410 formed in the tensioner 3000' to displace the button to the released position, thereby allowing the slider to release the operating element 120.

Figure 33:
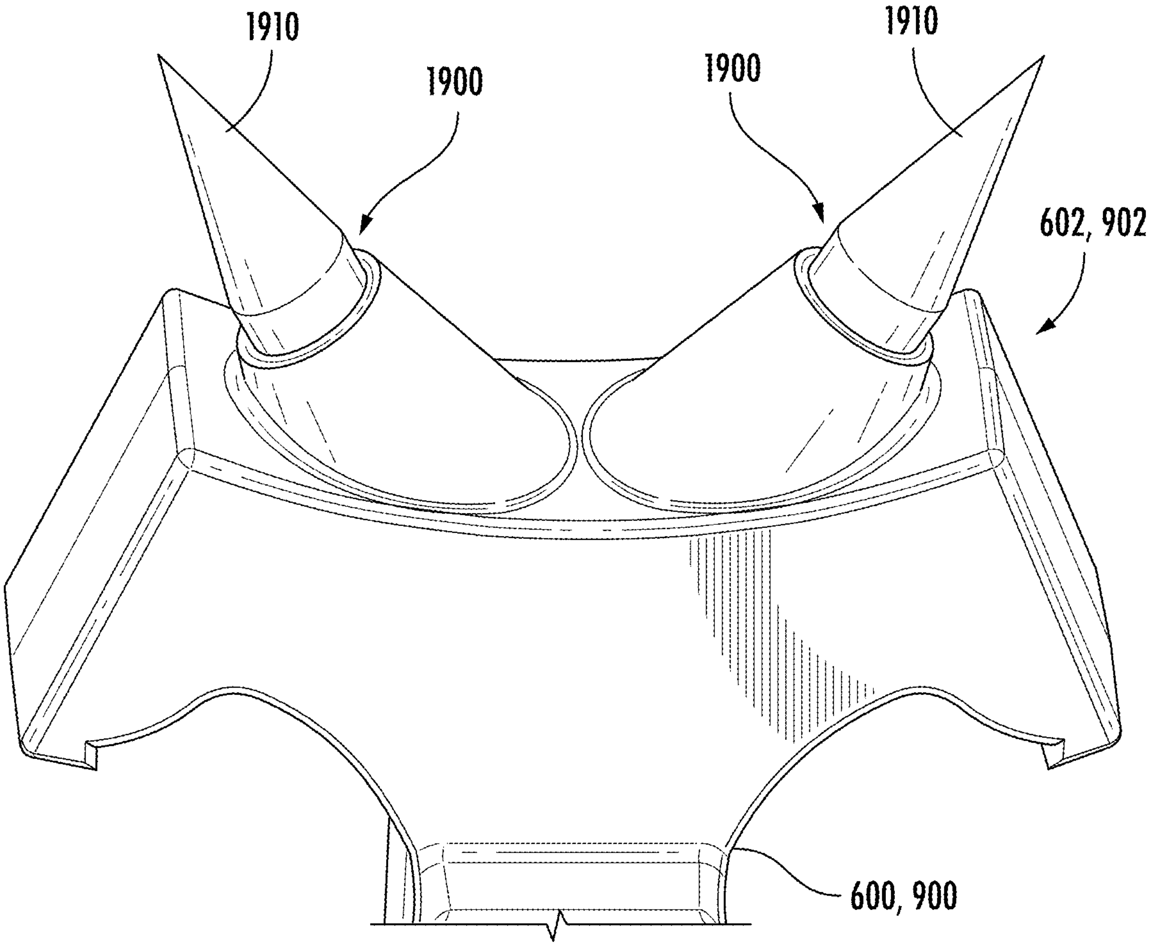
FIG. 33 is a perspective view illustrating an alternate example of an embodiment of a slider in accordance with one or more features of the present disclosure, the slider including pins for engaging the operating cord, the pins being separately formed and coupled to the slider.

In accordance with one or more features of the present disclosure that may be used in combination with the previously described tensioners, which are arranged and configured to operate with an operating cord 124, the teeth, spikes, or projections such as, for example, the first and second teeth, spikes, or projections 603, 903 formed on the first end 602, 902 of the slider 600, 900 which are arranged and configured to bite into the operating cord 124, may be arranged and configured as pins, which may be separately formed and coupled to the first end of the slider. For example, as illustrated in FIG. 33, the first end 602, 902 of the slider 600, 900 may include one or more cavities 1900 arranged and configured to receive one or more pins 1910. Thus arranged, the pins 1910 may be manufactured from an alternate material as compared to the slider. For example, the pins 1910 may be manufactured from steel or other suitable material to provide increased fixation strength (e.g., increased biting strength into the operating cord 124). In use, the pins 1910 may be coupled to the first end of the slider by any suitable mechanism now known or hereafter developed such as, for example, the pins 1910 may be arranged and configured to be inserted, coupled, etc. to the cavities 1900 via a friction fit, a snap-fit, overmolding, etc. However, this is but one configuration and other configurations are envisioned such as, for example, the first and second pins may be provided as a single insert which may be coupled (e.g., keyed) to the first end of the slider. For example, the first and second pins may be interconnected by a bridge member such as, a V-shaped bridge, so that a single insert including both pins may be coupled (e.g., keyed) to the first end of the slider.

The tensioner and the individual components thereof may be manufactured from any suitable material such as, for example, plastic, metal, etc. For example, in one embodiment, the first and second body members may be molded with a polycarbonate (PC) or a polycarbonate/polyester alloy (PC/PBT) and the roller/bearing may be molded with a polyetherimide (PC-"Ultem") or a polyethersulphone (PES). The slider may be manufactured from a rigid material such as, for example, a metal such as, for example, Zinc, or a reinforced polymer or plastic.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The foregoing description has broad application. It should be appreciated that the concepts disclosed herein may apply to many types of coverings, in addition to the roller-type coverings described and depicted herein. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The phrases "at least one," "one or more," and "and/or," as used herein, are open-ended expressions that are both conjunctive and disjunctive in operation. The terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. All rotational references describe relative movement between the various elements. Identification references (e.g., primary, secondary, first, second, third, fourth, etc.) are not intended to connote importance or priority, but are used to distinguish one feature from another. The drawings are for purposes of illustration only and the dimensions, positions, order and relative to sizes reflected in the drawings attached hereto may vary.

What is claimed:

1. A tensioner for use with an architectural-structure covering including a covering and an operating element, the operating element being arranged and configured to move the covering between an extended position and a retracted position, the tensioner selectively securing a position of the operating element relative to the tensioner, the tensioner comprising:

a body having a first body member coupled to a second body member;

a slider movably positioned within the body, the slider movable between first and second positions, the slider including a first end arranged and configured to interact with the operating element and a second end; and a bearing positioned within the body, the bearing guiding movement of the operating element;

wherein in the first position, the slider prevents movement of the operating element relative to the body, and in the second position, the slider is retracted from the bearing to permit movement of the operating element relative to the body; and a spring-loaded button mechanism moveable from a first position to a second position, wherein in the first position, the spring-loaded button mechanism is arranged and configured to contact the slider to prevent the slider from moving from its first position to its second position, wherein the spring-loaded button mechanism moves relative to a portion of the slider as the spring-loaded button mechanism is moved between the first and second positions.

2. The tensioner of claim 1, wherein, with the spring-loaded button mechanism in the second position, the spring-loaded button mechanism disengages the slider to enable the slider to move to its second position.

3. The tensioner of claim 1, wherein the spring-loaded button mechanism is biased to the first position.

4. The tensioner of claim 1, wherein the spring-loaded button mechanism includes first and second arms, first and second stops, and first and second buttons, wherein the first and second buttons are arranged and configured to be manipulated by an end user to move the spring-loaded button mechanism from the first position to the second position thereby releasing the slider.

5. The tensioner of claim 4, wherein the spring-loaded button mechanism is arranged and configured so that the first and second buttons require simultaneous manipulation in order to release the slider.

6. The tensioner of claim 1, wherein:

the operating element comprises a bead chain including a plurality of beads;

the first end of the slider includes tines for interacting with one of the plurality of beads;

the bearing is in the form of a roller, the roller including a bearing surface and a plurality of legs defining a series of pockets; and with the slider in the first position, the tines are received within one of the series of pockets and the tines interact with the bead chain and at least one of the plurality of legs to prevent movement of the bead chain relative to the body.

7. The tensioner of claim 6, wherein the body includes a post and the roller includes a bore for receiving the post so that the roller is rotatably coupled to the body.

8. The tensioner of claim 1, wherein:

the operating element comprises an operating cord;

the first end of the slider includes spikes for interacting with the operating cord;

the bearing includes first and second downwardly extending legs defining a space therebetween; and with the slider in the first position, the spikes are received within the space and engage the operating cord to prevent movement of the operating cord relative to the body.

9. The tensioner of claim 8, wherein the bearing has a U-shaped configuration.

10. The tensioner of claim 8, wherein the downwardly extending legs are arranged and configured to guide passage of the operating cord so that with the slider in the second position, the operating cord passes laterally through the body of the tensioner such that the operating cord is perpendicular to a longitudinal axis of the tensioner.

11. The tensioner of claim 10, wherein with the slider in the first position, the spikes push the operating cord upwards into the space between the downwardly extending legs.

12. The tensioner of claim 1, wherein the body includes a longitudinally extending rail arranged and configured to interact with the slider for guiding movement of the slider relative to the body.

13. The tensioner of claim 1, wherein the first and second body members include a plurality of interconnecting projections and recesses for coupling the first body member and the second body member, the first and second body members further including at least one snap-fit connector arranged and configured to couple the first body member to the second body member, wherein the snap-fit connector is arranged and configured to break upon separation thereby indicating that the tensioner was tampered with.

14. The tensioner of claim 1, further comprising a biasing member to bias the slider to the first position.

15. The tensioner of claim 1, wherein:

the second end of the slider includes an opening to receive a fastener and the body includes an elongated slot to access a portion of the second end of the slider; and when the slider is moved from the first position to the second position, a wall or surface of the slider closes the elongated slot formed in the body.

16. The tensioner of claim 1, wherein:

the second end of the slider includes an opening to receive a fastener and the body includes an elongated slot to access a portion of the second end of the slider; and the slider includes a cavity having an opening for receiving a biasing element such that the opening formed in the slider for receiving the biasing member is orientated perpendicular relative to the opening formed in the second end for receiving the fastener.

17. A tensioner for use with an architectural-structure covering including a covering and an operating element, the operating element being arranged and configured to move the covering between an extended position and a retracted position, the tensioner selectively securing a position of the operating element relative to the tensioner, the tensioner comprising:

a body having a first body member coupled to a second body member;

a slider movably positioned within the body, the slider movable between first and second positions, the slider including a first end arranged and configured to interact with the operating element and a second end; and a bearing positioned within the body, the bearing guiding movement of the operating element;

wherein in the first position, the slider prevents movement of the operating element relative to the body, and in the second position, the slider is retracted from the bearing to permit movement of the operating element relative to the body; and a spring-loaded button mechanism moveable from a first position to a second position, wherein in the first position, the spring-loaded button mechanism is arranged and configured to contact the slider to prevent the slider from moving from its first position to its second position, wherein the spring-loaded button mechanism includes first and second arms, first and second stops, and first and second buttons, wherein the first and second buttons are arranged and configured to be manipulated by an end user to move the spring-loaded button mechanism from the first position to the second position thereby releasing the slider, and wherein the first and second stops are arranged and configured to contact first and second stops on the slider to prevent the slider from moving to its second position when the spring-loaded button mechanism is in the first position.

18. The tensioner of claim 17, wherein the first and second stops formed on the spring-loaded button mechanism include inwardly projecting legs and the first and second stops formed on the slider include first and second pockets for receiving the first and second inwardly projecting legs.

19. The tensioner of claim 17, wherein each of the first and second arms is pivotably coupled to the body of the tensioner.

20. The tensioner of claim 19, wherein each of the first and second arms is pivotably coupled to the body of the tensioner at a location positioned in-between the stop and the button.

* * * * *